US012658478B2

(12) United States Patent
Ogita et al.

(10) Patent No.: US 12,658,478 B2
(45) Date of Patent: Jun. 16, 2026

(54) SECONDARY BATTERY AND VEHICLE INCLUDING SECONDARY BATTERY

(71) Applicant: SEMICONDUCTOR ENERGY LABORATORY CO., LTD., Atsugi (JP)

(72) Inventors: Kaori Ogita, Isehara (JP); Hiroshi Kadoma, Sagamihara (JP); Fumiko Tanaka, Atsugi (JP); Kazutaka Kuriki, Ebina (JP); Yumiko Yoneda, Isehara (JP); Shotaro Muratsubaki, Atsugi (JP); Kaori Fujie, Isehara (JP); Taku Ichino, Atsugi (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 513 days.

(21) Appl. No.: 18/001,623

(22) PCT Filed: Jun. 30, 2021

(86) PCT No.: PCT/IB2021/055834
§ 371 (c)(1),
(2) Date: Dec. 13, 2022

(87) PCT Pub. No.: WO2022/009025
PCT Pub. Date: Jan. 13, 2022

(65) Prior Publication Data

US 2023/0231199 A1 Jul. 20, 2023

(30) Foreign Application Priority Data

Jul. 10, 2020 (JP) ................................ 2020-119471
Aug. 20, 2020 (JP) ................................ 2020-139514
Apr. 14, 2021 (JP) ................................ 2021-068344

(51) Int. Cl.
*H01M 10/00* (2006.01)
*H01M 10/0568* (2010.01)
*H01M 10/0569* (2010.01)

(52) U.S. Cl.
CPC ... *H01M 10/0569* (2013.01); *H01M 10/0568* (2013.01); *H01M 2300/0034* (2013.01)

(58) Field of Classification Search
CPC ......... H01M 10/0569; H01M 10/0568; H01M 10/0567; H01M 10/052; H01M 2300/0025; Y02E 60/10
See application file for complete search history.

(56) References Cited

U.S. PATENT DOCUMENTS 8,951,664 B2 2/2015 Ito et al.
9,252,459 B2 2/2016 Itakura et al.
(Continued)

FOREIGN PATENT DOCUMENTS

CN 105556733 A 5/2016
CN 105655554 A 6/2016
(Continued)

OTHER PUBLICATIONS

International Search Report (Application No. PCT/IB2021/055834) Dated Oct. 5, 2021.
(Continued)

*Primary Examiner* — Tiffany Legette
*Assistant Examiner* — Monique M Wills
(74) *Attorney, Agent, or Firm* — Fish & Richardson P.C.

(57) ABSTRACT

An object is to provide a nonaqueous solvent, a secondary battery, or a vehicle having a wide usable temperature range and high heat resistance. The nonaqueous solvent of the present invention contains an ionic liquid at greater than or equal to 50 vol % and less than or equal to 95 vol % and a fluorinated cyclic carbonate, and the ionic liquid contains an
(Continued)

imidazolium cation. The nonaqueous solvent of the present invention has low viscosity at low temperatures and high heat resistance, thereby having a wide usable temperature range.

14 Claims, 19 Drawing Sheets

(56) References Cited

U.S. PATENT DOCUMENTS

| | | | | |
|---|---|---|---|---|
| 9,362,564 | B2 | 6/2016 | Itakura et al. | |
| 9,577,290 | B2 | 2/2017 | Ito et al. | |
| 10,049,825 | B2 | 8/2018 | Ito et al. | |
| 10,147,556 | B2 | 12/2018 | Uchida et al. | |
| 10,158,108 | B2 | 12/2018 | Narita et al. | |
| 10,497,979 | B2 | 12/2019 | Ishikawa et al. | |
| 10,658,701 | B2 | 5/2020 | Inoue et al. | |
| 10,741,834 | B2 | 8/2020 | Zhang et al. | |
| 2002/0110736 | A1 | 8/2002 | Kweon et al. | |
| 2003/0104279 | A1 | 6/2003 | Miyazaki et al. | |
| 2004/0142241 | A1 | 7/2004 | Nagayama | |
| 2006/0263690 | A1 | 11/2006 | Suhara et al. | |
| 2007/0117014 | A1 | 5/2007 | Saito et al. | |
| 2008/0241693 | A1 | 10/2008 | Fukuchi et al. | |
| 2009/0087362 | A1 | 4/2009 | Sun et al. | |
| 2009/0104532 | A1 | 4/2009 | Hosoya | |
| 2010/0086854 | A1 | 4/2010 | Kumar et al. | |
| 2010/0247986 | A1 | 9/2010 | Toyama et al. | |
| 2012/0328960 | A1 | 12/2012 | Ito et al. | |
| 2013/0052534 | A1 | 2/2013 | Fujiki et al. | |
| 2013/0323596 | A1 | 12/2013 | Morita et al. | |
| 2014/0099529 | A1 | 4/2014 | Ishikawa et al. | |
| 2014/0212759 | A1 | 7/2014 | Blangero et al. | |
| 2014/0377644 | A1 | 12/2014 | Ishikawa et al. | |
| 2015/0008364 | A1 | 1/2015 | Endo | |
| 2015/0086860 | A1 | 3/2015 | Yokoi et al. | |
| 2015/0140449 | A1 | 5/2015 | Ishikawa et al. | |
| 2016/0006032 | A1 | 1/2016 | Paulsen et al. | |
| 2016/0013478 | A1 | 1/2016 | Satow et al. | |
| 2016/0156032 | A1 | 6/2016 | Lee et al. | |
| 2016/0190642 | A1 | 6/2016 | Fukunaga et al. | |
| 2016/0268064 | A1 | 9/2016 | Ishikawa et al. | |
| 2016/0268601 | A1 | 9/2016 | Paulsen et al. | |
| 2016/0276659 | A1 | 9/2016 | Choi et al. | |
| 2017/0237127 | A1 | 8/2017 | Ishikawa et al. | |
| 2018/0013130 | A1 | 1/2018 | Ochiai et al. | |
| 2018/0145317 | A1 | 5/2018 | Momma et al. | |
| 2018/0145368 | A1 | 5/2018 | Ochiai et al. | |
| 2019/0245199 | A1 | 8/2019 | Zeng et al. | |
| 2020/0176770 | A1 | 6/2020 | Takahashi et al. | |
| 2020/0220173 | A1 | 7/2020 | Jo et al. | |
| 2020/0220223 | A1* | 7/2020 | He | H01M 10/052 |
| 2021/0083281 | A1 | 3/2021 | Mikami et al. | |
| 2021/0313571 | A1 | 10/2021 | Momma et al. | |
| 2022/0131146 | A1 | 4/2022 | Saito et al. | |
| 2022/0359870 | A1 | 11/2022 | Mikami et al. | |
| 2025/0105282 | A1 | 3/2025 | Liu et al. | |

FOREIGN PATENT DOCUMENTS

| | | | |
|---|---|---|---|
| CN | 113140726 | A | 7/2021 |
| JP | 2000-203842 | A | 7/2000 |
| JP | 2002-216760 | A | 8/2002 |
| JP | 2004-071245 | A | 3/2004 |
| JP | 3774315 | | 5/2006 |
| JP | 2009-199960 | A | 9/2009 |
| JP | 2010-080407 | A | 4/2010 |
| JP | 2015-037024 | A | 2/2015 |
| JP | 2015-099722 | A | 5/2015 |
| JP | 2018-116840 | A | 7/2018 |
| KR | 2016-0041902 | A | 4/2016 |
| WO | WO-2015/022792 | | 2/2015 |
| WO | WO-2016/055908 | | 4/2016 |

OTHER PUBLICATIONS

Written Opinion (Application No. PCT/IB2021/055834) Dated Oct. 5, 2021.

Zhang.J et al., "Trace doping of multiple elements enables stable battery cycling of LiCoO2 at 4.6 V", Nature Energy, Jun. 17, 2019, vol. 4, pp. 594-603.

Hirooka.M et al., "Improvement of float charge durability for LiCoO2 electrodes under high voltage and storage temperature by suppressing O1-Phase transition", Journal of Power Sources, Jul. 1, 2020, vol. 463, p. 228127-1-228127-8, ELSEVIER.

Wang.L et al., "A Novel Bifunctional Self-Stabilized Strategy Enabling 4.6 V LiCoO2 with Excellent Long-Term Cyclability and High-Rate Capability", Adv. Sci. (Advanced Science), Apr. 24, 2019, vol. 6, No. 12, pp. 1900355-1-1900355-11.

Okumura. T et al., "Correlation of lithium ion distribution and X-ray absorption near-edge structure in O3- and O2- lithium cobalt oxides from first-principle calculation", J. Mater. Chem. (Journal of Materials Chemistry), 2012, vol. 22, p. 17340-17348.

Yano.A et al., "LiCoO2 Degradation Behavior in the High-Voltage Phase Transition Region and Improved Reversibility with Surface Coating", J. Electrochem. Soc. (Journal of the Electrochemical Society), Nov. 12, 2016, vol. 164, No. 1, pp. A6116-A6122.

Wang.Z et al., "EELS analysis of cation valence states and oxygen vacancies in magnetic oxides", Micron, Oct. 1, 2000, vol. 31, No. 5, pp. 571-580, Elsevier.

Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), Sep. 20, 2006, vol. 153, No. 11, pp. A2152-A2157.

Chen.Z et al., "Staging Phase Transitions in LixCoO2", J. Electrochem. Soc. (Journal of the Electrochemical Society), Oct. 29, 2002, vol. 149, No. 12, pp. A1604-A1609.

Ohzuku. T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.

Zou.M et al., "Synthesis and Electrochemical Performance of High Voltage Cycling LiM0.05Co0.95O2 as Cathode Material for Lithium Rechargeable Cells", Electrochemical and Solid-State Letters, Apr. 26, 2004, vol. 7, No. 7, pp. A176-A179.

Kim.Y et al., "Suppression of Cobalt Dissolution from the LiCoO2 Cathodes with Various Metal-Oxide Coatings", J. Electrochem. Soc. (Journal of the Electrochemical Society), Nov. 5, 2003, vol. 150, No. 12, pp. A1723-A1725.

Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.

Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.

Wang.Z et al., "Mg doping and zirconium oxyfluoride coating co-modification to enhance the high-voltage performance of LiCoO2 for lithium ion battery", Journal of Alloys and Compounds, Oct. 5, 2014, vol. 621, pp. 212-219.

Shim.J et al., "Synergistic effects of coating and doping for lithium ion battery cathode materials: synthesis and characterization of lithium titanate-coated LiCoO2 with Mg doping", Electrochimica Acta, Nov. 11, 2015, vol. 186, pp. 201-208, Elsevier.

Taguchi.N et al., "Characterization of MgO-coated-LiCoO2 particles by analytical transmission electron microscopy", Journal of Power Sources, Aug. 10, 2016, vol. 328, pp. 161-166, Elsevier.

Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.

Qian.J et al., "Electrochemical surface passivation of LiCoO2 particles at ultrahigh voltage and its applications in lithium-based batteries", Nature Communications, Nov. 21, 2018, vol. 9, pp. 4918-1-4918-11.

Yin.R et al., "In Situ XRD Investigation and Thermal Properties of Mg Doped LiCoO2 for Lithium Ion Batteries", J. Electrochem. Soc.

(56) References Cited

OTHER PUBLICATIONS (Journal of the Electrochemical Society), Jan. 3, 2012, vol. 159, No. 3, pp. A253-A258.
Shao-horn. Y et al., "Probing Lithium and Vacancy Ordering in 03 Layered Lix CoO2 (x = 0.5) : An Electron Diffraction Study", J. Electrochem. Soc. (Journal of the Electrochemical Society), Feb. 6, 2003, vol. 150, No. 3, pp. A366-A373.
Kalluri.S et al., "Surface Engineering Strategies of Layered LiCoO2 Cathode Material to Realize High-Energy and High-Voltage Li-lon Cells", Advanced Energy Materials, Oct. 12, 2016, vol. 7, No. 1, pp. 1601507-1-1601507-21.
Zhang.S et al., "Surface engineering of LiCoO2 by a multifunctional nanoshell for stable 4.6V electrochemical performance", Energy Storage Materials, Feb. 21, 2023, vol. 57, pp. 289-298.
Yano.A et al., "Capability and Reversibility of LiCoO2 during Charge/Discharge with O3/H1-3 Layered Structure Change", J. Electrochem. Soc. (Journal of the Electrochemical Society), May 11, 2021, vol. 168, No. 5, pp. 050517-1-050517-11.

* cited by examiner

Electric charge -0.540

EC

Electric charge -0.503

FEC

Electric charge -0.465

DFEC

High ⟷ Low

Solvation energy

SECONDARY BATTERY AND VEHICLE INCLUDING SECONDARY BATTERY

CROSS REFERENCE TO RELATED APPLICATIONS

This application is a U.S. National Phase Application under 35 U.S.C. § 371 of International Application PCT/IB2021/055834, filed on Jun. 30, 2021, which is incorporated by reference and claims the benefit of foreign priority applications filed in Japan on Jul. 10, 2020, as Application No. 2020-119471, on Aug. 20, 2020, as Application No. 2020-139514, and on Apr. 14, 2021, as Application No. 2021-068344.

TECHNICAL FIELD

The present invention relates to a nonaqueous solvent, a secondary battery, a vehicle including a secondary battery, and the like.

BACKGROUND ART

Secondary batteries can be used repeatedly and are also called storage batteries. Secondary batteries including lithium ions as carrier ions, which are called lithium ion secondary batteries, can have high capacity and a small size and are under intensive research and development.

Secondary batteries face a problem of their susceptibility to environmental temperature. Influence of cold, for example, increases the viscosity of an electrolyte solution in a secondary battery and reduces carrier ion conducting performance. That is, lowered performance of an electrolyte solution leads to lowered performance of a secondary battery.

Accordingly, the spread of electric vehicles whose motors are driven by secondary batteries to cold climate areas and tropical regions has not advanced. The reason for this is because cold-induced lowered performance of secondary batteries presumably increases internal resistance of the secondary batteries, for example.

Examples of vehicles including secondary batteries include, in addition to electric vehicles, hybrid vehicles having two power sources of an engine and a motor. Hybrid vehicles that can be charged through receptacles are plug-in hybrid vehicles. Hybrid vehicles and plug-in hybrid vehicles also face the problem of lowered performance of electrolyte solutions due to environmental temperature.

Examples of electronic devices including secondary batteries include portable information terminals such as mobile phones, smartphones, and notebook personal computers, portable music players, digital cameras, and medical instruments. Such electronic devices also face the problem of lowered performance of electrolyte solutions due to environmental temperature.

It is desired that the secondary batteries that may be included in electric vehicles, hybrid vehicles, plug-in hybrid vehicles, or electronic devices can demonstrate stable performance irrespective of the environmental temperature at which the secondary batteries are used, and the secondary batteries are required to be much safer.

A non-flammable ionic liquid is a highly safe electrolyte solution. Patent Document 1 discloses setting the viscosity of an electrolyte solution containing an ionic liquid within a certain range in light of a problem related to the safety of secondary batteries.

REFERENCE

Patent Document

[Patent Document 1] Japanese Published Patent Application No. 2018-116840

SUMMARY OF THE INVENTION

Problems to be Solved by the Invention

In Patent Document 1, however, the problem related to the environmental temperature at which secondary batteries are used has not been recognized.

In view of the above, an object of the present invention is to provide a nonaqueous solvent usable in a wide temperature range and a manufacturing method thereof. Another object is to provide a secondary battery including the nonaqueous solvent as an electrolyte solution and a manufacturing method thereof. Another object is to provide a vehicle including the secondary battery and a manufacturing method thereof.

Another object of the present invention is to provide a nonaqueous solvent containing an ionic liquid and having low viscosity at least at low temperatures and a manufacturing method thereof. Another object is to provide a secondary battery including the nonaqueous solvent as an electrolyte solution and a manufacturing method thereof. Another object is to provide a vehicle including the secondary battery and a manufacturing method thereof.

Another object of the present invention is to provide a nonaqueous solvent with high heat resistance and a manufacturing method thereof. Another object is to provide a secondary battery including the nonaqueous solvent as an electrolyte solution and a manufacturing method thereof. Another object is to provide a vehicle including the secondary battery and a manufacturing method thereof.

One embodiment of the present invention does not necessarily achieve all of these objects. Other objects can be derived from the description of this specification, the drawings, and the claims. The description of these objects does not disturb the existence of other objects related to safety and the like.

Means for Solving the Problems

The present inventors have conducted intensive research to solve the above problems and have found out that adding an organic solvent to an ionic liquid enables a nonaqueous solvent to have low viscosity even at low temperatures. The low viscosity can lead to increased conductivity of the nonaqueous solvent, improving carrier ion conductivity such as lithium ion conductivity. When the nonaqueous solvent is used as an electrolyte solution in a secondary battery, it is possible to provide a secondary battery having high carrier ion conductivity such as high lithium ion conductivity at least at low temperatures.

When containing an ionic liquid at greater than or equal to 50 vol %, a nonaqueous solvent can have high heat resistance. When containing an ionic liquid at less than 50 vol %, a nonaqueous solvent fails to have high heat resistance in some cases. Thus, an ionic liquid is contained in a nonaqueous solvent at greater than or equal to 50 vol % and less than or equal to 95 vol %, further preferably greater than or equal to 70 vol % and less than or equal to 90 vol %, still further preferably greater than or equal to 85 vol % and less than or equal to 90 vol %.

Considering the carrier ion conductivity at low temperatures and the high heat resistance of the above nonaqueous solvent, it is possible to provide a nonaqueous solvent usable in a wide temperature range. Furthermore, it is possible to provide a secondary battery including the nonaqueous solvent as an electrolyte solution and a vehicle including the secondary battery.

One embodiment of the present invention is a nonaqueous solvent which contains an ionic liquid at greater than or equal to 50 vol % and less than or equal to 95 vol % and an organic solvent containing a fluorinated cyclic carbonate, and in the nonaqueous solvent, the ionic liquid contains an imidazolium cation.

One embodiment of the present invention is a nonaqueous solvent which contains an ionic liquid at greater than or equal to 50 vol % and less than or equal to 95 vol % and an organic solvent containing a fluorinated cyclic carbonate, and in the nonaqueous solvent, the ionic liquid contains a cation represented by Structural Formula (111) below and an anion represented by Structural Formula (H11) below.

[Chemical Formula 1]

(111)

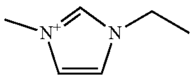

(H11)

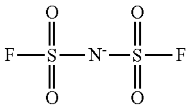

One embodiment of the present invention is a secondary battery which includes a positive electrode, a nonaqueous solvent, and a negative electrode, and in the secondary battery, the nonaqueous solvent contains an ionic liquid at greater than or equal to 50 vol % and less than or equal to 95 vol % and an organic solvent containing a fluorinated cyclic carbonate and the ionic liquid contains an imidazolium cation.

One embodiment of the present invention is a secondary battery which includes a positive electrode, a nonaqueous solvent, and a negative electrode, and in the secondary battery, the nonaqueous solvent contains an ionic liquid at greater than or equal to 70 vol % and less than or equal to 95 vol % and an organic solvent containing a fluorinated cyclic carbonate and the ionic liquid contains an imidazolium cation.

One embodiment of the present invention is the secondary battery in which the ionic liquid contains a cation represented by Structural Formula (111) below and an anion represented by Structural Formula (H11) below.

[Chemical Formula 2]

(111)

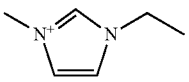

(H11)

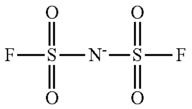

One embodiment of the present invention is the secondary battery in which the organic solvent contains a fluorinated cyclic carbonate represented by Structural Formula (H15) below.

[Chemical Formula 3]

(H15)

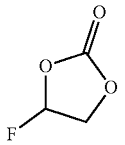

One embodiment of the present invention is the secondary battery in which the organic solvent contains a fluorinated cyclic carbonate represented by Structural Formula (H18) below.

[Chemical Formula 4]

(H18)

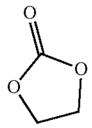

One embodiment of the present invention is a vehicle including the secondary battery of one embodiment of the present invention.

Effect of the Invention

The nonaqueous solvent of one embodiment of the present invention is preferred because of its low viscosity at low temperatures. The nonaqueous solvent of one embodiment of the present invention is preferred because it can have high heat resistance. Because of having the above low viscosity at low temperatures and the above high heat resistance, the nonaqueous solvent of one embodiment of the present invention can be used in a wide temperature range.

The nonaqueous solvent of one embodiment of the present invention can be used as an electrolyte solution in a secondary battery, in which case the secondary battery can be used in a wide temperature range. Moreover, the secondary battery can be included in a vehicle, in which case the vehicle can be used in a wide temperature range.

A nonaqueous solvent with high heat resistance is highly safe and preferable. A secondary battery including the nonaqueous solvent of one embodiment of the present invention as an electrolyte solution is also highly safe and preferable. In addition, a vehicle including the secondary battery is also highly safe and preferable.

Effects and the like other than the above-described effects will be apparent from the description of embodiments.

The description relating to the above effects does not disturb the existence of other effects. Other effects will be apparent from and can be derived from the description of the specification, the drawings, the claims, and the like. Furthermore, one embodiment of the present invention does not have to have all of the above effects.

BRIEF DESCRIPTION OF THE DRAWINGS

FIG. 2A, FIG. 2B, and FIG. 2C are diagrams showing solvation energy of organic solvents and the like.

FIG. 3 is a diagram showing solvation energy of organic solvents and the like.

FIG. 4 is a diagram showing solvation energy of organic solvents and the like.

MODE FOR CARRYING OUT THE INVENTION

Figure 1:
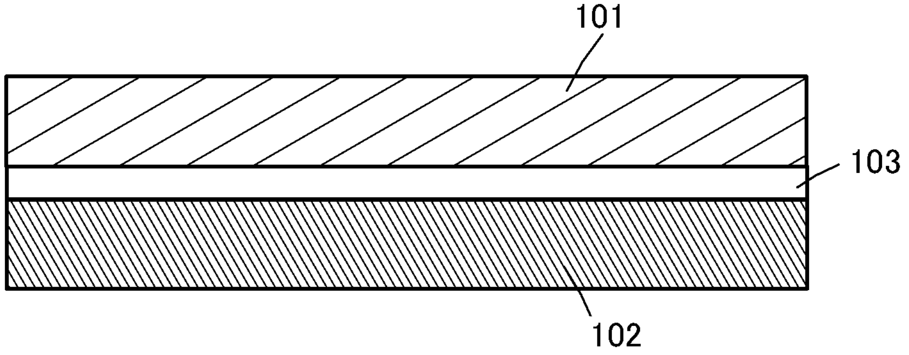
FIG. 1 is a diagram showing a mode of a secondary battery.

Embodiments of the present invention are described in detail below with reference to the drawings. Note that the present invention is not limited to the following description, and it is readily understood by those skilled in the art that modes and details of the present invention can be modified in various ways. In addition, the present invention should not be construed as being limited to the description of the embodiments below.

Embodiment 1

In this embodiment, a nonaqueous solvent of one embodiment of the present invention is described.

In the nonaqueous solvent of one embodiment of the present invention, at least an ionic liquid and an organic solvent are mixed. The proportion of the ionic liquid in the entire nonaqueous solvent is greater than or equal to 50 vol %, preferably greater than or equal to 50 vol % and less than or equal to 95 vol %, further preferably greater than or equal to 70 vol % and less than or equal to 90 vol %, still further preferably greater than or equal to 85 vol % and less than or equal to 90 vol %. The nonaqueous solvent containing the ionic liquid in this proportion can have high heat resistance or non-flammability. Since the nonaqueous solvent has high heat resistance or non-flammability and has high carrier ion conductivity even at low temperatures, the nonaqueous solvent can be used in a wide temperature range. When the nonaqueous solvent is used as an electrolyte solution of a secondary battery, it is possible to provide a secondary battery usable in a wide temperature range. When the secondary battery is included in a vehicle, it is possible to provide a vehicle usable in a wide temperature range.

The viscosity of the nonaqueous solvent of one embodiment of the present invention at 20° C. is greater than or equal to 10 mPa·s and less than or equal to 95 mPa·s, preferably greater than or equal to 45 mPa·s and less than or equal to 85 mPa·s, further preferably greater than or equal to 50 mPa·s and less than or equal to 65 mPa·s. The viscosity of the nonaqueous solvent of one embodiment of the present invention at −15° C. is greater than or equal to 200 mPa·s and less than or equal to 600 mPa·s, preferably greater than or equal to 300 mPa·s and less than or equal to 500 mPa·s. The nonaqueous solvent is preferred because of having low viscosity even at low temperatures. The nonaqueous solvent with low viscosity is preferred because of its high carrier ion conductivity, e.g., high lithium ion conductivity.

<Ionic Liquid>

The ionic liquid of one embodiment of the present invention is described. The ionic liquid, which is sometimes referred to as a room temperature molten salt, contains a cation and an anion. The basic skeleton of the cation is an imidazolium-based skeleton, an ammonium-based skeleton, a pyrrolidinium-based skeleton, a piperidinium-based skeleton, a pyridinium-based skeleton, a phosphonium-based skeleton, or the like. An ionic liquid in which the basic skeleton of a cation is an imidazolium-based skeleton has lower viscosity than an ionic liquid with an ammonium-based skeleton. Low viscosity tends to increase carrier ion conductivity. In addition, the physical property such as viscosity can be controlled with an alkyl group of a side chain of the cation or the like.

<Anion>

The anion in the ionic liquid of one embodiment of the present invention is described. As examples of the anion, a halide ion, tetrafluoroborate, hexafluorophosphate, bis(trifluoromethylsulfonyl)amide, bis(fluorosulfonyl)imide, and the like can be given.

Specifically, as the anion, one or more of a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, a perfluoroalkylphosphate anion, a tetrafluoroborate anion, and the like can be used.

A monovalent amide-based anion is represented by a general formula $(C_nF_{2n+1}SO_2)_2N^-$ (n is greater than or equal to 0 and less than or equal to 3).

When n is 0, the above general formula represents a bis(fluorosulfonyl)imide anion, which is represented by Structural Formula (H11). A bis(fluorosulfonyl)imide anion is abbreviated as FSI or FSA.

[Chemical Formula 5]

(H11)

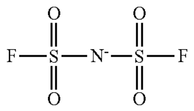

When n is 1, the above general formula represents a bis(trifluoromethanesulfonyl)imide anion, which is represented by Structural Formula (H12). A bis(trifluoromethanesulfonyl)imide anion is abbreviated as TFSI or TFSA.

[Chemical Formula 6]

(H12)

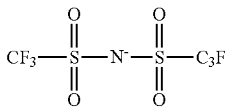

An example of a monovalent cyclic amide-based anion is a 4,4,5,5-tetrafluoro-1,3,2-dithiazolidine tetraoxide anion, which is represented by Structural Formula (H13).

[Chemical Formula 7]

(H13)

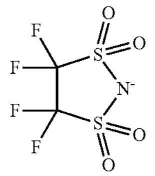

A monovalent methide-based anion is represented by a general formula $(C_nF_{2n+1}SO_2)_3C^-$ (n is greater than or equal to 0 and less than or equal to 3).

An example of a monovalent cyclic methide-based anion is 4,4,5,5-tetrafluoro-2-[(trifluoromethyl)sulfonyl]-1,3-dithiolane tetraoxide anion, which is represented by Structural Formula (H14).

[Chemical Formula 8]

(H14)

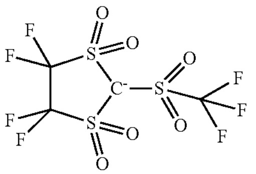

A fluoroalkylsulfonate anion is represented by a general formula $(C_mF_{2m+1}SO_3)^-$ (m is greater than or equal to 0 and less than or equal to 4).

When m is 0, the above general formula represents a fluorosulfonate anion; when m is 1, 2, 3, or 4, the above general formula represents a perfluoroalkylsulfonate anion.

A fluoroalkylborate anion is represented by a general formula $\{BF_n(C_mH_kF_{2m+1-k})_{4-n}\}^-$ (n is greater than or equal to 0 and less than or equal to 3, m is greater than or equal to 1 and less than or equal to 4, and k is greater than or equal to 0 and less than or equal to 2m).

A fluoroalkylphosphate anion is represented by a general formula $\{PF_n(C_mH_kF_{2m+1-k})_{6-n}\}^-$ (n is greater than or equal to 0 and less than or equal to 5, m is greater than or equal to 1 and less than or equal to 4, and k is greater than or equal to 0 and less than or equal to 2m).

One or more of these anions can be used.

<General Formula of Cation>

The cation in the ionic liquid of one embodiment of the present invention is described.

The ionic liquid of one embodiment of the present invention contains an imidazolium-based cation represented by General Formula (G1). In General Formula (G1), $A^-$ is any one of the above-described anions and is preferably an FSI anion, a TFSI anion, or the like.

[Chemical Formula 9]

(G1)

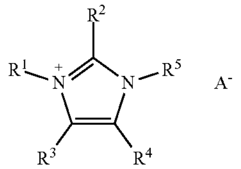

In General Formula (G1) above, $R^1$ represents an alkyl group having 1 to 10 carbon atoms, $R^2$ to $R^4$ each independently represent a hydrogen atom or an alkyl group having 1 to 4 carbon atoms, and $R^5$ represents an alkyl group having 1 to 6 carbon atoms or an ether group, a thioether group, or a siloxane having a main chain composed of two or more selected from C, O, Si, N, S, and P atoms. In General Formula (G1) above, $A^-$ is preferably an FSI anion, a TFSI anion, or the like.

An ionic liquid of one embodiment of the present invention contains a pyridinium-based cation represented by General Formula (G2). In General Formula (G2), $A^-$ represents any one of the above-described anions and is preferably an FSI anion, a TFSI anion, or the like.

[Chemical Formula 10]

(G2)

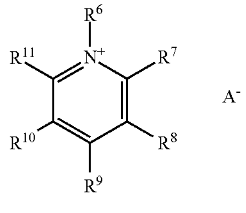

In General Formula (G2) above, $R^6$ represents an alkyl group having 1 to 6 carbon atoms, a main chain composed of two or more selected from C, O, Si, N, S, and P atoms, or the like. $R^7$ to $R^{11}$ each independently represent a hydrogen atom or an alkyl group having 1 to 4 carbon atoms. Furthermore, $R^8$ or $R^9$ represents a hydroxyl group in some cases. In General Formula (G2) above, $A^-$ represents any one of the above-described anions and is preferably an FSI anion, a TFSI anion, or the like.

An ionic liquid of one embodiment of the present invention may contain a quaternary ammonium cation. For example, a quaternary ammonium cation represented by General Formula (G3) is contained. In General Formula (G3), $A^-$ represents any one of the above-described anions and is preferably an FSI anion, a TFSI anion, or the like.

[Chemical Formula 11]

(G3)

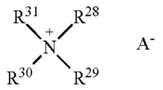

In General Formula (G3) above, $R^{28}$ to $R^{31}$ each independently represent an alkyl group having 1 to 20 carbon atoms, a methoxy group, a methoxymethyl group, a methoxyethyl group, or a hydrogen atom. In General Formula (G3) above, A-represents any one of the above-described anions and is preferably an FSI anion, a TFSI anion, or the like.

An ionic liquid of one embodiment of the present invention contains a cation represented by General Formula (G4). In General Formula (G4), $A^-$ represents any one of the above-described anions and is preferably an FSI anion, a TFSI anion, or the like.

[Chemical Formula 12]

(G4)

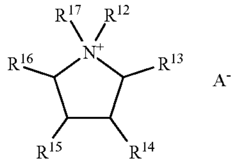

In General Formula (G4) above, $R^{12}$ and $R^{17}$ each independently represent an alkyl group having 1 to 3 carbon atoms. $R^{13}$ to $R^{16}$ each independently represent any of a hydrogen atom and an alkyl group having 1 to 3 carbon atoms. In General Formula (G4) above, $A^-$ represents any one of the above-described anions and is preferably an FSI anion, a TFSI anion, or the like.

An ionic liquid of one embodiment of the present invention contains a cation represented by General Formula (G5). In General Formula (G5), $A^-$ represents any one of the above-described anions and is preferably an FSI anion, a TFSI anion, or the like.

[Chemical Formula 13]

(G5)

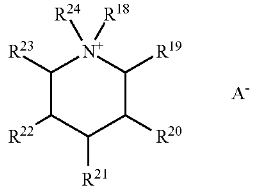

In General Formula (G5) above, $R^{18}$ and $R^{24}$ each independently represent an alkyl group having 1 to 3 carbon atoms. $R^{19}$ to $R^{23}$ each independently represent a hydrogen atom or an alkyl group having 1 to 3 carbon atoms. In General Formula (G5) above, $A^-$ represents any one of the above-described anions and is preferably an FSI anion, a TFSI anion, or the like.

An ionic liquid of one embodiment of the present invention contains a cation represented by General Formula (G6). In General Formula (G6), $A^-$ represents the above-described anion and is preferably an FSI anion, a TFSI anion, or the like.

[Chemical Formula 14]

(G6)

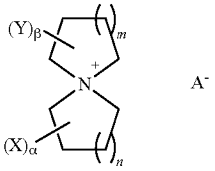

In General Formula (G6) above, n and m are each greater than or equal to 1 and less than or equal to 3, a is greater than or equal to 0 and less than or equal to 6, p is greater than or equal to 0 and less than or equal to 6, and X or Y represents, as a substituent, a linear or side-chain alkyl group having 1 to 4 carbon atoms, a linear or side-chain alkoxy group having 1 to 4 carbon atoms, or a linear or side-chain alkoxyalkyl group having 1 to 4 carbon atoms. In General Formula (G6) above, $A^-$ represents the above-described anion and is preferably an FSI anion, a TFSI anion, or the like.

An ionic liquid of one embodiment of the present invention contains a tertiary sulfonium cation represented by General Formula (G7). In General Formula (G7), $A^-$ represents the above-described anion and is preferably an FSI anion, a TFSI anion, or the like.

[Chemical Formula 15]

(G7)

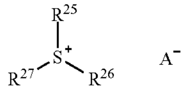

In General Formula (G7) above, $R^{25}$ to $R^{27}$ each independently represent a hydrogen atom, an alkyl group having 1 to 4 carbon atoms, or a phenyl group. Furthermore, $R^{25}$ to $R^{27}$ each independently represent a main chain composed of two or more selected from C, O, Si, N, S, and P atoms, or the like. In General Formula (G7), $A^-$ represents the above-described anion and is preferably an FSI anion, a TFSI anion, or the like.

An ionic liquid of one embodiment of the present invention contains a quaternary phosphonium cation represented by General Formula (G8) below. In General Formula (G8), A represents the above-described anion and is preferably an FSI anion, a TFSI anion, or the like.

[Cheimcal Formula 16]

(G8)

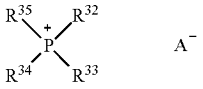

In General Formula (G8) above, $R^{32}$ to $R^{35}$ each independently represent a hydrogen atom, an alkyl group having 1 to 4 carbon atoms, or a phenyl group. Furthermore, $R^{32}$ to $R^{35}$ each independently represent a main chain composed of two or more selected from C, O, Si, N, S, and P atoms, or the like. In General Formula (G8), $A^-$ represents the above-described anion and is preferably an FSI anion, a TFSI anion, or the like.

<Cation>

Specific examples of the cation represented by General Formula (G1) above include Structural Formula (111) to Structural Formula (174). Structural Formula (111) represents a 1-ethyl-3methyl imidazolium cation, which is abbreviated as EMI. Structural Formula (113) represents a 1-butyl-3methyl imidazolium cation, which is abbreviated as BMI.

[Chemical Formula 17]

(111)

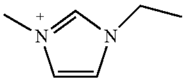

(112)

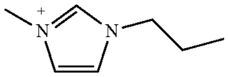

(113)

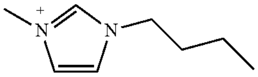

(114)

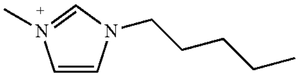

(115)

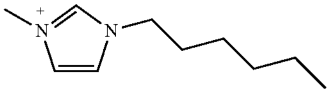

(116)

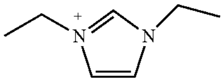

(117)

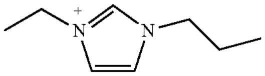

(118)

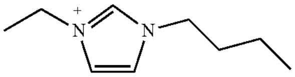

(119)

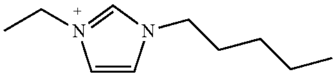

(120)

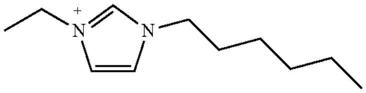

(121)

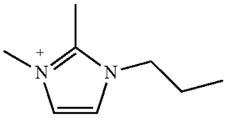

-continued (122)

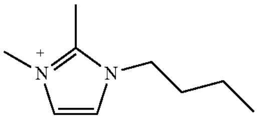

(123)

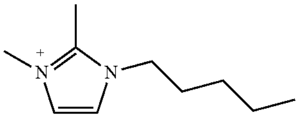

(124)

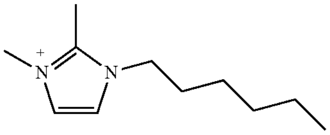

[Chemical Formula 18]

(125)

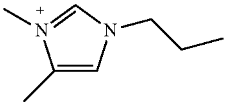

(126)

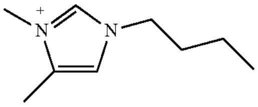

(127)

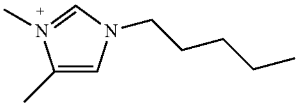

(128)

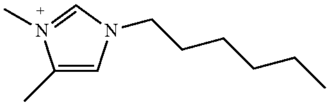

(129)

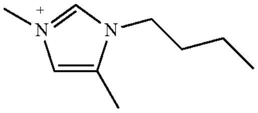

(130)

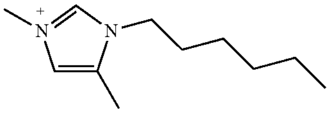

(131)

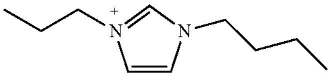

(132)

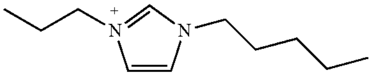

(133)

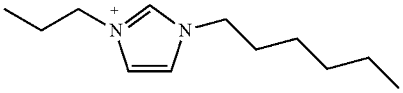

-continued
(134)
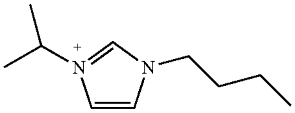
(135)
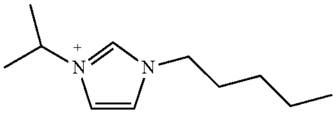
(136)
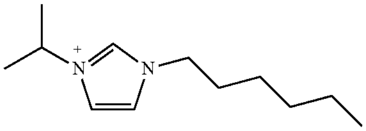
[Chemical Formula 19]
(137)
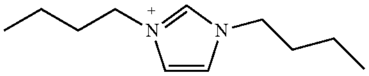
(138)
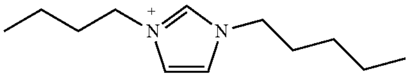
(139)
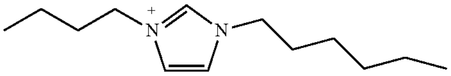
(140)
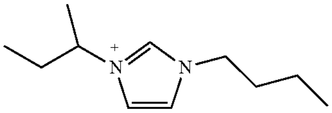
(141)
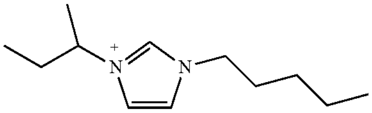
(142)
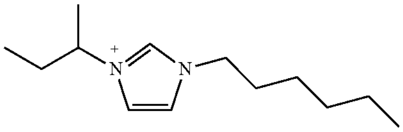
(143)
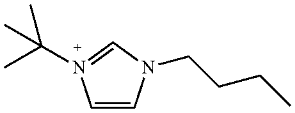
(144)
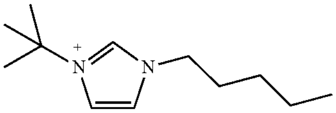
(145)
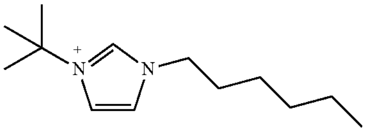
-continued
[Chemical Formula 20]
(146)
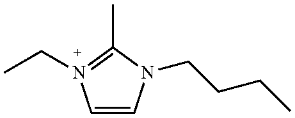
(147)
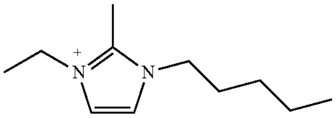
(148)
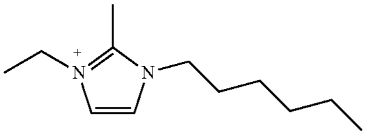
(149)
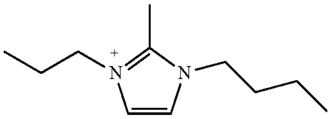
(150)
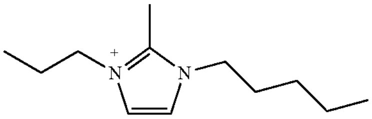
(151)
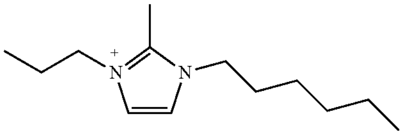
(152)
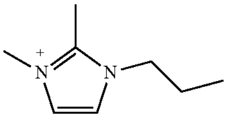
(153)
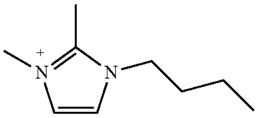
(154)
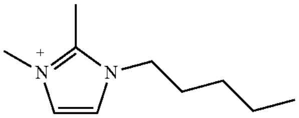
(155)
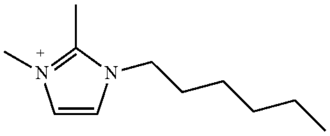
[Chemical Formula 21]
(156)
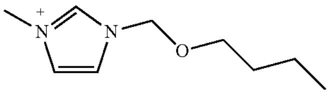

-continued
(157)
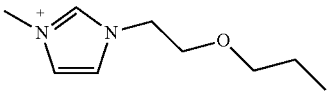
(158)
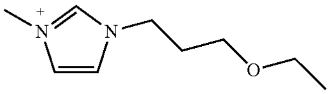
(159)
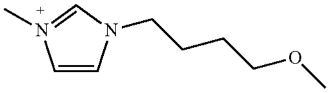
(160)
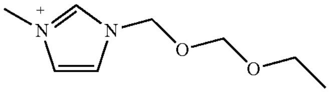
(161)
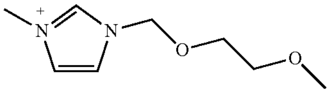
(162)
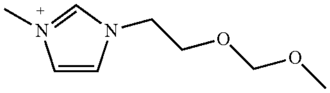
(163)
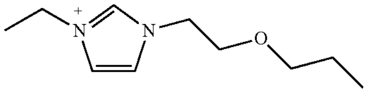
(164)
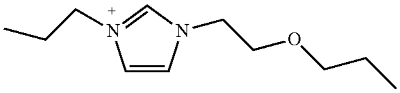
(165)
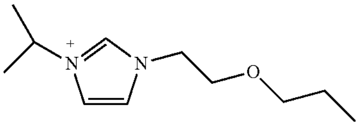
[Chemical Formula 22]
(166)
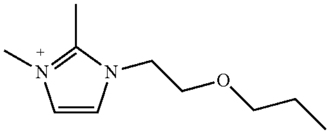
(167)
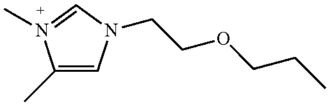
(168)
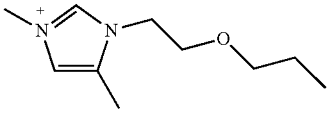
-continued
(169)
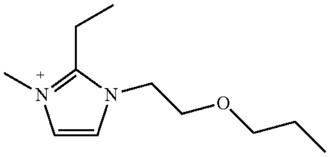
(170)
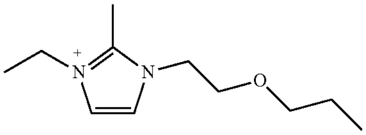
(171)
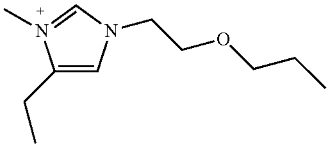
(172)
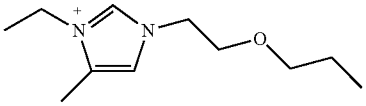
(173)
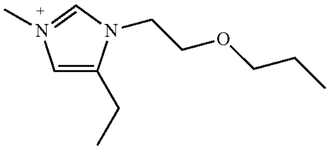
(174)
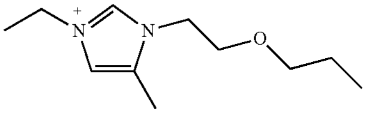
Specific examples of the cation represented by General Formula (G2) above include Structural Formula (701) to Structural Formula (719).
[Chemical Formula 23]
(701)
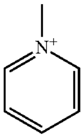
(702)
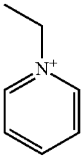

-continued
(703)
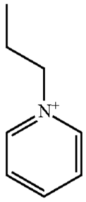
(704)
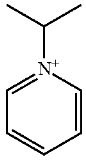
(705)
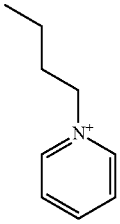
(706)
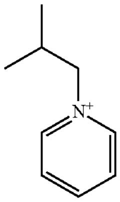
(707)
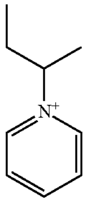
(708)
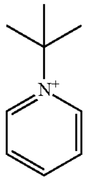
(709)
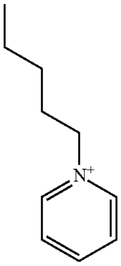
-continued
(710)
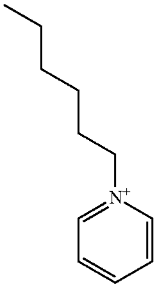
[Chemical Formula 24]
(711)
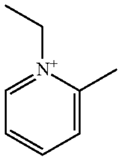
(712)
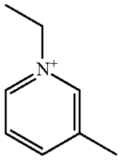
(713)
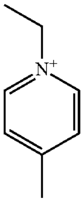
(714)
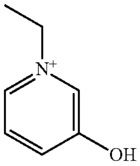
(715)
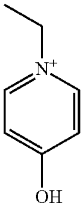
(716)
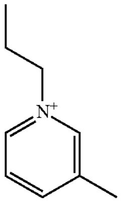

-continued
(717)
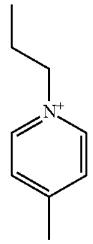
(718)
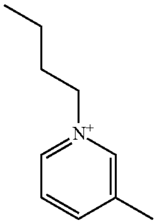
(719)
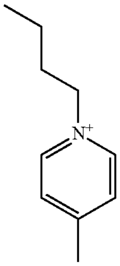
Specific examples of the cation represented by General Formula (G4) above include Structural Formula (501) to Structural Formula (520).
[Chemical Formula 25]
(501)
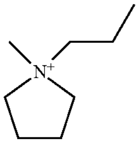
(502)
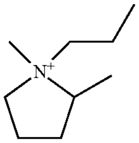
(503)
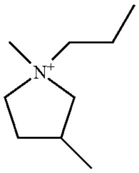
(504)
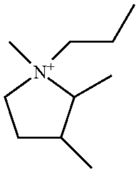
-continued
(505)
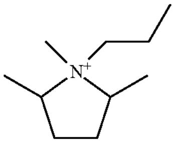
(506)
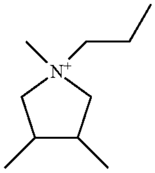
(507)
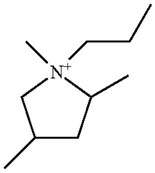
(508)
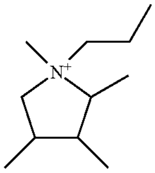
(509)
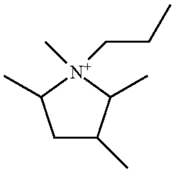
(510)
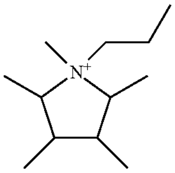
(511)
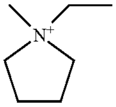
(512)
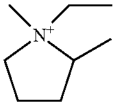
(513)
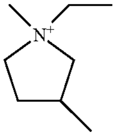
(514)
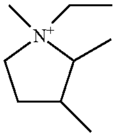

-continued
(515)
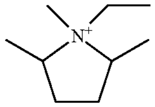
(516)
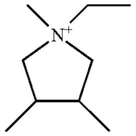
(517)
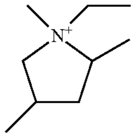
(518)
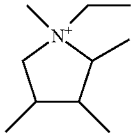
(519)
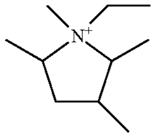
(520)
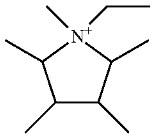
Specific examples of the cation represented by General Formula (G5) above include Structural Formula (601) to Structural Formula (630).
[Chemical Formula 26]
(601)
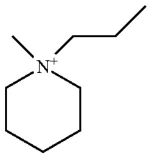
(602)
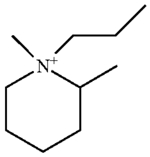
(603)
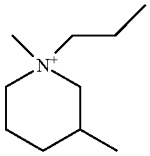
-continued
(604)
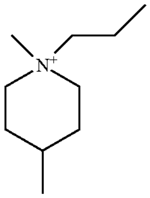
(605)
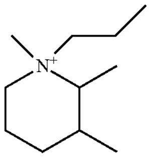
(606)
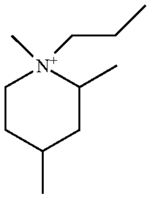
(607)
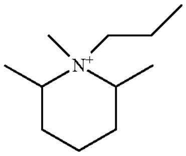
(608)
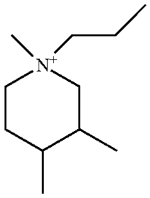
(609)
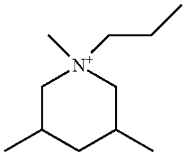
(610)
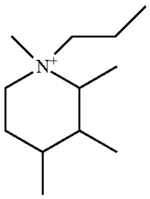
(611)
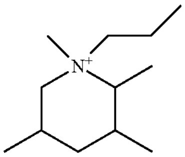

-continued
(612)
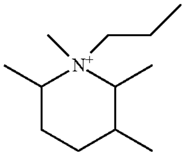
(613)
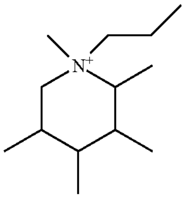
(614)
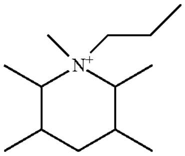
(615)
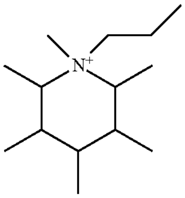
[Chemical Formula 27]
(616)
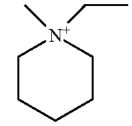
(617)
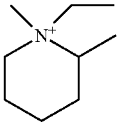
(618)
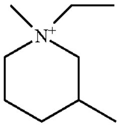
(619)
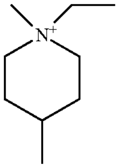
(620)
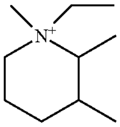
-continued
(621)
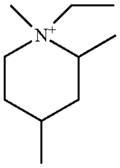
(622)
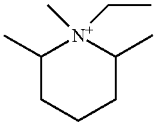
(623)
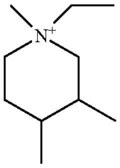
(624)
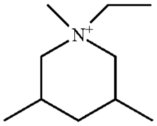
(625)
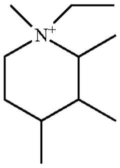
(626)
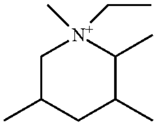
(627)
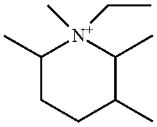
(628)
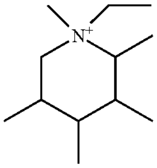
(629)
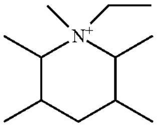
(630)
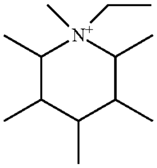

Specific examples of the cation represented by General Formula (G6) above include Structural Formula (301) to Structural Formula (309) and Structural Formula (401) to Structural Formula (419).
[Chemical Formula 28]
(301)
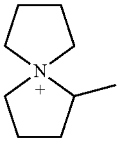
(302)
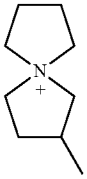
(303)
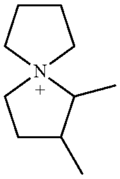
(304)
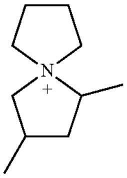
(305)
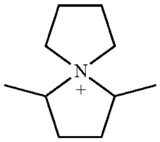
(306)
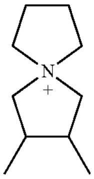
(307)
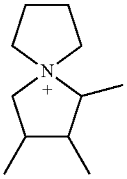
(308)
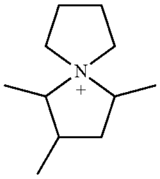
-continued
(309)
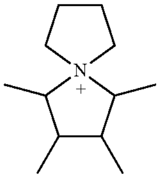
[Chemical Formula 29]
(401)
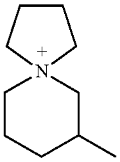
(402)
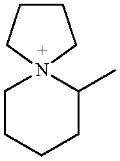
(403)
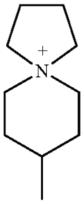
(404)
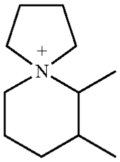
(405)
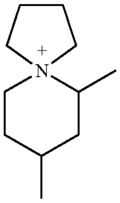
(406)
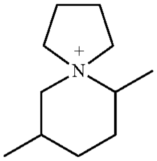
(407)
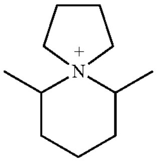

-continued (408)

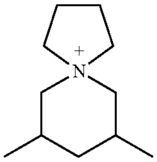

(409)

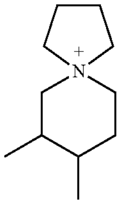

(410)

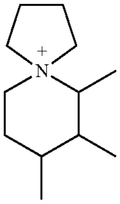

(411)

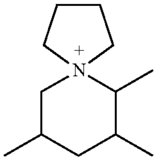

(412)

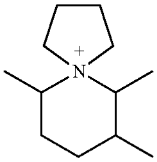

(413)

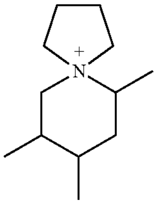

(414)

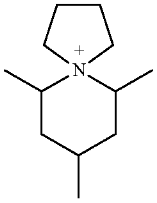

(415)

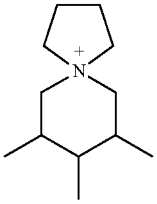

-continued (416)

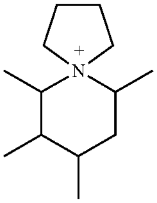

(417)

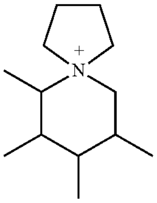

(418)

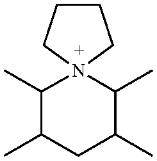

(419)

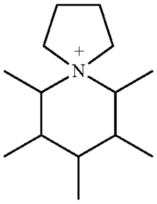

Although Structural Formula (301) to Structural Formula (309) and Structural Formula (401) to Structural Formula (419) each show an example in which m is 1 in General Formula (G6), m may be changed into 2 or 3 in Structural Formula (301) to Structural Formula (309) and Structural Formula (401) to Structural Formula (419).

Specific examples of the cation represented by General Formula (G7) above include Structural Formula (201) to Structural Formula (215).

[Chemical Formula 30]

(201)

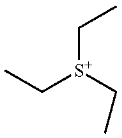

(202)

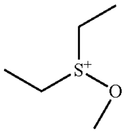

(203)

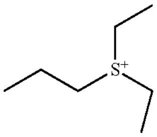

-continued (204)

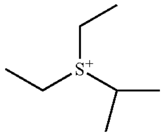

(205)

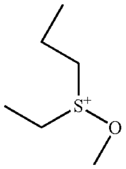

(206)

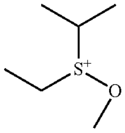

(207)

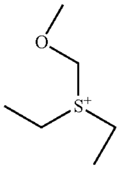

(208)

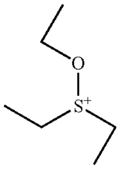

(209)

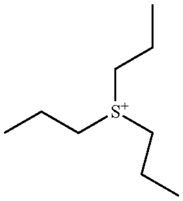

(210)

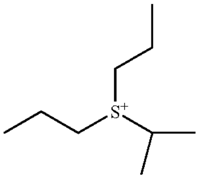

(211)

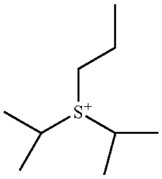

(212)

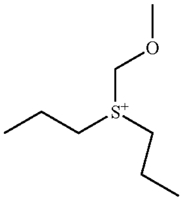

-continued (213)

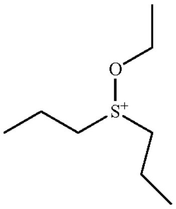

(214)

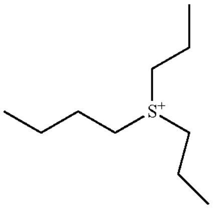

(215)

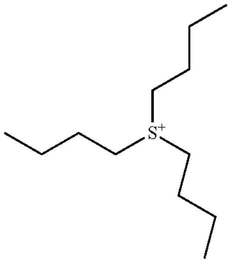

Such an ionic liquid is a liquid consisting only of ions, thereby having strong electrostatic interaction, nonvolatility, thermal stability, and high heat resistance. A secondary battery including the ionic liquid as an electrolyte solution does not catch fire in its usable temperature range and is highly safe.

<Organic Solvent>

The organic solvent of one embodiment of the present invention is described. The organic solvent contains a fluorinated carbonate ester, a cyclic carbonate, or the like.

Examples of a fluorinated carbonate ester include a fluorinated cyclic carbonate. A fluorinated cyclic carbonate has a high flash point and can enhance the safety of a secondary battery.

As a fluorinated cyclic carbonate, a fluorinated ethylene carbonate such as monofluoroethylene carbonate (fluoroethylene carbonate, FEC, or F1EC), difluoroethylene carbonate (DFEC or F2EC), trifluoroethylene carbonate (F3EC), or tetrafluoroethylene carbonate (F4EC) or the like can be used. Note that DFEC has isomers such as a cis-4,5 isomer and a trans-4,5 isomer.

One of fluorinated cyclic carbonates of embodiments of the present invention is monofluoroethylene carbonate, which is represented by Structural Formula (H15). Monofluoroethylene carbonate is abbreviated as FEC.

[Chemical Formula 31]

(H15)

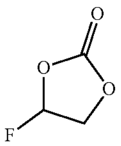

One of fluorinated cyclic carbonates of embodiments of the present invention is tetrafluoroethylene carbonate, which is represented by Structural Formula (H16). Tetrafluoroethylene carbonate is abbreviated as F4EC.

[Chemical Formula 32]

(H16)

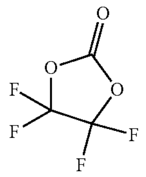

One of fluorinated cyclic carbonates of embodiments of the present invention is difluoroethylene carbonate, which is represented by Structural Formula (H17). Difluoroethylene carbonate is abbreviated as F2EC.

[Chemical Formula 33]

(H17)

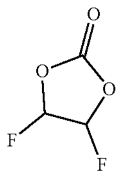

Although fluorinated cyclic carbonates are described, a cyclic carbonate having a cyano group can also be used for the organic solvent of one embodiment of the present invention. The cyano group or the fluoro group of the fluorinated cyclic carbonate is also referred to as an electron-withdrawing group.

The nonaqueous solvent of one embodiment of the present invention may include one kind or two or more kinds of the fluorinated cyclic carbonates described above in addition to the ionic liquid. The nonaqueous solvent of one embodiment of the present invention may include a cyclic carbonate having a cyano group in addition to the ionic liquid. Such a structure is further preferable because of its high carrier ion conductivity. Note that in the present invention, the organic solvent such as a fluorinated cyclic carbonate is contained at greater than 5 vol % in the entire nonaqueous solvent and is not an additive contained in a small quantity.

The cyclic carbonate of one embodiment of the present invention contains an ethylene carbonate-based compound represented by General Formula (G9).

[Chemical Formula 34]

(G9)

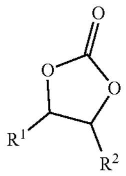

In General Formula (G9) above, $R^1$ and $R^2$ each independently represent a hydrogen atom, a fluoro group, a cyano group, and a fluorinated alkyl group having 1 to 5 carbon atoms. In no case do both $R^1$ and $R^2$ represent a hydrogen atom. At least one of $R^1$ and $R^2$ is preferably an electron-withdrawing group, examples of which include $-^{+}NH_3$, $-CF_3$, and $-CCl_3$.

One of cyclic carbonates of embodiments of the present invention is ethylene carbonate, which is represented by Structural Formula (H18). Ethylene carbonate is abbreviated as EC.

[Chemical Formula 35]

(H18)

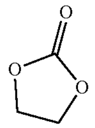

One of linear carbonates is dimethyl carbonate, which is represented by Structural Formula (H19). Dimethyl carbonate is abbreviated as DMC.

[Chemical Formula 36]

(H19)

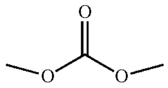

One of linear carbonates is ethyl methyl carbonate, which is represented by Structural Formula (H20). Ethyl methyl carbonate is abbreviated as EMC.

[Chemical Formula 37]

(H20)

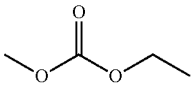

One of linear carbonates is diethyl carbonate, which is represented by Structural Formula (H21). Diethyl carbonate is abbreviated as DEC.

[Chemical Formula 38]

(H21)

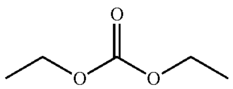

In the nonaqueous solvent of one embodiment of the present invention, at least the above-described ionic liquid and the above-described organic solvent are mixed. The proportion of the ionic liquid in the entire nonaqueous solvent is greater than or equal to 50 vol %, preferably greater than or equal to 50 vol % and less than or equal to 95 vol %, further preferably greater than or equal to 70 vol % and less than or equal to 90 vol %, still further preferably greater than or equal to 85 vol % and less than or equal to 90 vol %. The nonaqueous solvent containing the ionic liquid in this proportion can have high heat resistance. Since the nonaqueous solvent has high heat resistance and high carrier ion conductivity at low temperatures, a nonaqueous solvent usable in a wide temperature range can be provided.

<Lithium Salt>

A lithium salt dissolved in the nonaqueous solvent of one embodiment of the present invention is preferably a lithium salt containing a halogen, further preferably a fluorine-containing imide lithium salt. As the fluorine-containing imide lithium salt, $Li(CF_3SO_2)_2N$ (hereinafter sometimes referred to as "LiTFSI" or "LiTFSA"), $Li(C_2F_5SO_2)_2N$ (hereinafter sometimes referred to as "LiBETI"), $LiN(SO_2F)_2N$ (hereinafter sometimes referred to as "LiFSI" or "LiFSA"), or the like can be used.

As another lithium salt containing a halogen, $LiPF_6$, $LiBF_4$, $LiClO_4$, or the like can be used.

As another lithium salt containing no halogen, LiBOB (lithium bis(oxalate)borate) may be used.

The above-described lithium salts may be used alone or mixed to be used.

<Electrolyte Solution of Secondary Battery>

An exemplary mode is described in which the nonaqueous solvent of one embodiment of the present invention is used as an electrolyte solution of a secondary battery. FIG. 1 shows a conceptual diagram of a positive electrode active material layer 101, a negative electrode active material layer 102, and a separator 103 included in the secondary battery. The above nonaqueous solvent can be used as the electrolyte solution included in the positive electrode active material layer 101 or the negative electrode active material layer 102. In the positive electrode active material layer 101 or the negative electrode active material layer 102, the active material layer is impregnated with the electrolyte solution. Lower viscosity is preferred because it facilitates impregnation of the active material layer with the electrolyte solution.

Because of having low viscosity even at low temperatures and high heat resistance, the nonaqueous solvent of one embodiment of the present invention used as an electrolyte solution of a secondary battery makes it possible to provide a secondary battery usable in a wide temperature range.

A fluorinated carbonate ester, including a fluorinated cyclic carbonate, is preferably used for a nonaqueous solvent and the nonaqueous solvent is preferably used as an electrolyte solution of a secondary battery, in which case the interface resistance at an active material layer is low owing to the fluorinated carbonate ester being a fluorine-containing organic compound and the active material layer is easily impregnated with the electrolyte solution. This makes it possible to inhibit a crack in the active material that would be generated by a volume change at the time of charging and discharging of the secondary battery, and thereby brings about an effect of improving cycle performance.

Since the electrolyte solution of one embodiment of the present invention contains the ionic liquid at greater than or equal to 50 vol %, preferably greater than or equal to 50 vol % and less than or equal to 95 vol %, further preferably greater than or equal to 70 vol % and less than or equal to 90 vol %, still further preferably greater than or equal to 85 vol % and less than or equal to 90 vol %, the electrolyte solution is less volatile and is stable up to approximately 300° C. or any other temperature lower than the temperature at which a reaction such as decomposition occurs. The electrolyte solution of one embodiment of the present invention has high heat resistance and is usable at high temperatures by containing the ionic liquid. Improving the low temperature characteristics of the ionic liquid makes it possible to provide a secondary battery usable in a wide temperature range.

Owing to the electrolyte solution of one embodiment of the present invention, the secondary battery can be used in a wide temperature range, e.g., a range of −40° C. to 150° C., preferably a range of −40° C. to 85° C.

This embodiment can be used in appropriate combination with the other embodiments.

Embodiment 2

In this embodiment, the solvation energy of an organic solvent is described. The solvation energy of an organic solvent means the energy for bonding of the organic solvent to a lithium ion by the Coulomb force or the like. Such bonding is also called coordination.

Figure 2A:
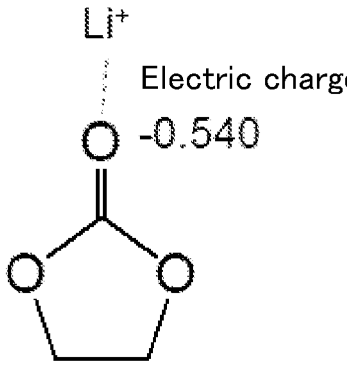
Figure 2B:
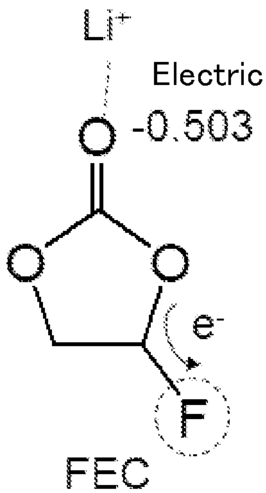
Figure 2C:
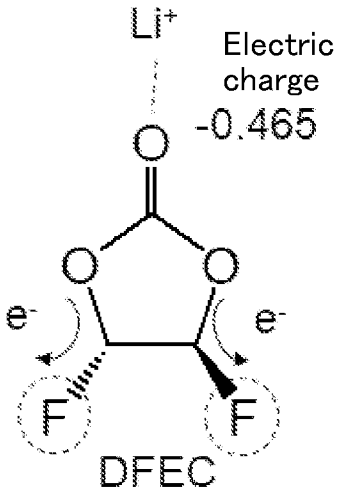

FIG. 2A to FIG. 2C show lithium ions and three kinds of organic solvents. FIG. 2A shows ethylene carbonate (EC), FIG. 2B shows monofluoroethylene carbonate (fluoroethylene carbonate or FEC), and FIG. 2C shows difluoroethylene carbonate (DFEC). FIG. 2 shows chemical formulae and results of calculating electric charge of oxygen atoms coordinated to the lithium ions. Note that Gaussian 09, a quantum chemistry computational program, was used for the calculation. As a functional, B3LYP was used, and as a basis function, 6-311G(d,p) was used.

FEC and DFEC are each a fluorine-containing organic compound that has a fluoro group. The electric charge of the oxygen atom coordinated to the lithium ion is small in each of FEC and DFEC, which is probably because the fluoro groups of FEC and DFEC withdraw electrons. Smaller electric charge of the oxygen atom practically means reduced electron density of the oxygen atom, and reduced electron density of oxygen probably leads to weakened Coulomb force between the lithium ion and the organic solvent. Accordingly, FEC and DFEC have low solvation energy. The low solvation energy means that low energy is required in releasing the lithium ion. In other words, low energy is probably required in transfer of lithium to an active material in a nonaqueous solvent. The low energy enables rapid charging and rapid discharging of a lithium ion secondary battery.

Figure 3:
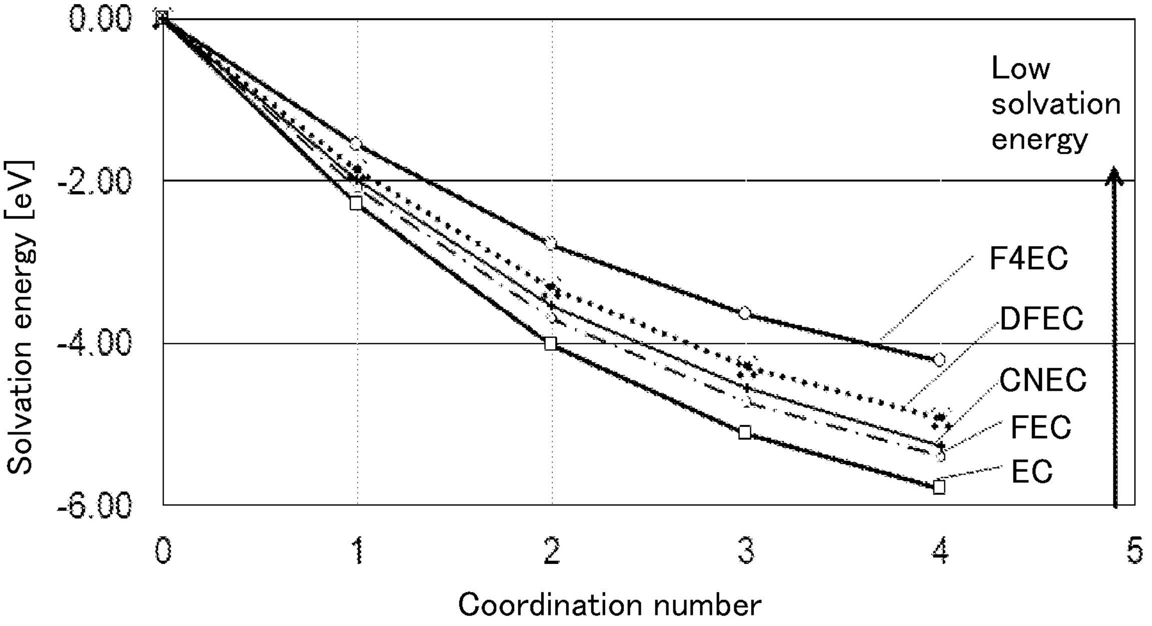

FIG. 3 shows the solvation energy (eV) of EC, FEC, DFEC, tetrafluoroethylene carbonate (F4EC), and cyclic carbonate (CNEC) having a cyano group with respect to the coordination number. The coordination number means the number of organic compounds of each kind coordinated to a lithium ion, which ranges from one to four. The solvation energy (eV) with respect to the coordination number was calculated. F4EC is an organic compound that contains more fluorine than DFEC; it is shown that the larger the number of fluorine atoms in an organic compound is, the closer to zero the solvation energy tends to be.

Figure 4:
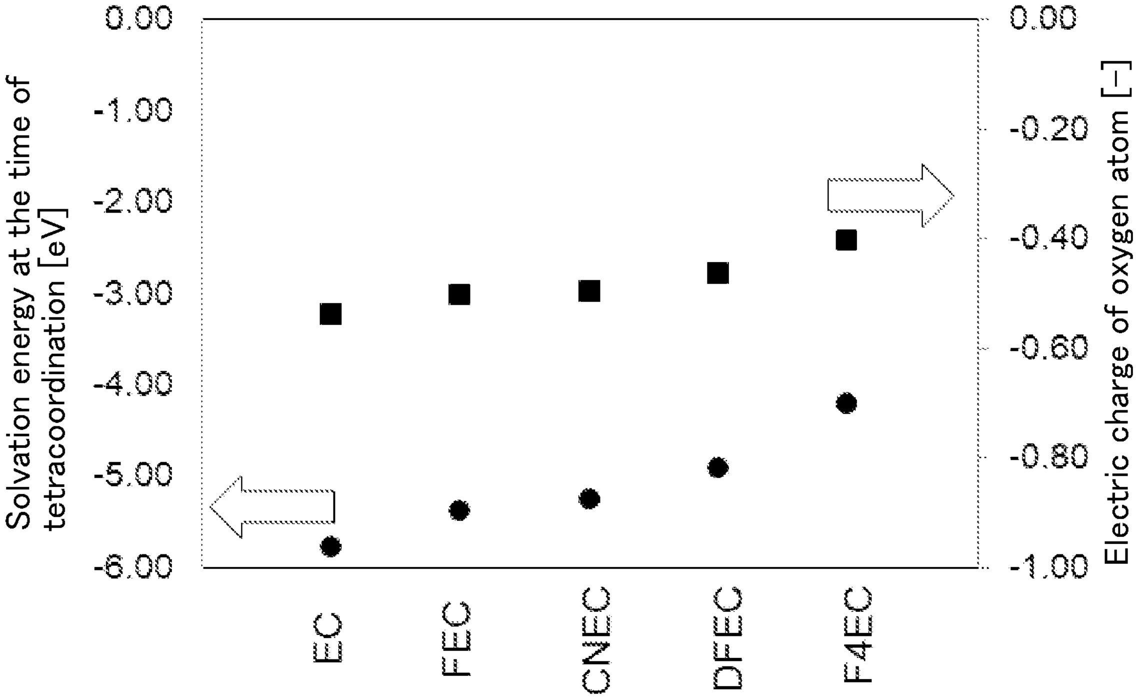

To examine whether a difference in solvation energy affects the Coulomb force between the lithium ion and the organic solvent, the electric charge of the oxygen atom coordinated to the lithium ion was analyzed. FIG. 4 shows the analysis results. FIG. 4 shows the solvation energy at the time of tetracoordination and the electric charge of the oxygen atom coordinated to the lithium ion in each organic compound. From FIG. 4, it is found that the solvation energy at the time of tetracoordination tends to become lower as the electric charge of the oxygen atom decreases.

From the above, it is found that when an organic compound containing many cyano groups or many fluoro groups, both of which are electron-withdrawing groups, is employed, the solvation energy is lowered and the interface resistance between the active material involved in desolvation and the organic solvent can be reduced.

Accordingly, by including an organic compound having a cyano group or a fluoro group as an organic solvent, a lithium ion secondary battery can operate at either low temperatures (higher than or equal to −40° C. and lower than 25° C.) or high temperatures (higher than or equal to 25° C. and lower than or equal to 85° C.).

Therefore, a nonaqueous solvent preferably contains an organic solvent having a cyano group or a fluoro group and an ionic liquid in one embodiment of the present invention.

This embodiment can be used in appropriate combination with the other embodiments.

Embodiment 3

In this embodiment, a laminated secondary battery is described.

<Laminated Secondary Battery>

Figure 5A:
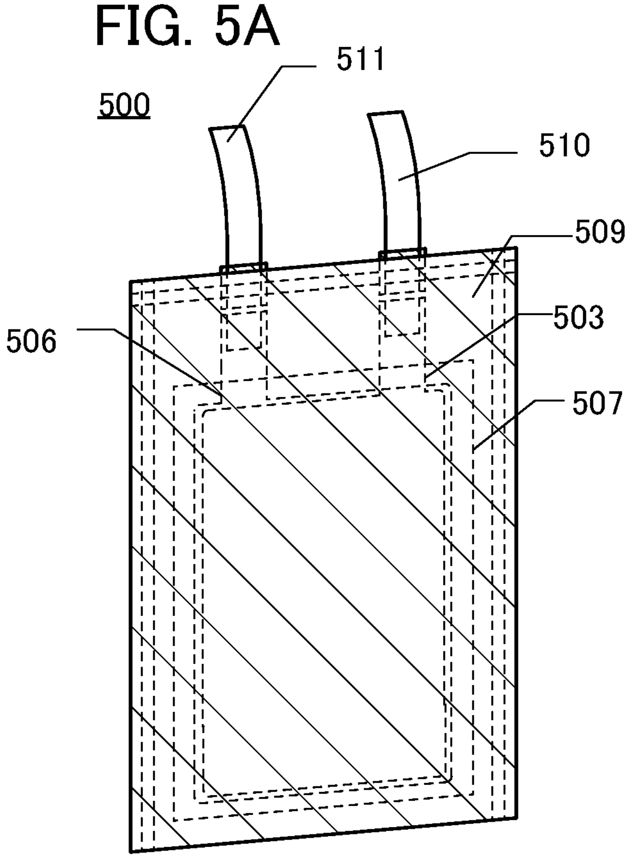
FIG. 5A and FIG. 5B are diagrams showing external appearance of a laminated secondary battery.
Figure 5B:
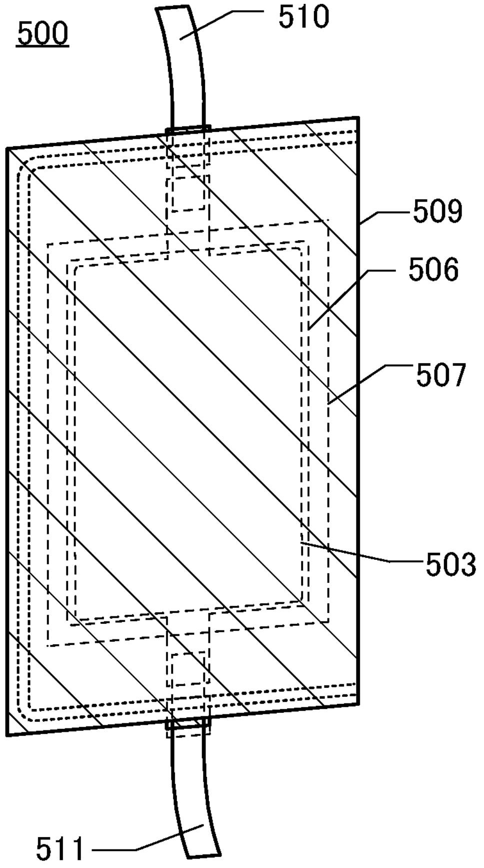

Description is made with reference to a laminated secondary battery. FIG. 5A and FIG. 5B each show an example of an external view of a laminated secondary battery 500. In FIG. 5A and FIG. 5B, a positive electrode 503, a negative electrode 506, a separator 507, an exterior body 509, a positive electrode lead electrode 510, and a negative electrode lead electrode 511 are included. The areas and the shapes of the tab regions included in the positive electrode and the negative electrode are not limited to the examples shown in FIG. 5A. Although the positive electrode lead electrode 510 and the negative electrode lead electrode 511 are provided on the same side of the exterior body 509 in FIG. 5A, the positive electrode lead electrode 510 and the negative electrode lead electrode 511 may be provided on opposite sides of the exterior body 509 as shown in FIG. 5B.

[Positive Electrode]

Figure 6A:
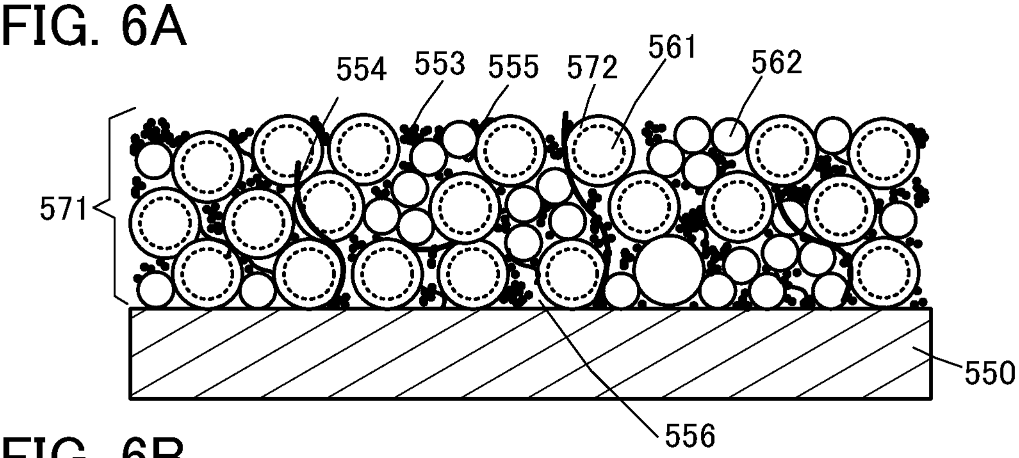
FIG. 6A, FIG. 6B, and FIG. 6C are diagrams showing cross sections of a positive electrode.

FIG. 6A shows an example of a cross-sectional view of the positive electrode 503. The positive electrode includes a positive electrode active material layer 571 over a positive electrode current collector 550. The positive electrode active material layer 571 includes a positive electrode active material 561, a positive electrode active material 562, a binder (binding agent) 555, conductive additives 553 and 554, and an electrolyte 556.

The electrolyte is a member in which ions generated through an oxidation-reduction reaction between the positive electrode active material and the negative electrode active material move, and preferably has high ionic conductivity. In this specification, the term "electrolyte" encompasses electrolytes in all states, including a liquid state, a solid state, a semisolid state, and a gel state. For example, an electrolyte in a liquid state is sometimes referred to as an electrolyte solution, and an electrolyte in a solid state is sometimes referred to as a solid electrolyte.

[Positive Electrode Active Material]

Although sometimes referred to as a positive electrode active material particle because of its form, the positive electrode active material 561 or the positive electrode active material 562 is in any of a variety of forms other than a particle form. The positive electrode active material 561 or the positive electrode active material 562 may be a primary particle having a plurality of crystallites, or a secondary particle that is an aggregate of primary particles. The particles to form a secondary particle are called primary particles.

As the positive electrode active material 561 or the positive electrode active material 562, a material into and from which carrier ions can be inserted and extracted can be used. As the carrier ions, lithium ions, sodium ions, potassium ions, calcium ions, strontium ions, barium ions, beryllium ions, or magnesium ions can be used.

Examples of the material into and from which lithium ions can be inserted and extracted include a lithium composite oxide with an olivine crystal structure, a layered rock-salt crystal structure, or a spinel crystal structure. For example, a lithium composite oxide with an olivine crystal structure is represented by $LiMPO_4$ (here, M includes one or more of Fe, Mn, Ni, and Co). Fe and Mn have excellent thermal stability and show promise for next-generation positive electrode materials. A lithium composite oxide with a layered rock-salt crystal structure is, for example, represented by $LiMO_2$ (here, M includes one or more of Fe, Mn, Ni, and Co). When M is Co, $LiMO_2$ is denoted as $LiCoO_2$, which is sometimes referred to as LCO and is sometimes called lithium cobalt oxide. In a lithium composite oxide with a layered rock-salt crystal structure, one or more selected from Fe, Mn, Ni, and Co may be contained as M. One containing Ni, Mn, and Co is represented by $LiNiCoMnO_2$, which is sometimes referred to as NCM. The ratio of Ni:Co:Mn may be any of 1:1:1 and the neighborhood thereof, 8:1:1 and the neighborhood thereof, and 5:2:3 and the neighborhood thereof. Besides, oxides such as $V_2O_5$ and $Nb_2O_5$ are studied as positive electrode materials. For example, examples of a lithium composite oxide with a spinel crystal structure include a lithium manganese spinel ($LiMn_2O_4$).

A lithium composite oxide may contain one or two or more elements selected from the group consisting of nickel, chromium, aluminum, iron, magnesium, molybdenum, zinc, zirconium, indium, gallium, copper, titanium, niobium, silicon, fluorine, phosphorus, and the like. A lithium composite oxide containing Ni, Mn, and Co and further containing aluminum is sometimes referred to as NCMA. A lithium composite oxide containing Ni and Co and further containing aluminum is sometimes referred to as NCA.

The average grain diameter of the positive electrode active material 561 is greater than or equal to 1 μm and less than or equal to 50 μm, preferably greater than or equal to 5 μm and less than or equal to 20 μm. When the positive electrode active material 561 is a ternary composite oxide such as NCM, the positive electrode active material 561 can be regarded as a secondary particle, and the average grain diameter of the secondary particle is preferably greater than or equal to 1 μm and less than or equal to 50 μm, further preferably greater than or equal to 5 μm and less than or equal to 20 μm.

The positive electrode active material 561 refers to a positive electrode active material having a larger average grain diameter than the positive electrode active material 562. The positive electrode active material 562 having a different particle size is further added in some cases to increase the filling density of the active material. "Having a different particle size" means having a different local maximum value of the average particle diameter. For example, the positive electrode active material 562 is a positive electrode active material having a smaller local maximum value of the average grain diameter than the positive electrode active material 561. The local maximum value of the average grain diameter of the positive electrode active material 562 is preferably greater than or equal to 1/10 and less than or equal to 1/6 of the local maximum value of the average grain diameter of the positive electrode active material 561. When the active materials with different particle sizes are mixed, the filling density of the active materials in the positive electrode active material layer 571 can be increased.

The charging density can be increased without the positive electrode active material 562. When the positive electrode active material 562 is not included, the number of manufacturing steps can be reduced and furthermore, the cost can be reduced.

The positive electrode active material 561 or the positive electrode active material 562 sometimes has a grain boundary positioned between crystallites.

The positive electrode active material 561 or the positive electrode active material 562 sometimes contains an added element in the vicinity of its surface. The vicinity of the surface includes a surface portion of the positive electrode active material 561 or the positive electrode active material 562. FIG. 6A shows a surface portion 572 of the positive electrode active material 561. In a cross-sectional view, the surface portion 572 extends 50 nm or less, preferably 35 nm or less, further preferably 20 nm or less, most preferably 10 nm or less inward from the surface of the positive electrode active material 561.

The added element is preferably unevenly distributed in the vicinity of the surface. Uneven distribution refers to a state where the added element exists non-uniformly or unevenly, and in this state, the concentration of the added element is higher in one region than another region. Uneven distribution is sometimes rephrased as segregation or precipitation.

Some kinds of added elements do not contribute to capacity as positive electrode active materials. Such an added element is preferably unevenly distributed in the vicinity of the surface of the positive electrode active material. The state where the added element is unevenly distributed can be checked from the fact that the added element exists at a higher concentration in the vicinity of the surface of the positive electrode active material than inside the positive electrode active material. The added element existing at least in the vicinity of the surface can hinder structural degradation at the time of charging and discharging, which inhibits the positive electrode active material from degrading.

A structure in which the surface portion 572 is provided with respect to the inside of an active material is sometimes referred to as a core-shell structure. The core-shell structure can also be applied to the positive electrode active material 562.

[Binder]

The binder 555 is provided to prevent the positive electrode active material 561 or the conductive additive 553 from slipping off from the positive electrode current collector 550. The binder 555 has a function of fixing the positive electrode active material 561 and the conductive additive 553 to each other. Thus, there are the binder 555 positioned to be in contact with the positive electrode current collector 550, the binder 555 positioned between the positive electrode active material 561 and the conductive additive 553, and the binder 555 positioned to be intertwined with the conductive additive 553.

The binder 555 contains a resin that is a high molecular material. When a lot of binder is contained, the proportion of the positive electrode active material 561 in the positive electrode active material layer 571 sometimes decreases. Such a decrease in the proportion of the positive electrode active material 561 leads to lowered discharge capacity of a secondary battery; thus, the mixed quantity of the binder 555 is minimized.

[Conductive Additive]

Since the positive electrode active material 561 is a composite oxide, it sometimes has high resistance. This makes it difficult to collect a current from the positive electrode active material 561 to the positive electrode current collector 550. In that case, the conductive additive 553 or the conductive additive 554 has a function of giving aid to a current path between the positive electrode active material 561 and the positive electrode current collector 550, a current path between a plurality of the positive electrode active materials 561, a current path between a plurality of positive electrode active materials and the positive electrode current collector 550, and the like. To have such a function, the conductive additive 553 or the conductive additive 554 is formed of a material having lower resistance than the positive electrode active material 561, and there are the conductive additive 553 or the conductive additive 554 that is positioned to be in contact with the positive electrode current collector 550 and the conductive additive 553 or the conductive additive 554 that is positioned in a gap of the positive electrode active material 561.

The conductive additive 553 is also referred to as a conductivity-imparting agent or a conductive material because of its function, and a carbon material or a metal material is used as the conductive additive 553. Examples of the carbon material used as the conductive additive 553 include carbon black (e.g., furnace black, acetylene black, or graphite). Carbon black has a smaller grain diameter than the positive electrode active material 561. Examples of a fibrous carbon material used as the conductive additive 554 include a carbon nanotube (CNT) and VGCF (registered trademark). Examples of a carbon material in sheet form used as the conductive additive 554 include multilayer graphene. In FIG. 6A, which is a cross section of the positive electrode, a carbon material in sheet form sometimes looks like a thread.

The conductive additive 553 in particle form can enter a gap of the positive electrode active material 561 and easily aggregates. Thus, the conductive additive 553 in particle form can give aid to a conductive path between positive electrode active materials provided close to each other (adjacent positive electrode active materials). Although having a bent region, the conductive additive 554 in fiber form or sheet form is larger than the positive electrode active material 561. The conductive additive 554 in fiber form or sheet form can thus give aid to not only a conductive path between adjacent positive electrode active materials but also a conductive path between positive electrode active materials located apart from each other. A particulate conductive additive, a fibrous conductive additive, and a sheet-shaped conductive additive are preferably mixed.

In the case where graphene is used as a sheet-shaped conductive additive and carbon black is mixed as a particulate conductive additive, the weight of carbon black is preferably greater than or equal to 1.5 times and less than or equal to 20 times, further preferably greater than or equal to twice and less than or equal to 9.5 times that of graphene in slurry.

When the mixing ratio between graphene and carbon black is in the above range, carbon black does not aggregate and is easily dispersed. When the mixing ratio between graphene and carbon black is in the above range, the electrode density can be higher than when only carbon black is used as a conductive additive. The higher electrode density can lead to higher capacity per unit weight and makes it possible to achieve higher capacity. Specifically, the density of the positive electrode active material layer measured by gravimetry can be higher than 3.5 g/cc.

A positive electrode in which graphene and carbon black mixed are used as conductive additives can cope with more rapid charging than a positive electrode in which only graphene is used as a conductive additive. Furthermore, it is preferable that the mixing ratio between graphene and carbon black be in the above range.

An example of a secondary battery included in a vehicle is a laminated secondary battery. The number of laminated secondary batteries is increased for higher capacity in an attempt to increase the vehicle's mileage. Accordingly, the laminated batteries increase the weight of the vehicle, which increases the energy necessary to move the vehicle. The mixing ratio between graphene and carbon black set within the above range makes it possible to extend the mileage without an increase in the number of laminated secondary batteries or a substantial change in the total weight of the vehicle.

When the secondary battery of the vehicle has high capacity, electric power is needed to charge the secondary battery and thus, the charging is desirably finished in a short time. The secondary battery included in the vehicle preferably has high capacity, in which case rapid charging can be performed in charging of the battery with power temporarily generated when the brake of the vehicle is applied, i.e., what is called regenerative charging.

The mixing ratio between graphene and carbon black set within the above range also enables rapid charging of a portable information terminal.

[Electrolyte]

As the electrolyte 556, a polymer gel electrolyte can also be used. When a polymer gel electrolyte is used, safety against liquid leakage and the like is improved. Moreover, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used. For example, a polymer having a polyalkylene oxide structure, such as polyethylene oxide (PEO), PVDF, polyacrylonitrile, or a copolymer containing any of them can be used. For example, PVDF-HFP, which is a copolymer of PVDF and hexafluoropropylene (HFP), can be used. The formed polymer may be porous.

[Electrolyte Solution]

As the electrolyte 556, an electrolyte solution can be included. The electrolyte solution contains at least the ionic liquid and organic solvent described in Embodiment 1 and Embodiment 2. The electrolyte solution of one embodiment of the present invention enables a secondary battery that can operate in a wide temperature range.

[Current Collector]

For the positive electrode current collector 550, metal foil containing aluminum, titanium, copper, nickel, or the like can be used. Slurry containing the positive electrode active material layer 571 is applied onto the metal foil and is dried to complete the positive electrode 503. The metal foil may be covered with a carbon material.

The slurry contains at least the positive electrode active material 561, the binder 555, and a solvent, and it is preferable that the conductive additive 553 or the conductive additive 554 be further mixed in this slurry. Slurry is sometimes referred to as slurry for an electrode or active material slurry; slurry for forming a positive electrode active material layer is sometimes referred to as slurry for a positive electrode, and slurry for forming a negative electrode active material layer is sometimes referred to as slurry for a negative electrode.

Figure 6B:
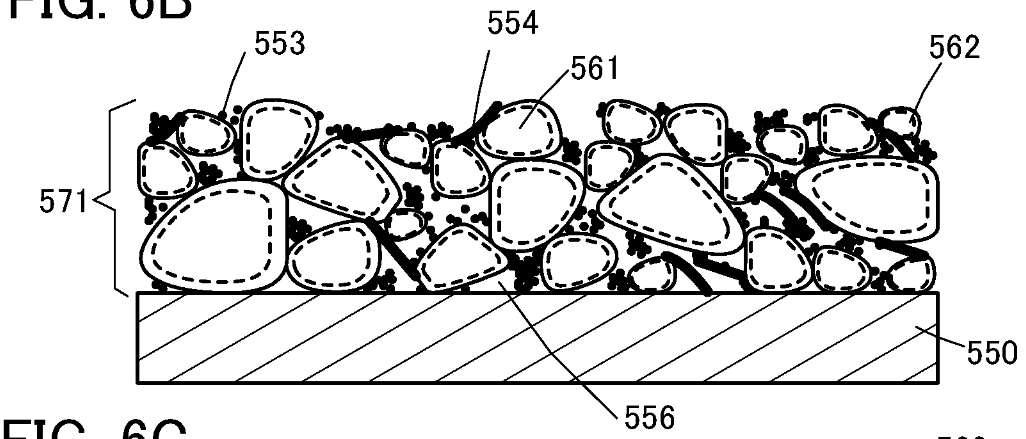

Although FIG. 6A shows the positive electrode active material 561 in particle form, the positive electrode active material 561 is not necessarily in particle form. As shown in FIG. 6B, the cross-sectional shape of the positive electrode active material 561 may be an ellipse, a rectangle, a trapezoid, a pyramid, a quadrilateral with rounded corners, or an asymmetrical shape. Note that by pressing in the manufacturing process of the positive electrode, the positive electrode active material in particle form sometimes changes in shape to have the shape as shown in FIG. 6B.

Figure 6C:
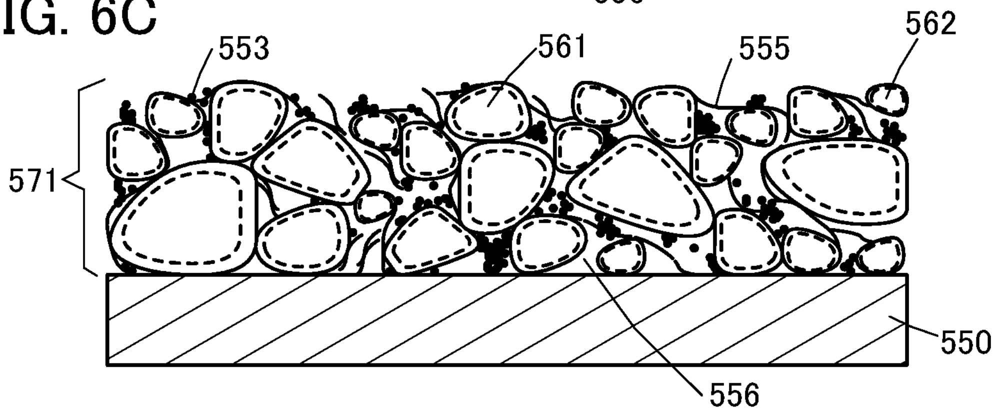

FIG. 6C shows an example of a positive electrode in which a carbon nanotube is used instead of the graphene in FIG. 6B. With the use of the carbon nanotube, aggregation of carbon black such as acetylene black can be prevented and the dispersibility can be increased.

In FIG. 6C, the regions filled with neither the positive electrode active material 561 nor a carbon nanotube are voids, some of which are impregnated with the electrolyte 556. In the case where an electrolyte solution is used as the electrolyte 556, the positive electrode active material 561 has a gap to facilitate impregnation with the electrolyte solution, and this gap is a cavity. Although the positive electrode active material 561 sometimes changes in volume owing to charging and discharging, impregnation with an electrolyte solution that includes the organic solvent containing a fluorinated cyclic carbonate and an ionic liquid between a plurality of the positive electrode active materials 561 allows the active material and the like to easily slip even when the volume change occurs at the time of charging and discharging, and inhibits a crack, thereby bringing about an effect of increasing cycle performance. That is, an organic solvent containing a fluorinated cyclic carbonate preferably exists between the plurality of active materials forming the positive electrode.

A stack in which a separator is laid over the positive electrode shown in any one of FIG. 6A to FIG. 6C and a negative electrode is laid over the separator is put in a container (e.g., an exterior body or a metal can), and the container is filled with the electrolyte 556.

[Negative Electrode]

Next, the negative electrode is described. The negative electrode 506 includes a negative electrode active material layer and a negative electrode current collector. The negative electrode active material layer may include a conductive additive and a binding agent.

<Negative Electrode Active Material>

As the negative electrode active material, for example, an alloy-based material or a carbon-based material can be used. The negative electrode active material used for the secondary battery of one embodiment of the present invention particularly preferably contains fluorine as a halogen. Fluorine has high electronegativity, and the negative electrode active material containing fluorine in its surface portion may have an effect of facilitating removal of a solvent that has been solvated at the surface of the negative electrode active material.

For the negative electrode active material, an element that enables charging and discharging reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon, and especially, silicon has a high theoretical capacity of 4200 mAh/g. For this reason, silicon is preferably used for the negative electrode active material. Alternatively, a compound containing any of these elements may be used. Examples of the compound include SiO (silicon monoxide, which is sometimes denoted as $SiO_x$, where x is preferably greater than or equal to 0.2 and less than or equal to 1.5), $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charging and discharging reactions by an alloying reaction and a dealloying reaction with lithium, a compound containing the element, and the like may be referred to as an alloy-based material.

Silicon nanoparticles can be used as the negative electrode active material containing silicon. The median diameter (D50) of a silicon nanoparticle is greater than or equal to 5 nm and less than 1 μm, preferably greater than or equal to 10 nm and less than or equal to 300 nm, further preferably greater than or equal to 10 nm and less than or equal to 100 nm. The silicon nanoparticles may have crystallinity. The silicon nanoparticles may include a region with crystallinity and an amorphous region.

The negative electrode active material containing silicon may be in the form of a silicon monoxide particle including one or more silicon crystal grains. The silicon monoxide may be amorphous. The silicon monoxide particle may be coated with carbon. This particle can be mixed with graphite to be used as the negative electrode active material.

As the carbon-based material, graphite, graphitizing carbon (soft carbon), non-graphitizing carbon (hard carbon), a carbon nanotube, graphene, carbon black, or the like can be used. Such a carbon-based material preferably contains fluorine. A carbon-based material containing fluorine can also be referred to as a particulate or fibrous fluorinated carbon material. In the case where the carbon-based material is subjected to measurement by X-ray photoelectron spectroscopy, the concentration of fluorine is preferably higher than or equal to 1 atomic % with respect to the total concentration of fluorine, oxygen, lithium, and carbon.

Although the negative electrode active material sometimes changes in volume owing to charging and discharging, providing a fluorine-containing organic compound such as a fluorinated carbonate ester between the negative electrode active materials allows the active material and the like to easily slip even when the volume change occurs at the time of charging and discharging, and inhibits a crack, thereby bringing about an effect of increasing cycle performance. The presence of the fluorine-containing organic compound between the plurality of negative electrode active materials is important.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of lithium metal (higher than or equal to 0.05 V and lower than or equal to 0.3 V vs. $Li/Li^+$) when lithium ions are inserted into graphite (while a lithium-graphite intercalation compound is formed). For this reason, a lithium-ion secondary battery can have a high operating voltage. In addition, graphite is preferred because of its advantages such as relatively high capacity per unit volume, relatively small volume expansion, low cost, and a level of safety higher than that of lithium metal.

As the negative electrode active material, an oxide such as titanium dioxide ($TiO_2$), lithium titanium oxide ($Li_4Ti_5O_{12}$), a lithium-graphite intercalation compound ($Li_xC_6$), niobium pentoxide ($Nb_2O_5$), tungsten oxide ($WO_2$), or molybdenum oxide ($MoO_2$) can be used.

As the negative electrode active material, $Li_{3-x}M_xLN$ (M is Co, Ni, or Cu) with a $Li_3N$ structure, which is a composite nitride of lithium and a transition metal, can be used. For example, $Li_{2.6}Co_{0.4}N_3$ is preferable because of its high discharging capacity (higher than or equal to 900 mAh/g or higher than or equal to 1890 mAh/$cm^3$).

A composite nitride of lithium and a transition metal is preferably used, in which case lithium ions are contained in the negative electrode active material and thus the negative electrode active material can be used in combination with a material for a positive electrode active material that does not contain lithium ions, such as $V_2O_5$ or $Cr_3O_8$. Note that in the case of using a material containing lithium ions as a positive electrode active material, the composite nitride of lithium and a transition metal can be used as the negative electrode active material by extracting the lithium ions contained in the positive electrode active material in advance.

Alternatively, a material that causes a conversion reaction can be used as the negative electrode active material. For example, a transition metal oxide that does not form an alloy with lithium, such as cobalt oxide (CoO), nickel oxide (NiO), or iron oxide (FeO), may be used as the negative electrode active material. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

[Fluorine-Modified Conductive Additive]

The conductive additive included in the negative electrode is preferably modified with fluorine. For example, as the conductive additive, a material obtained by modification of the above-described conductive additive with fluorine can be used.

The conductive additive can be modified with fluorine through treatment or heat treatment using a fluorine-containing gas or plasma treatment in a fluorine-containing gas atmosphere, for example. As the fluorine-containing gas, for example, a fluorine gas or fluoromethane ($CF_4$) can be used.

Alternatively, the conductive additive may be modified with fluorine through immersion in a solution containing hydrofluoric acid, tetrafluoroboric acid, hexafluorophosphoric acid, or the like or a solution containing a fluorine-containing ether compound, for example.

Modification of the conductive additive with fluorine is expected to stabilize the structure of the conductive additive and suppress a side reaction in charging and discharging processes of a secondary battery. The suppression of the side reaction can improve the charging and discharging efficiency. In addition, a decrease in capacity caused by repetitive charging and discharging can be suppressed. Thus, when the negative electrode of one embodiment of the present invention includes a conductive additive that is modified with fluorine, an excellent secondary battery can be obtained.

In some cases, the stabilization of the structure of the conductive additive stabilizes conduction characteristics, leading to high output characteristics.

<Negative Electrode Current Collector>

For the negative electrode current collector, a material similar to that of the positive electrode current collector can be used. Note that a material that is not alloyed with carrier ions of lithium or the like is preferably used for the negative electrode current collector.

[Separator]

The separator is positioned between the positive electrode and the negative electrode. The separator insulates the positive electrode and the negative electrode from each other. It is preferable that the separator have stability with respect to a nonaqueous solvent and be formed using a material with an excellent liquid-retaining property. The separator can be formed using, for example, a fiber containing cellulose, such as paper, nonwoven fabric, a glass fiber, ceramics, or synthetic fiber containing nylon (polyamide), vinylon (polyvinyl alcohol-based fiber), a polyester, a polyimide, acrylic, a polyolefin, or a polyurethane.

The separator preferably has a porosity higher than or equal to 30% and lower than or equal to 85%, further preferably higher than or equal to 45% and lower than or equal to 65%. High porosity is preferred because it facilitates impregnation with a nonaqueous solvent. The porosity of the separator on the positive electrode side may be different from that on the negative electrode side, and the porosity on the positive electrode side is preferably higher than the porosity on the negative electrode side. Examples of a structure with different porosities are a single material having different porosities and different kinds of materials with different porosities. In the case where different kinds of materials are used, stacking these materials allows the separator to have different porosities.

The thickness of the separator is preferably greater than or equal to 5 μm and less than or equal to 200 μm, further preferably greater than or equal to 5 μm and less than or equal to 100 μm.

The separator preferably has an average pore size greater than or equal to 40 nm and less than or equal to 3 μm, further preferably greater than or equal to 70 nm and less than or equal to 1 μm. A large average pore size is preferred because it facilitates passage of carrier ions. The average pore size of the separator on the positive electrode side may be different from that on the negative electrode side, and the average pore size on the positive electrode side is preferably larger than the average pore size on the negative electrode side. Examples of a structure with different average pore sizes are a single material having different average pore sizes and different kinds of materials with different average pore sizes. In the case where different kinds of materials are used, stacking these materials allows the separator to have different average pore sizes.

The separator preferably has a heat resistance temperature higher than or equal to 200° C.

A separator including a polyimide and having a thickness greater than or equal to 10 μm and less than or equal to 50 μm and a porosity higher than or equal to 75% and lower than or equal to 85% is preferably used to increase the output characteristics of the secondary battery.

The separator may be processed into a bag-like shape. The bag-shaped separator can be positioned to wrap or sandwich any one of the positive electrode and the negative electrode.

The total thickness of the separator is preferably greater than or equal to 1 μm and less than or equal to 100 μm, and as long as having a thickness in this range, the separator may have any of a single-layer structure and a multilayer structure. For the multilayer structure, an organic material film of polypropylene, polyethylene, or the like coated with a ceramic-based material, a fluorine-based material, a polyamide-based material, a mixture thereof, or the like can be used. As the ceramic-based material, for example, aluminum oxide particles, silicon oxide particles, or the like can be used. As the fluorine-based material, for example, PVDF, polytetrafluoroethylene, or the like can be used. As the polyamide-based material, for example, nylon, aramid (meta-based aramid or para-based aramid), or the like can be used.

When the surface of the separator is coated with the ceramic-based material, the oxidation resistance is improved; hence, deterioration of the separator in high-voltage charging and discharging can be suppressed and accordingly, the reliability of the secondary battery can be improved. When the surface of the separator is coated with the fluorine-based material, the separator is easily brought into close contact with an electrode, resulting in high output characteristics. When the surface of the separator is coated with the polyamide-based material, in particular, aramid, heat resistance is improved; hence, the safety of the secondary battery can be improved.

For example, both surfaces of a polypropylene film may be coated with a mixed material of aluminum oxide and aramid. Alternatively, a surface of a polypropylene film that is in contact with the positive electrode may be coated with a mixed material of aluminum oxide and aramid, and a surface of the polypropylene film that is in contact with the negative electrode may be coated with the fluorine-based material.

With the use of such a separator with a multilayer structure, which can have the functions of the materials, insulation between the positive electrode and the negative electrode can be ensured and the safety of the secondary battery can be kept even when the total thickness of the separator is small. This is preferable because in that case, the capacity of the secondary battery per volume can be increased.

<Manufacturing Method of Laminated Secondary Battery>

Here, an example of a method for manufacturing the laminated secondary battery whose external view is shown in FIG. 6A is described with reference to FIG. 7A to FIG. 7C.

Figure 7A:
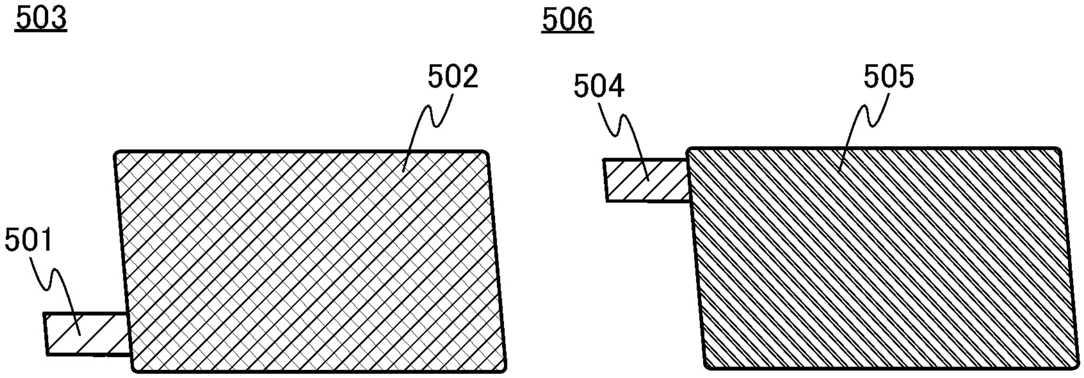
FIG. 7A, FIG. 7B, and FIG. 7C are diagrams showing a manufacturing process of a laminated secondary battery.

First, the positive electrode 503 and the negative electrode 506 are prepared as shown in FIG. 7A. The positive electrode 503 includes a sheet-shaped positive electrode 502 and a tab 501. The negative electrode 506 includes a sheet-shaped negative electrode 505 and a tab 504.

Figure 7B:
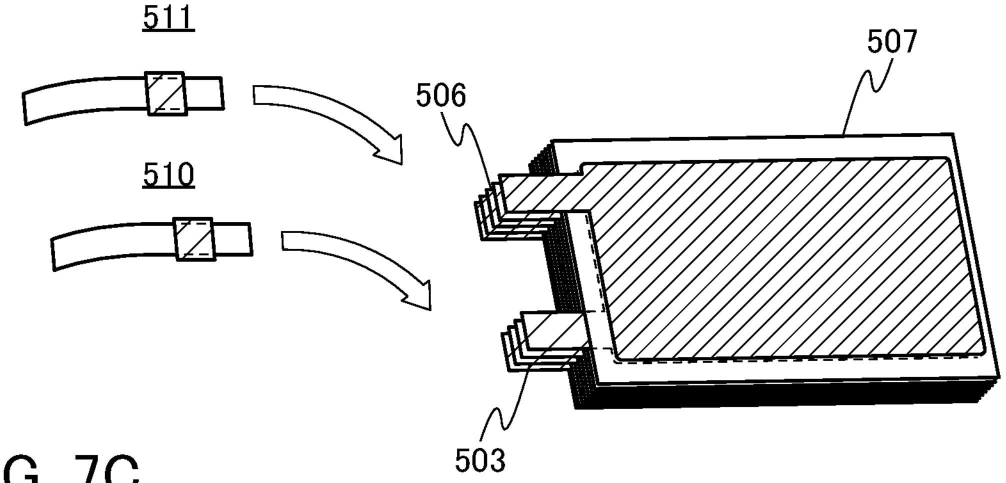

As shown in FIG. 7B, the negative electrode 506, the separator 507, and the positive electrode 503 are stacked. In the example described here, five pairs of negative electrodes and four pairs of positive electrodes are used, which can also be referred to as a stack including the negative electrodes, the separator, and the positive electrodes. Next, tab regions of the positive electrodes 503 are bonded to each other, and the tab region of the positive electrode on the outermost surface and the positive electrode lead electrode 510 are bonded to each other. The bonding can be performed by ultrasonic welding, for example. In a similar manner, tab regions of the negative electrodes 506 are bonded to each other, and the tab region of the negative electrode on the outermost surface and the negative electrode lead electrode 511 are bonded to each other.

Figure 7C:
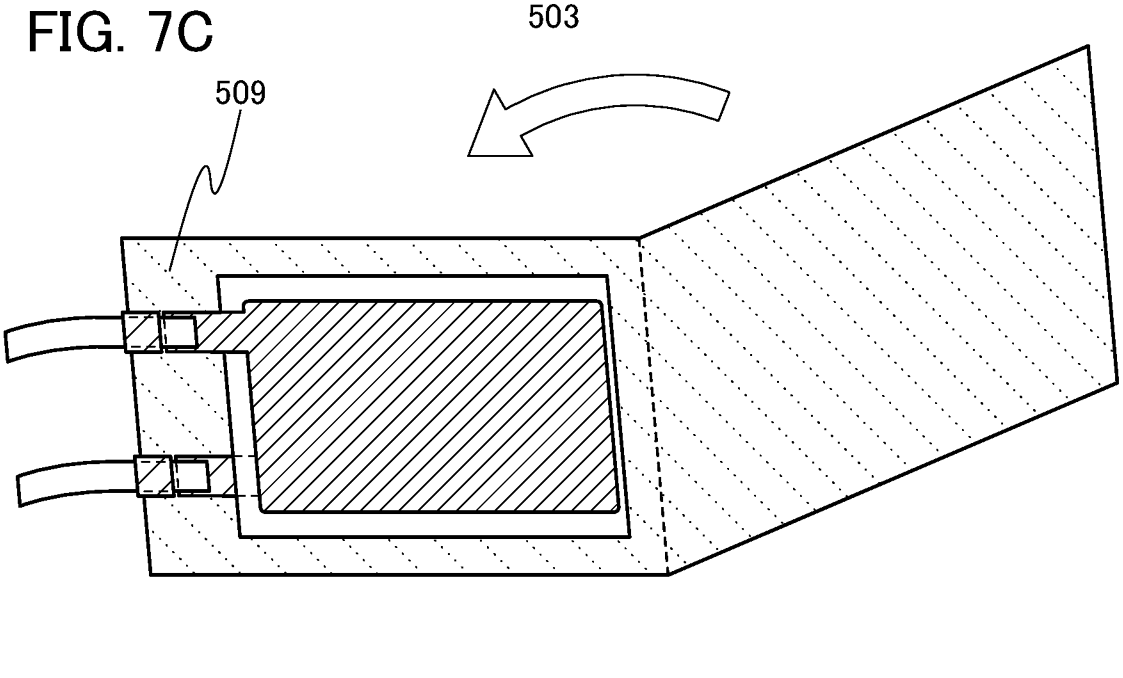

After that, as shown in FIG. 7C, the negative electrodes 506, the separator 507, and the positive electrodes 503 are placed over the exterior body 509. Then, the exterior body 509 is bent at the portion denoted by the dashed line. After that, the outer edges of the exterior body 509 are bonded to each other. The bonding can be performed by thermocompression bonding, for example. At this time, an unbonded region (hereinafter, referred to as an inlet) is provided for part (or one side) of the exterior body 509 so that an electrolyte solution can be put later. As the exterior body 509, a film having both an excellent water permeation barrier property and an excellent gas barrier property is preferably used. The exterior body 509 can have an excellent water permeation barrier property and an excellent gas barrier property by having a stacked-layer structure one intermediate layer of which is metal foil (e.g., aluminum foil).

Next, an electrolyte solution (not shown) is introduced into the exterior body 509 from the inlet of the exterior body 509. The electrolyte solution is preferably introduced in a reduced pressure atmosphere or in an inert atmosphere. Lastly, the inlet is bonded. In the above manner, the laminated secondary battery 500 can be manufactured.

When the electrolyte solution of one embodiment of the present invention is used and a later-described positive electrode active material is used in the positive electrode 503, the secondary battery 500 can have high capacity, high charging and discharging capacity, and excellent cycle performance.

This embodiment can be implemented in appropriate combination with the other embodiments.

Embodiment 4

In this embodiment, a method for forming a positive electrode active material of one embodiment of the present invention is described with reference to FIG. 8.

As the positive electrode active material of one embodiment of the present invention, a lithium composite oxide having a layered rock-salt crystal structure is used. The lithium composite oxide contains a transition metal (M). Thus, in FIG. 8, at least a lithium source (Li source) and a transition metal source (M source) are prepared. The case where the lithium composite oxide further contains an added element is described. Accordingly, in FIG. 8, one or two of a magnesium source (Mg source) and a fluorine source (F source) are prepared. Each step is described.

<Step S11>

Figure 8:
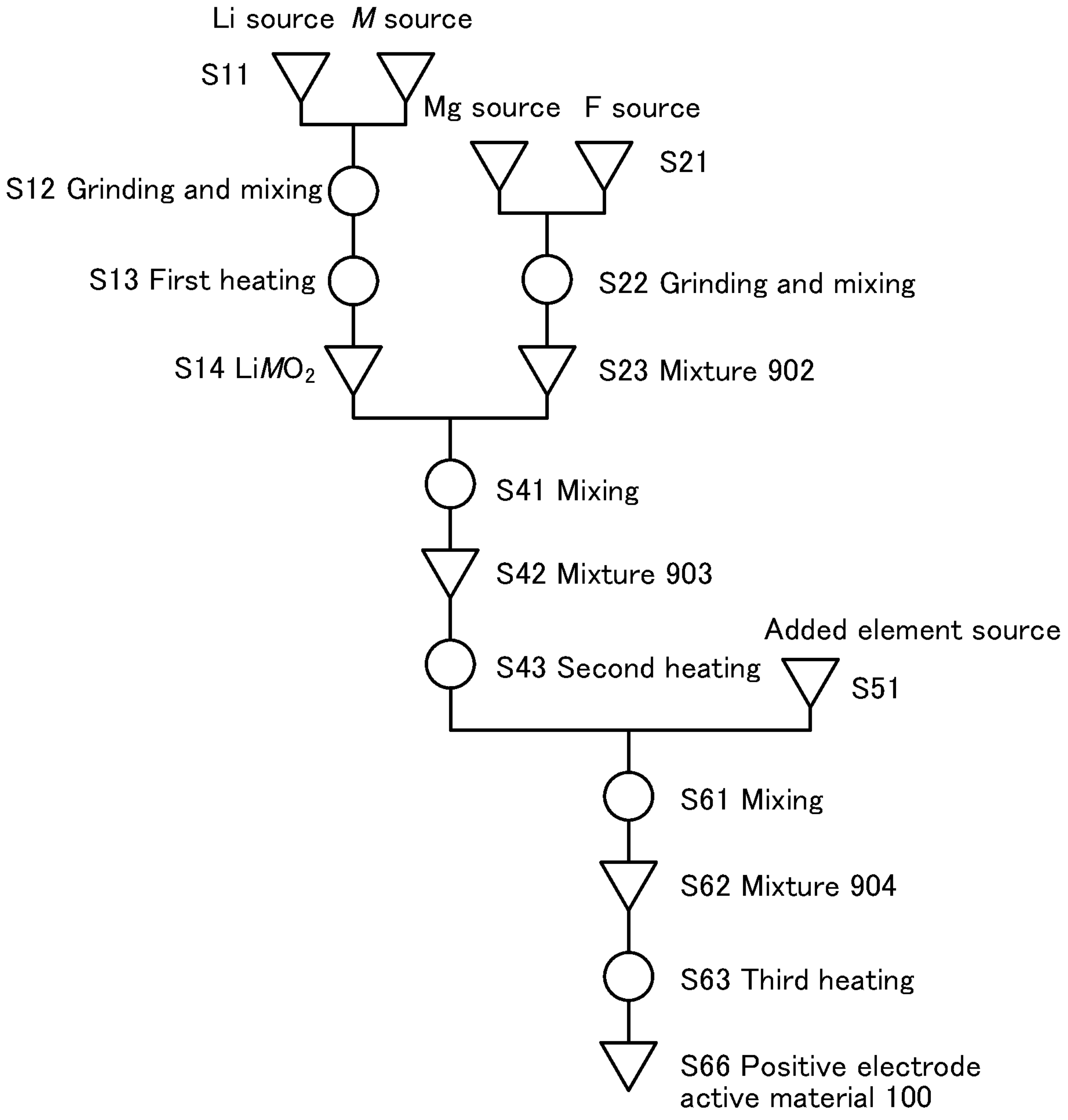
FIG. 8 is a diagram showing a manufacturing process of a positive electrode.

Step S11 in FIG. 8 includes a step of preparing a lithium source (Li source) and a transition metal source (M source) as materials for the lithium composite oxide. The lithium source and the transition metal source are also referred to as starting materials.

As the lithium source, for example, lithium carbonate, lithium fluoride, or the like can be used. As the lithium source, a high-purity material is preferably used. Specifically, the purity of lithium carbonate is higher than or equal to 3N (99.9%), preferably higher than or equal to 4N (99.99%), further preferably higher than or equal to 4N5 (99.995%), still further preferably higher than or equal to 5N (99.999%). The use of a high-purity material can increase the capacity of a secondary battery or increase the reliability of a secondary battery.

As the transition metal M, a metal which together with lithium can form a layered rock-salt composite oxide that belongs to the space group R-3m is preferably used. For example, at least one of manganese, cobalt, and nickel can be used as the transition metal M. Specifically, as the transition metal M, cobalt alone; nickel alone; two elements of cobalt and manganese; two elements of cobalt and nickel; or three elements of cobalt, manganese, and nickel may be used.

As the transition metal source (M source) in Step S11, an oxide or a hydroxide of a transition metal or the like can be used. As a cobalt source, for example, cobalt oxide, cobalt hydroxide, or the like can be used. As a manganese source, manganese oxide, manganese hydroxide, or the like can be used. As a nickel source, nickel oxide, nickel hydroxide, or the like can be used.

As the transition metal source (M source), a high-purity material is preferably used. Specifically, the purity of cobalt oxide is preferably higher than or equal to 3N (99.9%), further preferably higher than or equal to 4N (99.99%), still further preferably higher than or equal to 4N5 (99.995%), yet still further preferably higher than or equal to 5N (99.999%). The use of a high-purity material can increase the capacity of a secondary battery or increase the reliability of a secondary battery.

In the case where the lithium composite oxide contains aluminum in addition to the transition metal M, an aluminum source is prepared. As the aluminum source, aluminum oxide, aluminum hydroxide, or the like can be used. As the aluminum source, a high-purity material is preferably used. Specifically, the purity of aluminum hydroxide is higher than or equal to 3N (99.9%), preferably higher than or equal to 4N (99.99%), further preferably higher than or equal to 4N5 (99.995%), still further preferably higher than or equal to 5N (99.999%). The use of a high-purity material can increase the capacity of a secondary battery or increase the reliability of a secondary battery.

<Step S12>

Step S12 includes a step of grinding and mixing the lithium source and the transition metal source (M source). The mixing can be performed by a dry process or a wet process. A ball mill, a bead mill, or the like can be used as a tool for the grinding and mixing. When the ball mill is used, a zirconia ball is preferably used.

<Step S13>

Step S13 includes a step of heating the materials mixed in Step S12 (a mixed material or a mixture). With the use of an ordinal number, this step is sometimes referred to as first heating to distinguish this step from a heating step performed later. Alternatively, this step is sometimes referred to as baking. The first heating may be performed with a sequential heating apparatus or a batch-type heating apparatus.

The first heating is preferably performed in an atmosphere with little moisture, such as dry air (e.g., a dew point is preferably lower than or equal to −50° C., further preferably lower than or equal to −100° C.). The gas flow rate at which the dry atmosphere is obtained is preferably higher than or equal to 5 L/min and lower than or equal to 35 L/min.

The first heating is preferably performed at higher than or equal to 800° C. and lower than 1100° C., further preferably at higher than or equal to 900° C. and lower than or equal to 1000° C., still further preferably at approximately 950° C.

The temperature of the first heating being lower than or equal to 800° C. might lead to insufficient decomposition and insufficient melting of the lithium source and the transition metal source. The temperature of the first heating being higher than 1100° C. might cause a defect due to evaporation of lithium or the like; alternatively, in the case where cobalt is used as the transition metal, such a temperature might cause a defect in which cobalt has divalence. Thus, in the case where cobalt is used as the transition metal, the temperature of the first heating is preferably higher than or equal to 900° C. and lower than or equal to 1000° C., further preferably approximately 950° C.

The duration of the first heating is preferably longer than or equal to one hour and shorter than or equal to 100 hours, further preferably longer than or equal to two hours and shorter than or equal to 20 hours. The temperature rising rate can be higher than or equal to 150° C./h and lower than or equal to 250° C./h. As for the lowering of the temperature, the cooling temperature should be taken into account, and it is only required that cooling to room temperature (e.g., 25° C.) can be performed, for example. The temperature falling rate can be calculated from the cooling temperature.

Note that the cooling to room temperature is not essential in Step S13. As long as there is no problem considering the following Step S41 to Step S43, the process can go to Step S14 even when the temperature is higher than room temperature in Step S13.

In the first heating, a container containing the mixed material in Step S12 is preferably covered with a lid to control the reaction atmosphere. At the time of performing heating with the container put in a muffle furnace, atmosphere control by covering the container with a lid is preferred to controlling the reaction atmosphere of the muffle furnace, depending on the mixed materials.

<Step S14>

Next, Step S14 includes a step of collecting the material obtained by the above first heating to obtain a lithium composite oxide containing the transition metal M ($LiMO_2$).

Use of a high-purity starting material allows the lithium composite oxide containing the transition metal M ($LiMO_2$) to have high purity. Specifically, the purity of the starting material is higher than or equal to 4N (99.99%), preferably higher than or equal to 4N5 (99.995%), further preferably higher than or equal to 5N (99.999%). The use of a high-purity material can increase the capacity of a secondary battery or increase the reliability of a secondary battery.

Alternatively, a lithium composite oxide containing the transition metal M ($LiMO_2$) that is synthesized in advance may be used in Step S14. In that case, Step S11 to Step S13 can be omitted. It is preferable to use a lithium composite oxide containing the transition metal M ($LiMO_2$) that is synthesized in advance and that has high purity. Specifically, the purity of the material is higher than or equal to 4N (99.99%), preferably higher than or equal to 4N5 (99.995%), further preferably higher than or equal to 5N (99.999%). The use of a high-purity material can increase the capacity of a secondary battery or increase the reliability of a secondary battery.

As the lithium composite oxide synthesized in advance, lithium cobalt oxide manufactured by NIPPON CHEMICAL INDUSTRIAL CO., LTD. can be used.

In addition, the lithium composite oxide containing the transition metal M ($LiMO_2$) preferably has high crystallinity, and further preferably has single-crystal grains. The crystallinity of a lithium composite oxide containing the transition metal M ($LiMO_2$) can be determined from a TEM (transmission electron microscope) image, a STEM (scanning transmission electron microscope) image, a HAADF-STEM (high-angle annular dark-field scanning transmission electron microscope) image, an ABF-STEM (annular bright-field scanning transmission electron microscope) image, or the like, and can also be evaluated on an X-ray diffraction (XRD) pattern, an electron diffraction pattern, a neutron diffraction pattern, or the like.

<Step S21>

Step S21 includes a step of preparing a fluorine source and a magnesium source as added elements for the lithium composite oxide ($LiMO_2$). The fluorine source may be a chlorine source or a bromine source. That is, one or two or more selected from halogen sources including a fluorine source, a chlorine source, and a bromine source can be used. A beryllium source may be used instead of the magnesium source. In addition to these, a lithium source may also be prepared. Furthermore, a boron source may be prepared.

As the fluorine source, for example, lithium fluoride (LiF), magnesium fluoride ($MgF_2$), aluminum fluoride ($AlF_3$), titanium fluoride ($TiF_4$), cobalt fluoride ($CoF_2$ and $CoF_3$), nickel fluoride ($NiF_2$), zirconium fluoride ($ZrF_4$), vanadium fluoride (VFs), manganese fluoride, iron fluoride, chromium fluoride, niobium fluoride, zinc fluoride ($ZnF_2$), calcium fluoride ($CaF_2$), sodium fluoride (NaF), potassium fluoride (KF), barium fluoride ($BaF_2$), cerium fluoride ($CeF_2$), lanthanum fluoride ($LaF_3$), sodium aluminum hexafluoride ($Na_3AlF_6$), or the like can be used. The fluorine source is not limited to a solid, and for example, fluorine ($F_2$), carbon fluoride, sulfur fluoride, oxygen fluoride (e.g., $OF_2$, $O_2F_2$, $O_3F_2$, $O_4F_2$, and $O_2F$), or the like may be used and mixed in the atmosphere in a heating step described later. A plurality of fluorine sources may be mixed to be used. Among them, lithium fluoride, which has a relatively low melting point of 848° C., is preferable because it is easily melted in a heating step described later. Note that a fluorine source containing Li may be referred to as a Li source.

As the fluorine source, a high-purity material is preferably used. Specifically, the purity of LiF and that of $MgF_2$ are each preferably higher than or equal to 2N (99%), further preferably higher than or equal to 3N (99.9%), still further preferably higher than or equal to 4N (99.99%). The use of a high-purity material can increase the capacity of a secondary battery or increase the reliability of a secondary battery.

As the chlorine source, for example, lithium chloride, magnesium chloride, or the like can be used.

As the chlorine source, a high-purity material is preferably used. The use of a high-purity material can increase the capacity of a secondary battery or increase the reliability of a secondary battery.

As the bromine source, potassium bromide, sodium bromide, calcium bromide, or the like can be used.

As the bromine source, a high-purity material is preferably used. The use of a high-purity material can increase the capacity of a secondary battery or increase the reliability of a secondary battery.

As the magnesium source, for example, magnesium fluoride, magnesium oxide, magnesium hydroxide, magnesium carbonate, or the like can be used.

As the magnesium source, a high-purity material is preferably used. The use of a high-purity material can increase the capacity of a secondary battery or increase the reliability of a secondary battery.

As the lithium source, for example, lithium fluoride or lithium carbonate can be used. That is, lithium fluoride can be used as both the lithium source and the fluorine source. In addition, magnesium fluoride can be used as both the fluorine source and the magnesium source.

As the lithium source, a high-purity material is preferably used. The use of a high-purity material can increase the capacity of a secondary battery or increase the reliability of a secondary battery.

The case is considered where lithium fluoride LiF is prepared as the fluorine source and magnesium fluoride $MgF_2$ is prepared as the fluorine source and the magnesium source. Lithium fluoride LiF and magnesium fluoride $MgF_2$ are preferably mixed at approximately LiF:$MgF_2$=65:35 (molar ratio) to maximize the effect of reducing the melting point. On the other hand, when the amount of lithium fluoride increases, cycle performance might deteriorate because of too large an amount of lithium. Therefore, the molar ratio of lithium fluoride LiF to magnesium fluoride $MgF_2$ is preferably LiF:$MgF_2$=x:1 ($0 \le x \le 1.9$), further preferably LiF:$MgF_2$=x:1 (0.1≤x≤0.5), still further preferably LiF:$MgF_2$=x:1 (x=0.33 and the neighborhood thereof). Note that in this specification and the like, the neighborhood means a value greater than 0.9 times and smaller than 1.1 times a certain value.

<Step S22>

Step S22 includes a step of grinding and mixing the above materials. Although the mixing can be performed by a dry process or a wet process, a wet process is preferably employed to grind the materials to a smaller size. Step S22 preferably employs a wet process, which enables mixing with a strong force, because starting materials are ground in the step.

In the case where the step of grinding and mixing is performed by a wet process, a solvent is prepared. As the solvent, a ketone such as acetone; an alcohol such as ethanol or isopropanol; an ether such as diethyl ether; dioxane; acetonitrile; N-methyl-2-pyrrolidone (NMP); or the like can be used. An aprotic solvent that hardly reacts with lithium is further preferably used as the solvent. It is preferable that the solvent be highly purified. For example, dehydrated acetone with purity higher than or equal to 99.5% is preferably used.

A ball mill, a bead mill, or the like can be used as a tool for the mixing. When the ball mill is used, a zirconia ball is preferably used as a tool for the grinding, for example.

<Step S23>

Step S23 includes a step of collecting the materials mixed and ground in the above step to obtain a mixture 902.

The D50 (median diameter) of the mixture 902 is preferably greater than or equal to 600 nm and less than or equal to 20 μm, further preferably greater than or equal to 1 μm and less than or equal to 10 μm, for example. When mixed with $LiMO_2$ of Step S14, the mixture 902 having such a median diameter is easily attached to the surface of $LiMO_2$ uniformly. The mixture 902 is preferably attached to the surface of $LiMO_2$ of Step S14 uniformly to be easily distributed to the surface portion of $LiMO_2$ after heating.

<Step S41>

Step S41 includes a step of mixing $LiMO_2$ of Step S14 and the mixture 902. The atomic ratio of the transition metal Min $LiMO_2$ to magnesium Mg in the mixture 902 is preferably M:Mg=100:y (0.1≤y≤6), further preferably M:Mg=100:y (0.3≤y≤3).

The condition of the mixing in Step S41 is preferably milder than that of the mixing in Step S12 or Step S22 in order not to damage the particles of $LiMO_2$. For example, a condition with a low rotation frequency or a short time as compared to the mixing in Step S12 or Step S22 is preferable.

For the mixing in Step S41, a dry process unlikely to damage $LiMO_2$ particles is preferred to a wet process. A ball mill, a bead mill, or the like can be used as a tool for the mixing, for example. When the ball mill is used, a zirconia ball is preferably used, for example. When the ball mill is used, the mixing can be performed concurrently with crushing of $LiMO_2$ particles. The materials may be mixed while being passed through a sieve.

In the mixing in Step S41, one or two selected from aluminum and nickel may be further mixed. Aluminum is trivalent and has a high bonding strength with oxygen. Thus, when aluminum enters the lithium sites, a change in the crystal structure can be inhibited. The positive electrode active material can have the crystal structure that is unlikely to be broken by repeated high-voltage charging and discharging. Furthermore, nickel can increase the capacity per weight and the capacity per volume in some cases.

As a nickel source, nickel oxide, nickel hydroxide, an alkoxide of nickel, or the like can be used. As an aluminum source, aluminum oxide, aluminum hydroxide, an alkoxide of aluminum, or the like can be used. The nickel source and the aluminum source are preferably mixed in this step to reduce the number of times of loading into a heating furnace, in which case the productivity is high.

<Step S42>

Step S42 includes a step of collecting the materials mixed in the above step to obtain a mixture 903.

This embodiment describes a procedure in which the mixture 902 of lithium fluoride and magnesium fluoride to $LiMO_2$ such as lithium cobalt oxide; however, one embodiment of the present invention is not limited thereto. A magnesium source, a fluorine source, and the like may be added to the lithium source and the transition metal source in Step S11 and the process may go to Step S12 and Step S13, so that the mixture 903 can be obtained. Alternatively, the mixing in Step S41 may be performed with an Mg source and an F source added to $LiMO_2$ of Step S14. In these cases, some steps can be omitted, leading to simplicity and high productivity.

Alternatively, lithium cobalt oxide to which magnesium and fluorine are added in advance may be used as the mixture 903. When lithium cobalt oxide to which magnesium and fluorine are added is used, the steps up to Step S42 can be omitted and the process can be simpler. It is preferable to use lithium cobalt oxide to which magnesium and fluorine are added in advance and which has high purity. Specifically, the purity of the material is higher than or equal to 4N (99.99%), preferably higher than or equal to 4N5 (99.995%), further preferably higher than or equal to 5N (99.999%). The use of a high-purity material can increase the capacity of a secondary battery or increase the reliability of a secondary battery.

As in Step S21 and the like, a magnesium source and a fluorine source may be further added to the lithium cobalt oxide to which magnesium and fluorine are added in advance.

<Step S43>

Step S43 includes a step of heating the mixture 903 mixed in Step S42. With the use of an ordinal number, this step is sometimes referred to as second heating to distinguish this step from the first heating. Alternatively, this step is sometimes referred to as annealing. The second heating may be performed with a sequential heating apparatus or a batch-type heating apparatus.

Step S43 is performed taking into account large-scale synthesis; thus, a first container larger than a crucible is preferably used. In the case of large-scale synthesis, various conditions can be easily set for the added elements of the mixture 903 and the like.

The atmosphere of the second heating preferably contains oxygen.

During the second heating, a compound lighter than oxygen, e.g., LiF, might sublimate by the heating. In that case, the Li concentration and F concentration in the mixture 903 might decrease. Thus, at the time of heating the mixture 903, at least the fluorine concentration or the partial pressure of a fluoride in the atmosphere in the container is preferably controlled to be within an appropriate range. An exemplary method for preventing sublimation of LiF is covering the container containing the mixture 903 with a lid.

The second heating further preferably has an adhesion preventing effect to prevent particles of the mixture 903 from adhering to one another. Examples of the heating having the adhesion preventing effect include heating while the mixture 903 is stirred and heating while the container containing the mixture 903 is vibrated.

The temperature range of the second heating needs to be greater than the temperature at which a reaction between $LiMO_2$ of Step S14 and the mixture 902 proceeds. The temperature at which the reaction proceeds is the temperature at which interdiffusion between elements included in $LiMO_2$ and the mixture 902 occurs. Thus, the temperature of the second heating is, for example, higher than or equal to 500° C. and lower than or equal to 950° C.

It can be assumed that the lower limit of the temperature of the second heating is preferably higher than or equal to the temperature at which at least part of the mixture 903 is melted, to facilitate the reaction. Accordingly, the temperature of the second heating is preferably higher than or equal to the eutectic point of the mixture 902. In the case where the mixture 902 includes LiF and $MgF_2$, the eutectic point of LiF and $MgF_2$ is around 742° C., and the temperature in Step S43 is preferably higher than or equal to 742° C.

The mixture 903 obtained by mixing such that $LiCoO_2$:LiF:$MgF_2$=100:0.33:1 (molar ratio) exhibits an endothermic peak at around 830° C. in differential scanning calorimetry measurement (DSC measurement). It can be thus assumed that the lower limit of the temperature of the second heating is preferably higher than or equal to 830° C.

A higher annealing temperature facilitates the reaction and thereby shortens the annealing time. The annealing time is preferably shorter to increase the productivity.

The upper limit of the temperature of the second heating needs to be lower than or equal to the decomposition temperature of $LiMO_2$ (1130° C. in the case of $LiCoO_2$). At around the decomposition temperature, a slight amount of $LiMO_2$ might be decomposed. Thus, the upper limit of the temperature of the second heating is preferably lower than or equal to 1130° C., further preferably lower than or equal to 1000° C., still further preferably lower than or equal to 950° C., and yet still further preferably lower than or equal to 900° C. The temperature of the second heating is preferably the temperature at which $LiMO_2$ of Step S14 is not damaged, and the temperature of the second heating is lower than the temperature of the first heating.

In view of the above, the temperature range of the second heating is preferably higher than or equal to 500° C. and lower than or equal to 1130° C., further preferably higher than or equal to 500° C. and lower than or equal to 1000° C., still further preferably higher than or equal to 500° C. and lower than or equal to 950° C., yet still further preferably higher than or equal to 500° C. and lower than or equal to 900° C. Furthermore, the temperature range of the second heating is preferably higher than or equal to 742° C. and lower than or equal to 1130° C., further preferably higher than or equal to 742° C. and lower than or equal to 1000° C., still further preferably higher than or equal to 742° C. and lower than or equal to 950° C., yet still further preferably higher than or equal to 742° C. and lower than or equal to 900° C. Furthermore, the temperature range of the second heating is preferably higher than or equal to 830° C. and lower than or equal to 1130° C., further preferably higher than or equal to 830° C. and lower than or equal to 1000° C., still further preferably higher than or equal to 830° C. and lower than or equal to 950° C., yet still further preferably higher than or equal to 830° C. and lower than or equal to 900° C.

In addition, at the time of heating the mixture 903, the partial pressure of fluorine or a fluoride in the atmosphere is preferably controlled to be within an appropriate range.

In the formation method described in this embodiment, some of the materials, e.g., LiF as the fluorine source, function as a flux. Owing to this function, the temperature of the second heating can be lower than or equal to the decomposition temperature of $LiMO_2$, e.g., a temperature higher than or equal to 742° C. and lower than or equal to 950° C., which allows for distribution of magnesium or fluorine in the vicinity of the surface and formation of the positive electrode active material having favorable performance.

The second heating is preferably performed for an appropriate time. The appropriate duration of the second heating depends on conditions, such as the temperature of the second heating and the size and composition of $LiMO_2$ particles of Step S14. In the case where the particle size is small, the second heating is preferably performed at a lower temperature or for a shorter time than the case where the particle size is large, in some cases.

When the median diameter (D50) of the particles of Step S14 is approximately 12 μm, for example, the temperature of the second heating is preferably higher than or equal to 600° C. and lower than or equal to 950° C., for example. The duration of the second heating is preferably longer than or equal to three hours, further preferably longer than or equal to 10 hours, still further preferably longer than or equal to 60 hours, for example.

On the other hand, when the median diameter (D50) of the particles of Step S24 is approximately 5 μm, the temperature of the second heating is preferably higher than or equal to 600° C. and lower than or equal to 950° C., for example. The duration of the second heating is preferably longer than or equal to one hour and shorter than or equal to 10 hours, further preferably approximately two hours, for example.

The temperature decreasing time after the second heating is, for example, preferably longer than or equal to 10 hours and shorter than or equal to 50 hours.

<Step S51>

Step S51 includes a step of preparing an added element source. The added element in this embodiment includes one or two selected from aluminum and nickel. The added element source such as aluminum or nickel is preferably prepared in the form of a metal alkoxide. In the case where zirconium is used as an added element, zirconium is preferably mixed in Step 51. A zirconium source is preferably prepared in the form of a metal alkoxide.

<Step S61>

Step S61 includes a step of dissolving the metal alkoxide in an alcohol, adding the mixture 903, and performing mixing. Step S61 includes a step of performing mixing by what is called a sol-gel method.

A mixed solution of the alcohol solution of the metal alkoxide and the particles of the mixture 903 is stirred under an atmosphere containing water vapor. The stirring can be performed with a magnetic stirrer, for example. The stirring time is not limited as long as water in the atmosphere and the metal alkoxide cause hydrolysis and a polycondensation reaction; for example, the stirring can be performed at 25° C. and a humidity of 90% RH (Relative Humidity) for four hours. Alternatively, the stirring may be performed under an atmosphere where the humidity and temperature are not adjusted, e.g., an air atmosphere in a fume hood. In such a case, the stirring time is preferably set longer and can be 12 hours or longer at room temperature, for example.

The water vapor in the atmosphere is gradually taken and the alcohol is gradually volatized to cause a reaction between water and the metal alkoxide, which enables a sol-gel reaction to proceed gently. Alternatively, a reaction between the metal alkoxide and water at room temperature enables a sol-gel reaction to proceed more gently than in the case where heating is performed at a temperature higher than the boiling point of the alcohol serving as a solvent, for example.

Water may be added positively. In the case where it is desirable that a gentle reaction be caused, the reaction time may be controlled by gradual addition of water diluted with the alcohol, a reduction of the amount of the alcohol, addition of stabilizer, or the like. The sol-gel reaction proceeding gently can form a covering film containing one or two selected from aluminum and nickel. Note that the covering film obtained is not necessarily uniform and is sometimes scattered.

After the above process, a precipitate is collected from the mixed solution. As the collection method, filtration, centrifugation, evaporation to dryness, or the like can be used. The precipitate can be washed with an alcohol that is the same as the solvent in which the metal alkoxide is dissolved. Note that in the case of employing evaporation to dryness, the solvent and the precipitate are not necessarily separated in this step; for example, the precipitate is collected in the subsequent drying step (Step S44).

<Step S62>

Step S62 includes a step of drying the collected residue to obtain a mixture 904. In the drying step, vacuum or ventilation drying can be performed at 80° C. for longer than or equal to one hour and shorter than or equal to four hours, for example.

Note that the mixture 903 may be covered with a film containing the added element that is deposited by a sputtering method or a vacuum evaporation method. Examples include heating while a stirring ball and the mixture 903 are stirred and heating while a container containing a stirring ball and the mixture 903 is vibrated. Heating with a rotary kiln is preferable as adhesion preventing annealing because the heating can be performed while stirring is performed in either case of a sequential rotary kiln or a batch-type rotary kiln. A sequential rotary kiln is preferable because of its high productivity. A batch-type rotary kiln is preferably employed to facilitate atmosphere control. In the case where a roller hearth kiln is used for heating, it is preferable that the container containing the mixture 903 be vibrated during the heating. The roller hearth kiln is preferable because it is a sequential rotary kiln and has high productivity.

<Step S63>

Step S63 includes a step of heating a resultant mixture. Step S63 is heating after Step S43 and is referred to as third heating using the ordinal number.

For the third heating, the retention time within the heating temperature range is preferably longer than or equal to one hour and shorter than or equal to 80 hours, further preferably longer than or equal to one hour and shorter than or equal to 20 hours in view of the productivity.

The temperature of the third heating is lower than 1000° C., preferably higher than or equal to 700° C. and lower than or equal to 950° C., further preferably approximately 850° C.

The atmosphere of the third heating preferably contains oxygen.

In this embodiment, the heating temperature is 850° C. and kept for two hours, the temperature rising rate is 200° C./h, and the flow rate of oxygen is 10 L/min.

The heating temperature in Step S63 is preferably lower than the heating temperature in Step S43.

<Step S66>

Step S66 includes a step of collecting the material that has been cooled. Then, the material is preferably made to pass through a sieve. In this manner, a positive electrode active material 100 of one embodiment of the present invention can be formed.

The condition (temperature or time) of each heating step described above may be changed, and the number of times of each heating may be N (N>2). Moreover, the heating step, the cooling step, and the collecting step may be repeated M times (M>2).

Note that the element contained in the positive electrode active material, such as the transition metal M, has a concentration gradient. For example, the gradient is such that the concentration decreases from the surface portion toward the inside. The transition metal M sometimes has a concentration gradient at the boundary between the surface portion and the inside, in which case the boundary cannot be clearly determined.

When a slight amount of magnesium exists at the lithium site of the lithium cobalt oxide, the positive electrode active material can have a characteristic crystal structure that is unlikely to be broken by repeated high-voltage charging and discharging.

The above crystal structure belongs to the space group R-3m, and is not a spinel crystal structure but a structure in which an ion of cobalt, magnesium, or the like is coordinated to six oxygen atoms and the cation arrangement has symmetry similar to that of the spinel crystal structure. Furthermore, the periodicity of $CoO_2$ layers of this structure is the same as that in the O3 type structure. Accordingly, this structure is referred to as an O3' type crystal structure or a pseudo-spinel crystal structure.

To make magnesium exist at the lithium site, it is preferable that an Mg source and the like be prepared not in Step S11 but in Step S21, the mixture 902 be formed in Step S23, the mixture 902 be mixed with LiMO2 of Step S14, and the heating of Step S43 be performed.

However, cation mixing occurs when the heat treatment temperature in Step S43 or Step S63 is excessively high, so that magnesium is highly likely to enter the cobalt sites. Magnesium present at the cobalt site is less effective in maintaining the crystal structure under repeated high-voltage charging and discharging. Furthermore, heat treatment at an excessively high temperature might have an adverse effect; for example, cobalt might be reduced to have divalence or lithium might sublimate. Thus, at least the second heating in Step S43 is performed at the aforementioned temperature.

The effect of the O3' type crystal structure can be brought about even when a slight amount of halogen such as fluorine is present randomly at the oxygen site of the lithium cobalt oxide.

This embodiment can be used in appropriate combination with the other embodiments.

Embodiment 5

This embodiment will describe examples of shapes of several types of secondary batteries including a positive electrode or a negative electrode formed by the manufacturing method described in the foregoing embodiment.

[Coin-Type Secondary Battery]

Figure 9A:
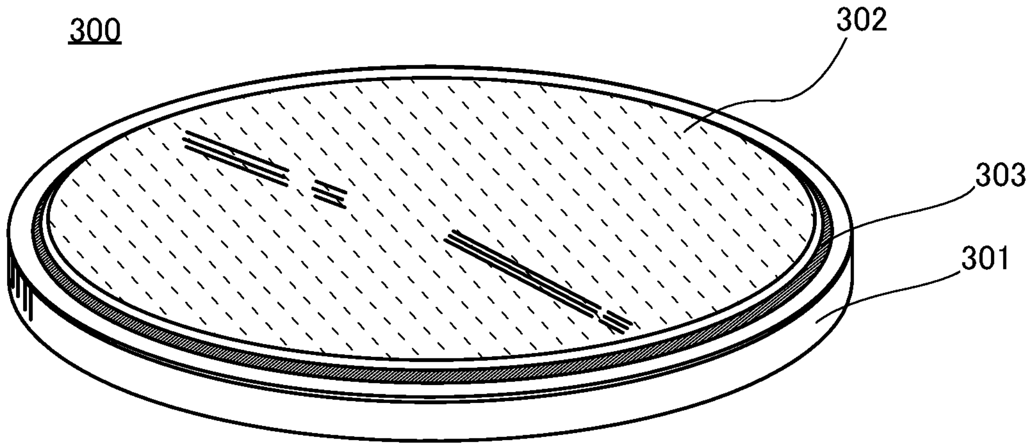
FIG. 9A and FIG. 9B are diagrams showing external appearance and a cross section of a coin-type secondary battery.
Figure 9B:
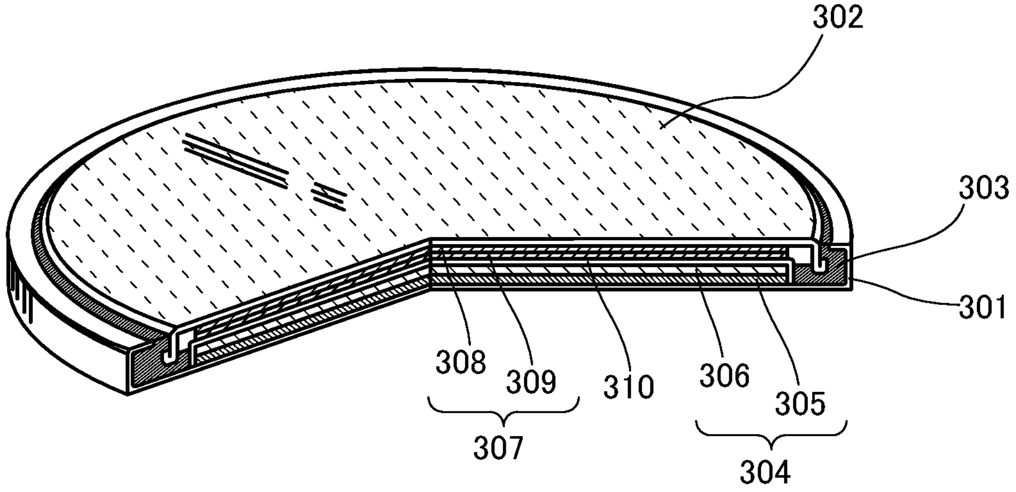

An example of a coin-type secondary battery is described. FIG. 9A is an external view of a coin-type (single-layer flat type) secondary battery, and FIG. 9B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having corrosion resistance to an electrolyte, such as nickel, aluminum, or titanium, an alloy of such a metal, or an alloy of such a metal and another metal (e.g., stainless steel) can be used. The positive electrode can 301 and the negative electrode can 302 are preferably covered with nickel, aluminum, or the like in order to prevent corrosion due to the electrolyte. The positive electrode can 301 and the negative electrode can 302 are electrically connected to the positive electrode 304 and the negative electrode 307, respectively.

The coin-type secondary battery 300 is manufactured in the following manner: the negative electrode 307, the positive electrode 304, and a separator 310 are immersed in an electrolyte solution; as shown in FIG. 9B, the positive electrode 304, the separator 310, the negative electrode 307, and the negative electrode can 302 are stacked in this order with the positive electrode can 301 positioned at the bottom; and then, the positive electrode can 301 and the negative electrode can 302 are subjected to pressure bonding with the gasket 303 therebetween.

By including the positive electrode 304 that is formed using particles of a first active material and configuring a conceptual tunnel structure with the use of an electrolyte solution, the coin-type secondary battery 300 can have high capacity, high discharge capacity, and excellent cycle performance. In the case where the secondary battery configures a conceptual tunnel structure with the use of an electrolyte solution between the negative electrode 307 and the positive electrode 304, the separator 310 can be unnecessary.

[Cylindrical Secondary Battery]

Figure 10A:
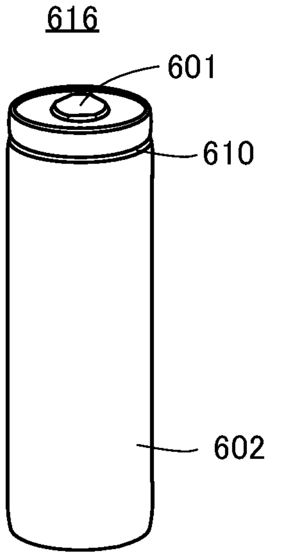
FIG. 10A, FIG. 10B, FIG. 10C, and FIG. 10D are diagrams showing external appearance, a cross section, and the like of a secondary battery.

An example of a cylindrical secondary battery is described with reference to FIG. 10A. As shown in FIG. 10A, a cylindrical secondary battery 616 includes a positive electrode cap (battery cap) 601 on the top surface and a battery can (outer can) 602 on the side surface and bottom surface. The battery can (outer can) 602 is formed using a metal material and has both an excellent water permeation barrier property and an excellent gas barrier property. The positive electrode cap 601 and the battery can (outer can) 602 are insulated from each other by a gasket (insulating gasket) 610.

Figure 10B:
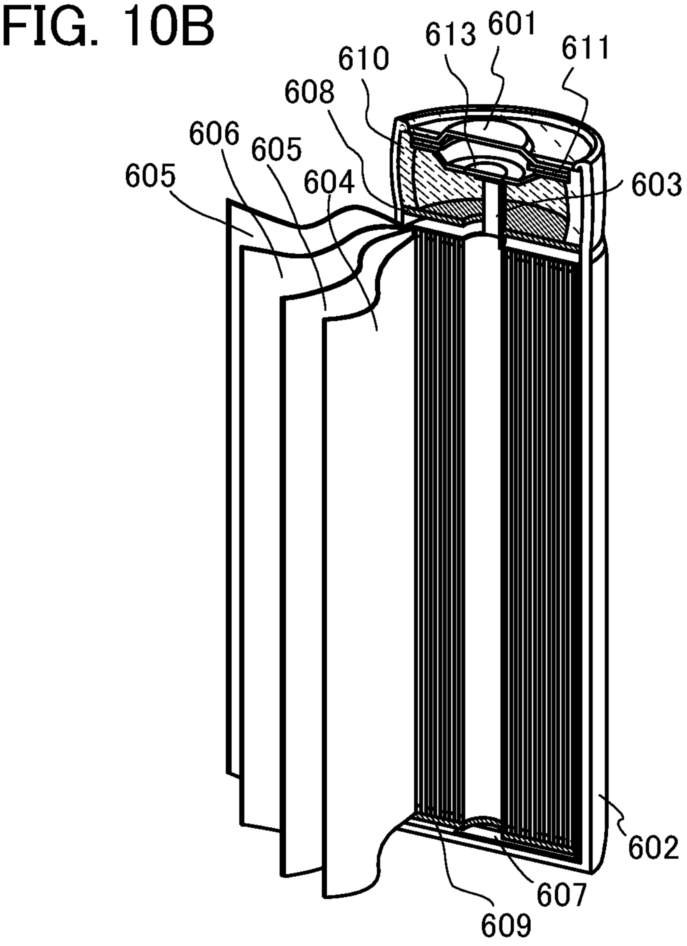

FIG. 10B schematically illustrates a cross section of a cylindrical secondary battery. The cylindrical secondary battery illustrated in FIG. 10B includes the positive electrode cap (battery cap) 601 on the top surface and the battery can (outer can) 602 on the side surface and bottom surface. The positive electrode cap and the battery can (outer can) 602 are insulated from each other by the gasket (insulating gasket) 610.

Inside the battery can 602 having a hollow cylindrical shape, a battery element in which a strip-like positive electrode 604 and a strip-like negative electrode 606 are wound with a strip-like separator 605 located therebetween is provided. Although not shown, the battery element is wound around a center pin. One end of the battery can 602 is close and the other end thereof is open. For the battery can 602, a metal having corrosion resistance to an electrolyte, such as nickel, aluminum, or titanium, an alloy of such a metal, or an alloy of such a metal and another metal (e.g., stainless steel) can be used. The battery can 602 is preferably covered with nickel, aluminum, or the like in order to prevent corrosion due to the electrolyte. Inside the battery can 602, the battery element in which the positive electrode, the negative electrode, and the separator are wound is provided between a pair of insulating plates 608 and 609 that face each other. The inside of the battery can 602 provided with the battery element is filled with an electrolyte solution (not shown). As the electrolyte solution, an electrolyte solution similar to that for the coin-type secondary battery can be used.

Since a positive electrode and a negative electrode that are used for a cylindrical storage battery are wound, active materials are preferably formed on both surfaces of a current collector.

By including the positive electrode active material of one embodiment of the present invention, the cylindrical secondary battery 616 can have high capacity, high discharge capacity, and excellent cycle performance.

A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 613 and the bottom of the battery can 602, respectively. The safety valve mechanism 613 is electrically connected to the positive electrode cap 601 through a PTC element (Positive Temperature Coefficient) 611. The safety valve mechanism 613 cuts off electrical connection between the positive electrode cap 601 and the positive electrode 604 when the internal pressure of the battery exceeds a predetermined threshold. The PTC element 611, which is a thermally sensitive resistor whose resistance increases as temperature rises, limits the amount of current by increasing the resistance, in order to prevent abnormal heat generation. Barium titanate ($BaTiO_3$)-based semiconductor ceramics or the like can be used for the PTC element.

Figure 10C:
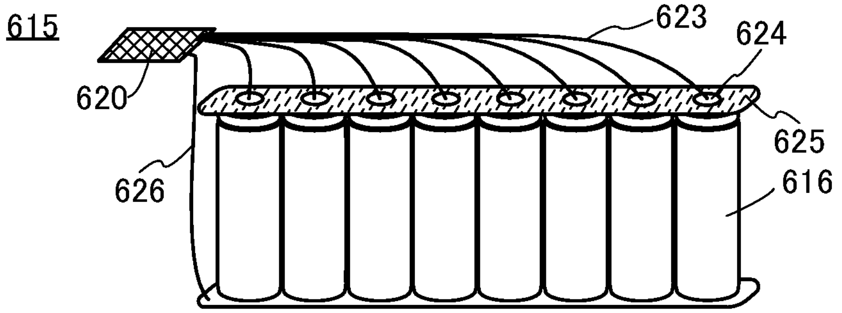

FIG. 10C shows an example of a power storage system 615. The power storage system 615 includes a plurality of the secondary batteries 616. The positive electrodes of the secondary batteries are in contact with and electrically connected to conductors 624 isolated by an insulator 625. The conductor 624 is electrically connected to a control circuit 620 through a wiring 623. The negative electrodes of the secondary batteries are electrically connected to the control circuit 620 through a wiring 626. As the control circuit 620, a charging and discharging control circuit for performing charging, discharging, and the like or a protection circuit for preventing overcharging or overdischarging can be used.

Figure 10D:
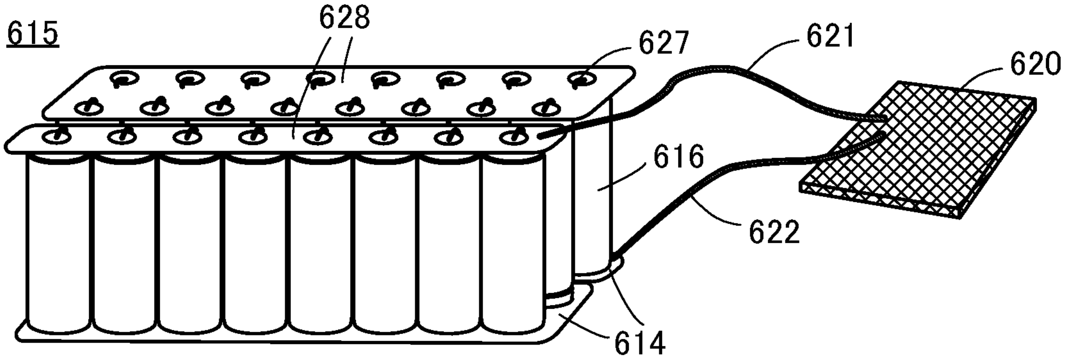

FIG. 10D shows an example of the power storage system 615. The power storage system 615 includes a plurality of the secondary batteries 616, and the plurality of secondary batteries 616 are sandwiched between a conductive plate 628 and a conductive plate 614. The plurality of secondary batteries 616 are electrically connected to the conductive plate 628 and the conductive plate 614 through a wiring 627. The plurality of secondary batteries 616 may be connected in parallel, connected in series, or connected in series after being connected in parallel. With the power storage system 615 including the plurality of secondary batteries 616, large electric power can be extracted.

The plurality of secondary batteries 616 may be connected in series after being connected in parallel.

A temperature control device may be provided between the plurality of secondary batteries 616. The secondary batteries 616 can be cooled with the temperature control device when overheated, whereas the secondary batteries 616 can be heated with the temperature control device when cooled too much. Thus, the performance of the power storage system 615 is less likely to be influenced by the outside temperature.

In FIG. 10D, the power storage system 615 is electrically connected to the control circuit 620 through a wiring 621 and a wiring 622. The wiring 621 is electrically connected to the positive electrodes of the plurality of secondary batteries 616 through the conductive plate 628. The wiring 622 is electrically connected to the negative electrodes of the plurality of secondary batteries 616 through the conductive plate 614.

[Other Structure Examples of Secondary Battery]

Structure examples of secondary batteries are described with reference to FIG. 11 and FIG. 12.

Figure 11A:
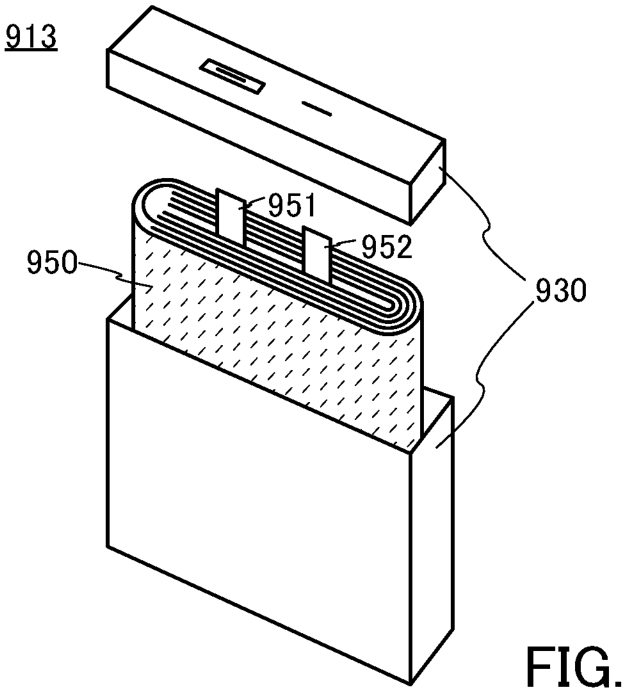
FIG. 11A, FIG. 11B, and FIG. 11C are diagrams showing external appearance, a cross section, and the like of a secondary battery.

A secondary battery 913 shown in FIG. 11A includes a wound body 950 provided with a terminal 951 and a terminal 952 inside a housing 930. The wound body 950 is immersed in an electrolyte solution inside the housing 930. The terminal 952 is in contact with the housing 930. The use of an insulator or the like prevents contact between the terminal 951 and the housing 930. Note that in FIG. 11A, the housing 930 divided into pieces is shown for convenience; however, in the actual structure, the wound body 950 is covered with the housing 930, and the terminal 951 and the terminal 952 extend to the outside of the housing 930. For the housing 930, a metal material (e.g., aluminum) or a resin material can be used.

Figure 11B:
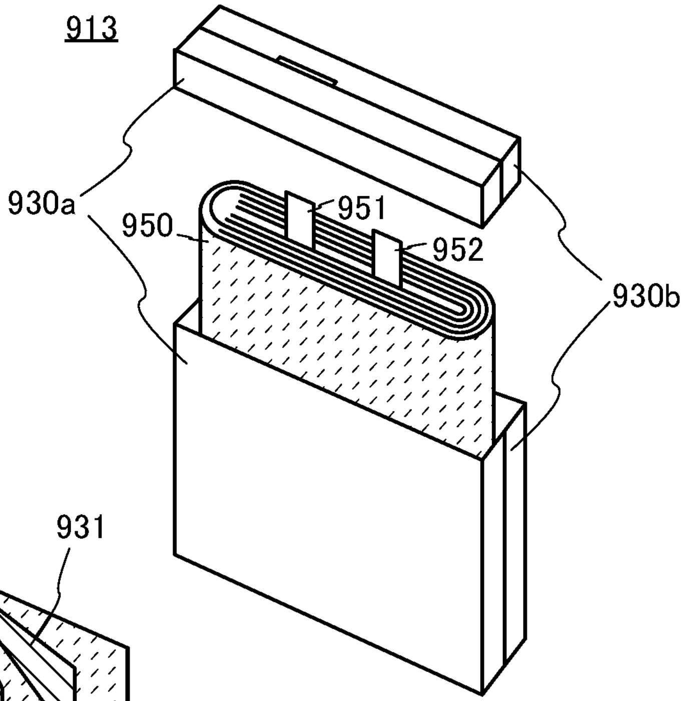

Note that as shown in FIG. 11B, the housing 930 in FIG. 11A may be formed using a plurality of materials. For example, in the secondary battery 913 shown in FIG. 11B, a housing 930*a* and a housing 930*b* are attached to each other, and the wound body 950 is provided in a region surrounded by the housing 930*a* and the housing 930*b*.

For the housing 930*a*, an insulating material such as an organic resin can be used. In particular, when a material such as an organic resin is used for the side on which an antenna is formed, blocking of an electric field by the secondary battery 913 can be inhibited. When an electric field is not significantly blocked by the housing 930*a*, an antenna may be provided inside the housing 930*a*. For the housing 930*b*, a metal material can be used, for example.

Figure 11C:
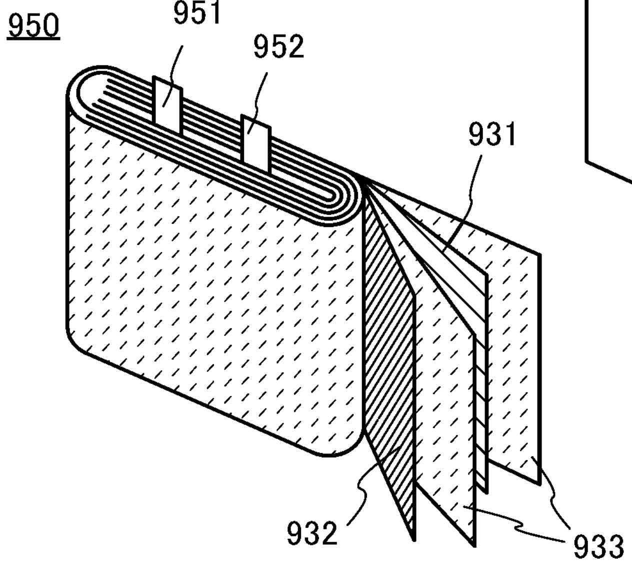

FIG. 11C shows the structure of the wound body 950. The wound body 950 includes a negative electrode 931, a positive electrode 932, and separators 933. The wound body 950 is obtained by winding a sheet of a stack in which the negative electrode 931 and the positive electrode 932 overlap with each other with the separator 933 therebetween. Note that a plurality of stacks each including the negative electrode 931, the positive electrode 932, and the separators 933 may be further stacked.

Figure 12A:
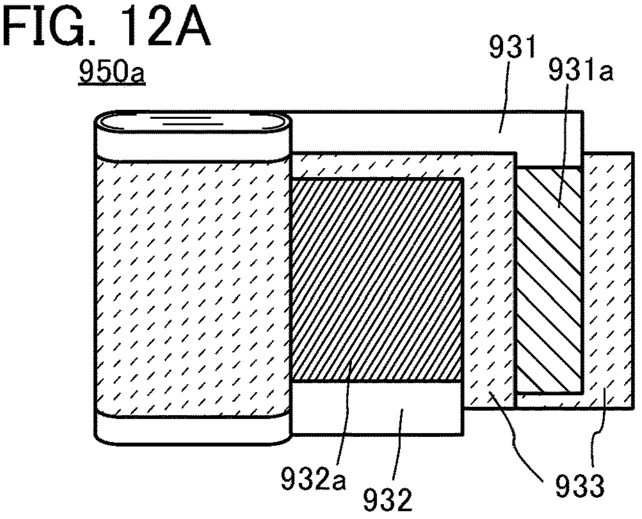
FIG. 12A, FIG. 12B, and FIG. 12C are diagrams showing external appearance, a cross section, and the like of a secondary battery.

As shown in FIG. 12A, the secondary battery 913 may include a wound body 950*a*. The wound body 950*a* shown in FIG. 12A includes the negative electrode 931, the positive electrode 932, and the separators 933. The negative electrode 931 includes a negative electrode active material layer 931*a*. The positive electrode 932 includes a positive electrode active material layer 932*a*.

By including the positive electrode 932 formed using the positive electrode active material of the present invention, the secondary battery 913 can have high capacity, high discharge capacity, and excellent cycle performance.

The separator 933 has a larger width than the negative electrode active material layer 931*a* and the positive electrode active material layer 932*a*, and is wound to overlap with the negative electrode active material layer 931*a* and the positive electrode active material layer 932*a*. In terms of safety, the width of the negative electrode active material layer 931*a* is preferably larger than that of the positive electrode active material layer 932*a*. The wound body 950*a* having such a shape is preferable because of its high degree of safety and high productivity.

Figure 12B:
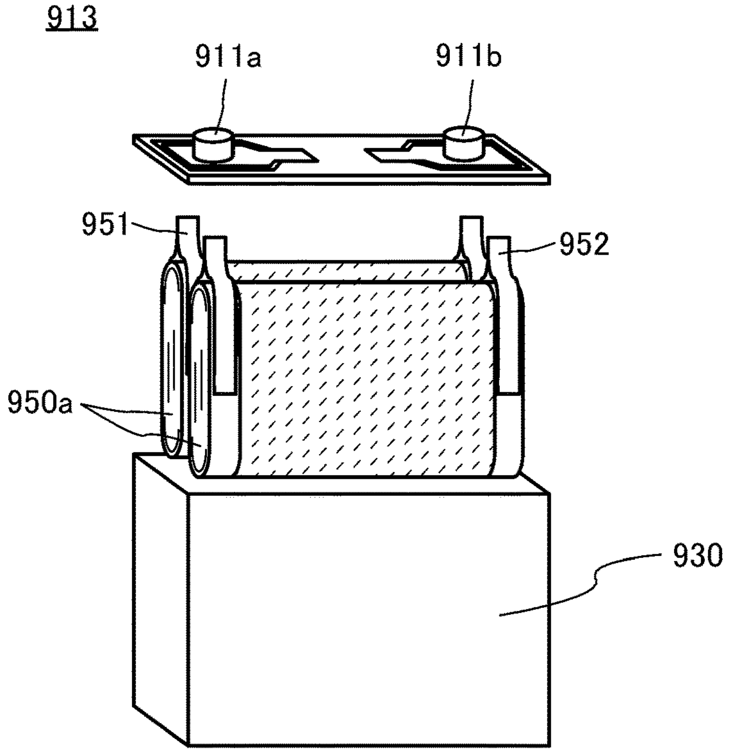

As shown in FIG. 12A and FIG. 12B, the negative electrode 931 is electrically connected to the terminal 951. The terminal 951 is electrically connected to a terminal 911*a*. The positive electrode 932 is electrically connected to the terminal 952. The terminal 952 is electrically connected to a terminal 911*b*.

Figure 12C:
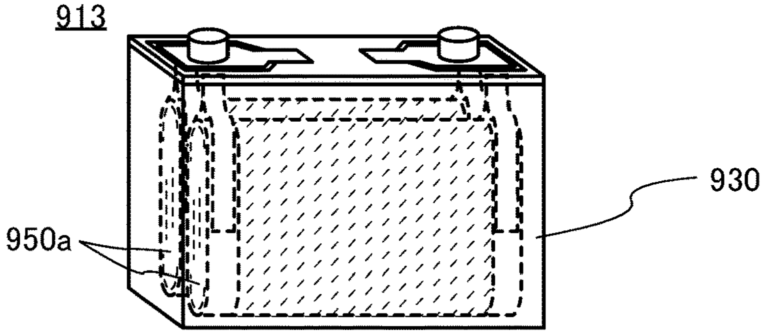

As shown in FIG. 12C, the wound body 950*a* and an electrolyte are covered with the housing 930, whereby the secondary battery 913 is completed. The housing 930 is preferably provided with a safety valve, an overcurrent protection element, and the like. A safety valve is a valve to be released, in order to prevent the battery from exploding, when the pressure inside the housing 930 reaches a predetermined pressure.

As shown in FIG. 12B, the secondary battery 913 may include a plurality of the wound bodies 950*a*. The use of the plurality of wound bodies 950*a* enables the secondary battery 913 to have higher discharge capacity. The description of the secondary battery 913 shown in FIG. 11A to FIG. 11B can be referred to for the other components of the secondary battery 913 shown in FIG. 12B.

This embodiment can be implemented in appropriate combination with the other embodiments.

Embodiment 6

In this embodiment, an example in which the present invention is applied to an electric vehicle (EV) is described using FIG. 13.

The electric vehicle is provided with first batteries 1301*a* and 1301*b* as main secondary batteries for driving and a second battery 1311 that supplies electric power to an inverter 1312 for starting a motor 1304. The second battery 1311 is a cranking battery (also referred to as a starter battery). The second battery 1311 only needs high output and high capacity is not so much needed; the capacity of the second battery 1311 is lower than that of the first batteries 1301*a* and 1301*b*.

The internal structure of the first battery 1301*a* may be a wound structure or a stacked structure.

Although this embodiment shows an example in which two of the first batteries 1301*a* and 1301*b* are connected in parallel, three or more batteries may be connected in parallel. In the case where the first battery 1301*a* can store sufficient electric power, the first battery 1301*b* may be omitted. By constituting a battery pack including a plurality of secondary batteries, large electric power can be extracted. The plurality of secondary batteries may be connected in parallel, connected in series, or connected in series after being connected in parallel. A plurality of secondary batteries are also referred to as an assembled battery.

An in-vehicle secondary battery includes a service plug or a circuit breaker that can cut off a high voltage without the use of equipment in order to cut off electric power from a plurality of secondary batteries and is provided in the first battery 1301*a*.

Electric power from the first batteries 1301*a* and 1301*b* is mainly used to rotate the motor 1304. The electric power from the first batteries 1301*a* and 1301*b* is sometimes supplied to in-vehicle parts for 42 V (such as an electric power steering 1307, a heater 1308, and a defogger 1309) through a DCDC circuit 1306. In the case where there is a rear motor 1317 for the rear wheels, the first battery 1301*a* is used to rotate the rear motor 1317.

The second battery 1311 supplies electric power to in-vehicle parts for 14 V (such as an audio 1313, power windows 1314, and lamps 1315) through a DCDC circuit 1310.

The first battery 1301*a* is described with reference to FIG. 13A.

Figure 13A:
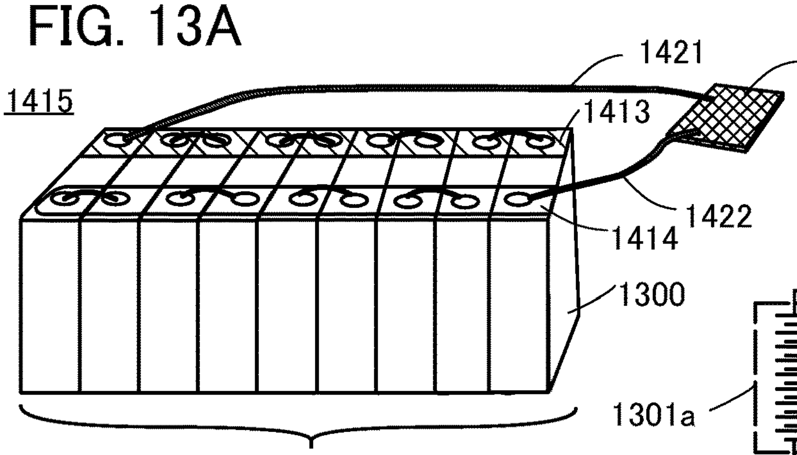
FIG. 13A, FIG. 13B, and FIG. 13C are diagrams showing external appearance, a system, and the like of a secondary battery.

FIG. 13A shows an example in which nine rectangular secondary batteries 1300 form one battery pack 1415. The nine rectangular secondary batteries 1300 are connected in series; one electrode of each battery is fixed by a fixing portion 1413 made of an insulator, and the other electrode thereof is fixed by a fixing portion 1414 made of an insulator. Although this embodiment shows an example in which the rectangular secondary batteries 1300 are fixed by the fixing portions 1413 and 1414, the rectangular secondary batteries 1300 may be stored in a battery container box (also referred to as a housing). Since a vibration or a jolt is assumed to be given to the vehicle from the outside (e.g., a road surface), a plurality of the secondary batteries are preferably fixed by the fixing portions 1413 and 1414, a battery container box, or the like. Furthermore, the one electrode is electrically connected to a control circuit portion 1320 through a wiring 1421. The other electrode is electrically connected to the control circuit portion 1320 through a wiring 1422.

The control circuit portion 1320 may include a memory circuit including a transistor using an oxide semiconductor. A charging control circuit or a battery control system that includes a memory circuit including a transistor using an oxide semiconductor may be referred to as a BTOS (Battery operating system or Battery oxide semiconductor).

The control circuit portion 1320 detects a terminal voltage of the secondary battery and controls the charging and discharging state of the secondary battery. For example, to prevent overcharging, an output transistor of a charging circuit and an interruption switch can be turned off substantially at the same time.

Figure 13B:
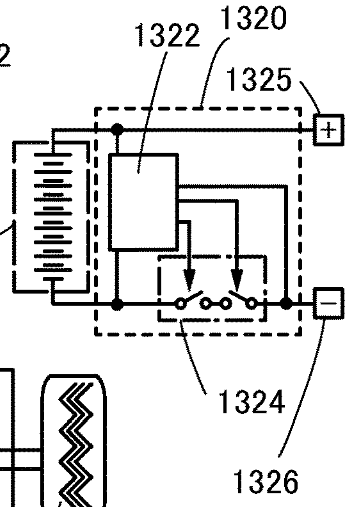

FIG. 13B shows an example of a block diagram of the battery pack 1415 shown in FIG. 13A.

The control circuit portion 1320 includes a switch portion 1324 that includes at least a switch for preventing overcharging and a switch for preventing overdischarging, a control circuit 1322 for controlling the switch portion 1324, and a portion for measuring the voltage of the first battery 1301*a*. In the control circuit portion 1320, the upper limit voltage and the lower limit voltage of the secondary battery to be used are set, and the upper limit of a current from the outside, the upper limit of an output current to the outside, and the like are imposed. The range from the lower limit voltage to the upper limit voltage of the secondary battery falls within the recommended voltage range, and when a voltage falls outside the range, the switch portion 1324 operates and the control circuit portion 1320 can function as a protection circuit. The control circuit portion 1320 can also be referred to as a protection circuit because it controls the switch portion 1324 to prevent overdischarging and/or overcharging. For example, when the control circuit 1322 detects a voltage that is likely to cause overcharging, a current is interrupted by turning off the switch in the switch portion 1324. Furthermore, a function of interrupting a current in accordance with a temperature rise may be set by providing a PTC element in the charging and discharging path. The control circuit portion 1320 includes an external terminal 1325 (+IN) and an external terminal 1326 (−IN).

The switch portion 1324 can be formed by a combination of an n-channel transistor and a p-channel transistor. The switch portion 1324 is not limited to a switch including a Si transistor using single crystal silicon; the switch portion 1324 may be formed using a power transistor containing Ge (germanium), SiGe (silicon germanium), GaAs (gallium arsenide), GaAlAs (gallium aluminum arsenide), InP (indium phosphide), SiC (silicon carbide), ZnSe (zinc selenide), GaN (gallium nitride), $GaO_x$ (gallium oxide, where x is a real number greater than 0), or the like. A memory element using an OS transistor can be freely placed by being stacked over a circuit using a Si transistor, for example; hence, integration can be easy. Furthermore, an OS transistor can be manufactured with a manufacturing apparatus similar to that for a Si transistor and thus can be manufactured at low cost. That is, the control circuit portion 1320 including OS transistors can be stacked over the switch portion 1324 so that they can be integrated into one chip. Since the area occupied by the control circuit portion 1320 can be reduced, a reduction in size is possible.

Figure 13C:
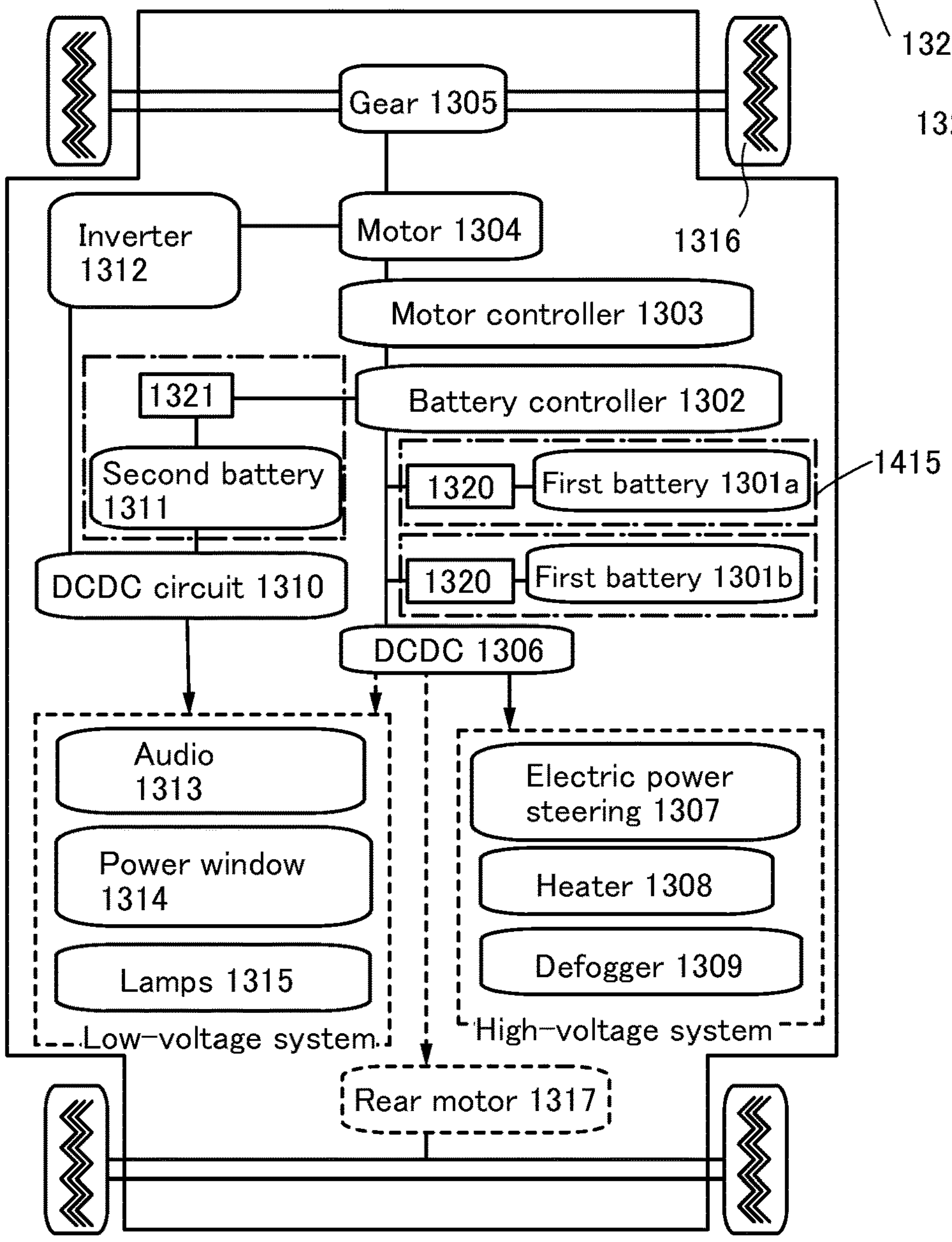

FIG. 13C shows an example in which the battery pack 1415 shown in FIG. 13A is applied to an electric vehicle (EV). In the electric vehicle (EV), the first batteries 1301*a* and 1301*b* mainly supply electric power to in-vehicle parts for 42 V (for a high-voltage system), and the second battery 1311 supplies electric power to in-vehicle parts for 14 V (for a low-voltage system). Lead batteries are usually used for the second battery 1311 because of their cost advantage.

In this embodiment, an example in which a lithium-ion secondary battery is used as both the first battery 1301*a* and the second battery 1311 is described. As the second battery 1311, a lead battery, an all-solid-state battery, or an electric double layer capacitor may be used.

Regenerative energy generated by rolling of tires 1316 is transmitted to the motor 1304 through a gear 1305, and is stored in the second battery 1311 from a motor controller 1303 or a battery controller 1302 through a control circuit portion 1321. Alternatively, the regenerative energy is stored in the first battery 1301*a* from the battery controller 1302 through the control circuit portion 1320. Alternatively, the regenerative energy is stored in the first battery 1301*b* from the battery controller 1302 through the control circuit portion 1320. For efficient charging with regenerative energy, the first batteries 1301*a* and 1301*b* are desirably capable of fast charging.

The battery controller 1302 can set the charging voltage, charging current, and the like of the first batteries 1301*a* and 1301*b*. The battery controller 1302 can set charging conditions in accordance with charging performance of a secondary battery to be used, so that fast charging can be performed.

Although not shown, in the case of connection to an external charger, a plug of the charger or a connection cable of the charger is electrically connected to the battery controller 1302. Electric power supplied from the external charger is stored in the first batteries 1301*a* and 1301*b* through the battery controller 1302. Some chargers are provided with a control circuit, in which case the function of the battery controller 1302 is not used; to prevent overcharging, the first batteries 1301*a* and 1301*b* are preferably charged through the control circuit portion 1320. In addition, a connection cable or a connection cable of the charger is sometimes provided with a control circuit. The control circuit portion 1320 is also referred to as an ECU (Electronic Control Unit). The ECU is connected to a CAN (Controller Area Network) provided in the electric vehicle. The CAN is a type of a serial communication standard used as an in-vehicle LAN. The ECU includes a microcomputer. Moreover, the ECU uses a CPU or an FIGPU.

Next, examples in which the secondary battery of one embodiment of the present invention is mounted on a vehicle, typically a transport vehicle, will be described.

Mounting the secondary battery of one embodiment of the present invention on vehicles can achieve next-generation clean energy vehicles such as hybrid vehicles (HVs), electric vehicles (EVs), and plug-in hybrid vehicles (PHVs). The secondary battery can also be mounted on transport vehicles such as agricultural machines, motorized bicycles including motor-assisted bicycles, motorcycles, electric wheelchairs, electric carts, boats and ships, submarines, aircraft such as fixed-wing aircraft or rotary-wing aircraft, rockets, artificial satellites, space probes, star probes, or spacecraft. The secondary battery of one embodiment of the present invention can have high capacity. Thus, the secondary battery of one embodiment of the present invention is suitable for reduction in size and weight and is preferably used in transport vehicles.

Figure 14A:
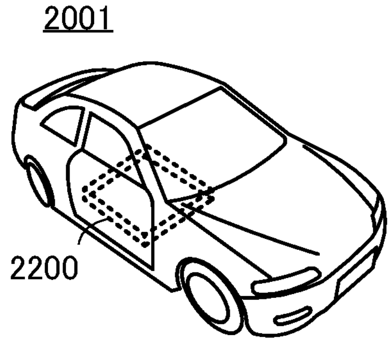
FIG. 14A, FIG. 14B, FIG. 14C, and FIG. 14D are diagrams showing a vehicle and the like each including a secondary battery.

FIG. 14A to FIG. 14D show examples of transport vehicles that include the secondary battery of one embodiment of the present invention. An automobile 2001 shown in FIG. 14A is an electric vehicle that runs on an electric motor as a power source. Alternatively, the automobile 2001 is a hybrid vehicle that can appropriately select an electric motor or an engine as a driving power source. The automobile 2001 shown in FIG. 14A includes a battery pack 2200, and the battery pack includes a secondary battery module in which a plurality of secondary batteries are connected to each other. Moreover, a charging control device that is electrically connected to the secondary battery module is preferably included.

The automobile 2001 can be charged when the secondary battery included in the automobile 2001 is supplied with electric power through external charging equipment by a plug-in system, a contactless power feeding system, or the like. In charging, a given method such as CHAdeMO (registered trademark) or Combined Charging System can be employed as a charging method, the standard of a connector, or the like as appropriate. The secondary battery may be a charging station provided in a commerce facility or a power source in a house. For example, with the use of the plug-in technique, the power storage device mounted on the automobile 2001 can be charged by being supplied with electric power from outside. The charging can be performed by converting AC electric power into DC electric power through a converter such as an ACDC converter.

Although not shown, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the vehicle is stopped but also when driven. In addition, the contactless power feeding system may be utilized to perform transmission and reception of electric power between two vehicles. Furthermore, a solar cell may be provided in the exterior of the vehicle to charge the secondary battery when the vehicle stops or moves. To supply electric power in such a contactless manner, an electromagnetic induction method or a magnetic resonance method can be used.

Figure 14B:
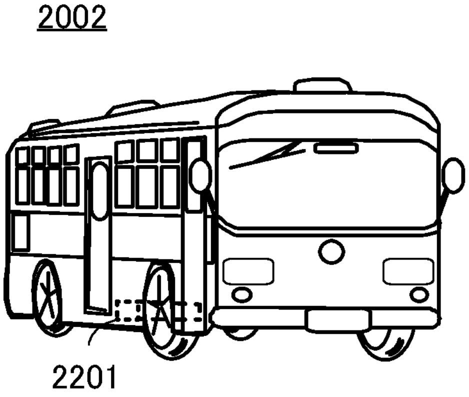

FIG. 14B shows a large transporter 2002 having a motor controlled by electricity as an example of a transport vehicle. A secondary battery module of the transporter 2002 includes a cell unit of four secondary batteries with a voltage higher than or equal to 3.5 V and lower than or equal to 4.7 V, for example, and 48 cells are connected in series to have a maximum voltage of 170 V. A battery pack 2201 has the same function as that in FIG. 14A except, for example, the number of secondary batteries configuring the secondary battery module; thus, the description is omitted.

Figure 14C:
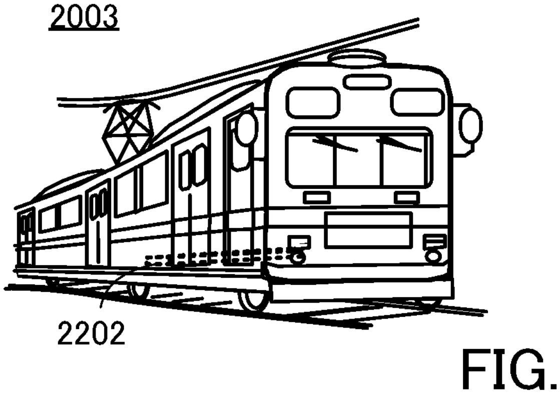

FIG. 14C shows a large transportation vehicle 2003 having a motor controlled by electricity as an example. The secondary battery module of the transportation vehicle 2003 has 100 or more secondary batteries with a voltage higher than or equal to 3.5 V and lower than or equal to 4.7 V connected in series, and the maximum voltage is 600 V, for example. Thus, the secondary batteries are required to have a small variation in the characteristics. Using the positive electrode active material of one embodiment of the present invention for a positive electrode enables manufacture of secondary batteries having stable battery performance; thus, low-cost mass production is possible in light of the yield. A battery pack 2202 has the same function as that in FIG. 14A except, for example, the number of secondary batteries configuring the secondary battery module; thus, the description is omitted.

Figure 14D:
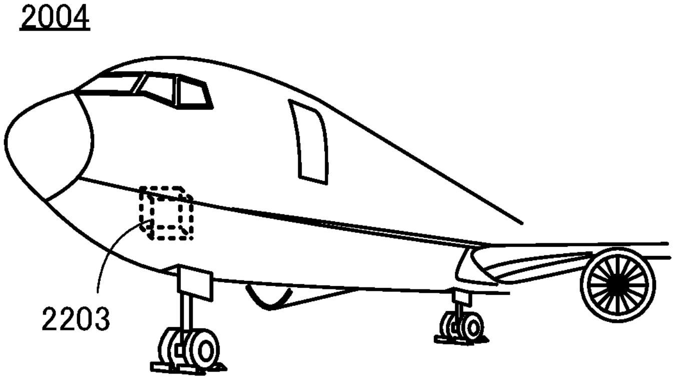

FIG. 14D shows an aircraft 2004 having a combustion engine as an example. The aircraft 2004 shown in FIG. 14D is regarded as a kind of transport vehicles because it has wheels for takeoff and landing, and includes a battery pack 2203 that includes a charging control device and a secondary battery module configured by connecting a plurality of secondary batteries.

The secondary battery module of the aircraft 2004 has eight 4 V secondary batteries connected in series and has a maximum voltage of 32 V, for example. The battery pack 2203 has the same function as that in FIG. 14A except, for example, the number of secondary batteries configuring the secondary battery module; thus, the description is omitted.

This embodiment can be used in appropriate combination with the other embodiments.

Embodiment 7

In this embodiment, examples in which the secondary battery of one embodiment of the present invention is mounted on a building will be described with reference to FIG. 15A and FIG. 15B.

Figure 15A:
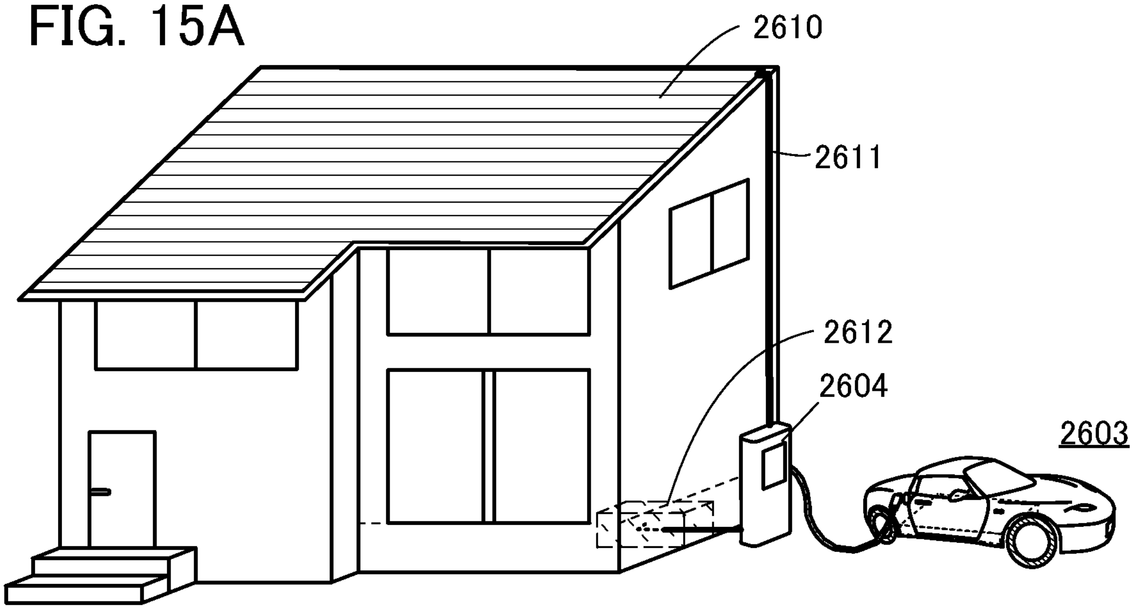
FIG. 15A and FIG. 15B are diagrams showing a house and the like each provided with a secondary battery.

A house shown in FIG. 15A includes a power storage device 2612 including the secondary battery of one embodiment of the present invention and a solar panel 2610. The power storage device 2612 is electrically connected to the solar panel 2610 through a wiring 2611 or the like. The power storage device 2612 may be electrically connected to ground-based charging equipment 2604. The power storage device 2612 can be charged with electric power generated by the solar panel 2610. The secondary battery included in a vehicle 2603 can be charged with the electric power stored in the power storage device 2612 through the charging equipment 2604. The power storage device 2612 is preferably provided in an underfloor space. When the power storage device 2612 is provided in the underfloor space, the space on the floor can be effectively used. Alternatively, the power storage device 2612 may be provided on the floor.

The electric power stored in the power storage device 2612 can also be supplied to other electronic devices in the house. Thus, with the use of the power storage device 2612 of one embodiment of the present invention as an uninterruptible power source, electronic devices can be used even when electric power cannot be supplied from a commercial power source due to power failure or the like.

Figure 15B:
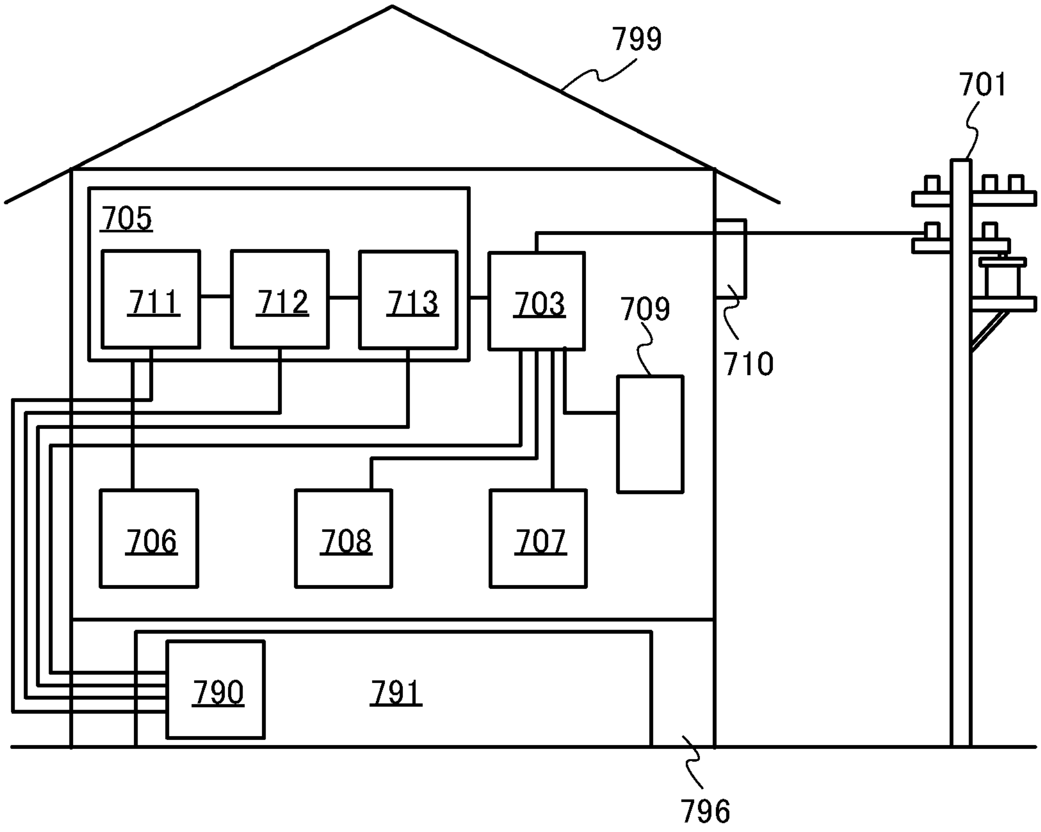

FIG. 15B shows an example of a power storage device of one embodiment of the present invention. As shown in FIG. 15B, a power storage device 791 of one embodiment of the present invention is provided in an underfloor space 796 of a building 799.

The power storage device 791 is provided with a control device 790, and the control device 790 is electrically connected to a distribution board 703, a power storage controller 705 (also referred to as a control device), an indicator 706, and a router 709 through wirings.

Electric power is transmitted from a commercial power source 701 to the distribution board 703 through a service wire mounting portion 710. Moreover, electric power is transmitted to the distribution board 703 from the power storage device 791 and the commercial power source 701, and the distribution board 703 supplies the transmitted electric power to a general load 707 and a power storage load 708 through outlets (not shown).

The general load 707 is, for example, an electric device such as a TV or a personal computer. The power storage load 708 is, for example, an electric device such as a microwave oven, a refrigerator, or an air conditioner.

The power storage controller 705 includes a measuring portion 711, a predicting portion 712, and a planning portion 713. The measuring portion 711 has a function of measuring the amount of electric power consumed by the general load 707 and the power storage load 708 during a day (for 24 hours from 12 o'clock at night, for example). The measuring portion 711 may have a function of measuring the amount of electric power of the power storage device 791 and the amount of electric power supplied from the commercial power source 701. The predicting portion 712 has a function of predicting, on the basis of the amount of electric power consumed by the general load 707 and the power storage load 708 during a given day, the demand for electric power consumed by the general load 707 and the power storage load 708 during the next day. The planning portion 713 has a function of making a charging and discharging plan of the power storage device 791 on the basis of the demand for electric power predicted by the predicting portion 712.

The amount of electric power consumed by the general load 707 and the power storage load 708 and measured by the measuring portion 711 can be checked with the indicator 706. It can be checked with an electric device such as a TV or a personal computer through the router 709. Furthermore, it can be checked with a portable electronic terminal such as a smartphone or a tablet through the router 709. With the indicator 706, the electric device, or the portable electronic terminal, the demand for electric power depending on a time period (or per hour) that is predicted by the predicting portion 712 can be checked, for example.

This embodiment can be used in appropriate combination with the other embodiments.

Embodiment 8

In this embodiment, examples of electronic devices each including the secondary battery of one embodiment of the present invention will be described. Examples of the electronic device including the secondary battery include a television device (also referred to as a TV or a television receiver), a monitor of a computer and the like, a digital camera, a digital video camera, a digital photo frame, a mobile phone (also referred to as a cellular phone or a mobile phone device), a portable game machine, a portable information terminal, an audio reproducing device, and a large-sized game machine such as a pachinko machine. Examples of the portable information terminal include a notebook personal computer, a tablet terminal, an e-book reader, and a mobile phone.

Figure 16A:
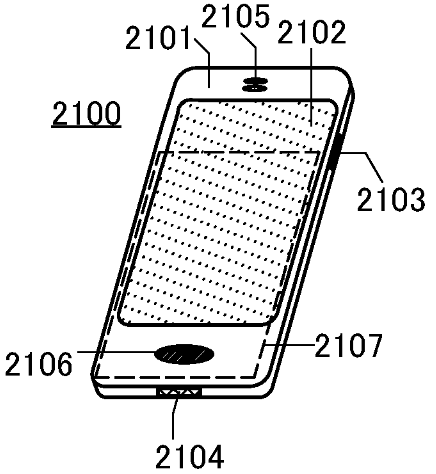
FIG. 16A, FIG. 16B, FIG. 16C, and FIG. 16D are diagrams showing electronic devices and the like each including a secondary battery.

FIG. 16A shows an example of a mobile phone. A mobile phone 2100 includes a housing 2101 in which a display portion 2102 is incorporated, an operation button 2103, an external connection port 2104, a speaker 2105, a microphone 2106, and the like. Note that the mobile phone 2100 includes a secondary battery 2107. The use of the secondary battery 2107 that includes a positive electrode formed using the positive electrode active material of one embodiment of the present invention enables high capacity and a structure that accommodates space saving due to a reduction in size of the housing.

The mobile phone 2100 is capable of executing a variety of applications such as mobile phone calls, e-mailing, viewing and editing texts, music reproduction, Internet communication, and computer games.

With the operation button 2103, a variety of functions such as time setting, power on/off operation, wireless communication on/off operation, execution and cancellation of a silent mode, and execution and cancellation of a power saving mode can be performed. For example, the functions of the operation button 2103 can also be set freely by an operating system incorporated in the mobile phone 2100.

In addition, the mobile phone 2100 can execute near field communication conformable to a communication standard. For example, mutual communication between the mobile phone 2100 and a headset capable of wireless communication enables hands-free calling.

Moreover, the mobile phone 2100 includes the external connection port 2104, and data can be directly transmitted to and received from another information terminal via a connector. In addition, charging can be performed via the external connection port 2104. Note that the charging operation may be performed by wireless power feeding without using the external connection port 2104.

The mobile phone 2100 preferably includes a sensor. As the sensor, for example, a human body sensor such as a fingerprint sensor, a pulse sensor, or a temperature sensor, a touch sensor, a pressure sensitive sensor, or an acceleration sensor is preferably mounted.

Figure 16B:
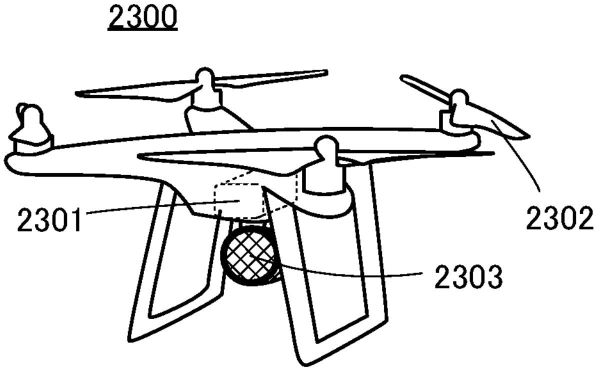

FIG. 16B shows an unmanned aircraft 2300 including a plurality of rotors 2302. The unmanned aircraft 2300 is also referred to as a drone. The unmanned aircraft 2300 includes a secondary battery 2301 of one embodiment of the present invention, a camera 2303, and an antenna (not shown). The unmanned aircraft 2300 can be remotely controlled through the antenna. The secondary battery that includes a positive electrode formed using the positive electrode active material of one embodiment of the present invention has a high energy density and a high degree of safety; thus, the secondary battery can be used safely for a long time over a long period of time and is suitable as the secondary battery included in the unmanned aircraft 2300.

Figure 16C:
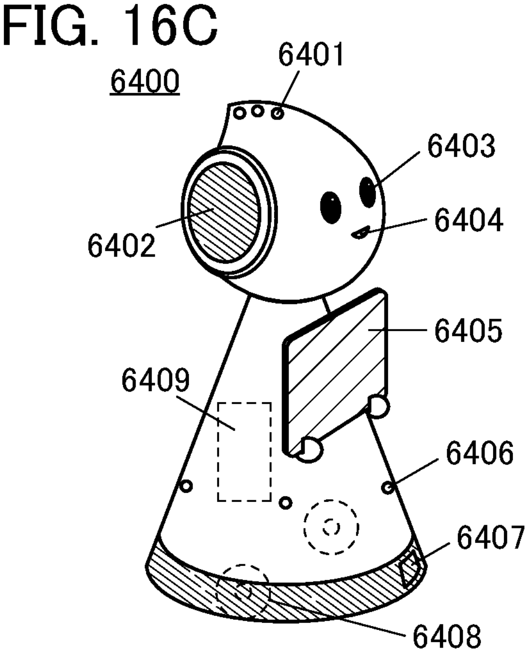

FIG. 16C shows an example of a robot. A robot 6400 shown in FIG. 16C includes a secondary battery 6409, an illuminance sensor 6401, a microphone 6402, an upper camera 6403, a speaker 6404, a display portion 6405, a lower camera 6406, an obstacle sensor 6407, a moving mechanism 6408, an arithmetic device, and the like.

The microphone 6402 has a function of detecting a speaking voice of a user, an environmental sound, and the like. The speaker 6404 has a function of outputting sound. The robot 6400 can communicate with a user using the microphone 6402 and the speaker 6404.

The display portion 6405 has a function of displaying various kinds of information. The robot 6400 can display information desired by a user on the display portion 6405. The display portion 6405 may be provided with a touch panel. Moreover, the display portion 6405 may be a detachable information terminal, in which case charging and data communication can be performed when the display portion 6405 is set at the home position of the robot 6400.

The upper camera 6403 and the lower camera 6406 each have a function of taking an image of the surroundings of the robot 6400. The obstacle sensor 6407 can detect an obstacle in the direction where the robot 6400 advances with the moving mechanism 6408. The robot 6400 can move safely by recognizing the surroundings with the upper camera 6403, the lower camera 6406, and the obstacle sensor 6407.

The robot 6400 includes the secondary battery 6409 of one embodiment of the present invention and a semiconductor device or an electronic component in its interior region. The secondary battery that includes a positive electrode formed using the positive electrode active material of one embodiment of the present invention has a high energy density and a high degree of safety; thus, the secondary battery can be used safely for a long time over a long period of time and is suitable as the secondary battery 6409 included in the robot 6400.

Figure 16D:
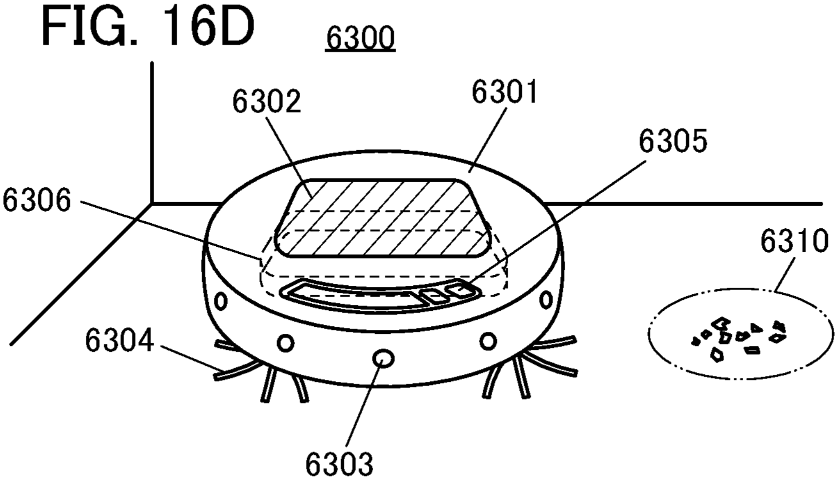

FIG. 16D shows an example of a cleaning robot. A cleaning robot 6300 includes a display portion 6302 placed on the top surface of a housing 6301, a plurality of cameras 6303 placed on the side surface of the housing 6301, a brush 6304, operation buttons 6305, a secondary battery 6306, a variety of sensors, and the like. Although not shown, the cleaning robot 6300 is provided with a tire, an inlet, and the like. The cleaning robot 6300 is self-propelled, detects dust 6310, and sucks up the dust through the inlet provided on the bottom surface.

For example, the cleaning robot 6300 can determine whether there is an obstacle such as a wall, furniture, or a step by analyzing images taken by the cameras 6303. In the case where the cleaning robot 6300 detects an object, such as a wire, that is likely to be caught in the brush 6304 by image analysis, the rotation of the brush 6304 can be stopped. The cleaning robot 6300 includes the secondary battery 6306 of one embodiment of the present invention and a semiconductor device or an electronic component in its interior region. The secondary battery that includes a positive electrode formed using the positive electrode active material of one embodiment of the present invention has a high energy density and a high degree of safety; thus, the secondary battery can be used safely for a long time over a long period of time and is suitable as the secondary battery 6306 included in the cleaning robot 6300.

This embodiment can be implemented in appropriate combination with the other embodiments.

EXAMPLE

The present invention will be specifically described below with examples. Note that the present invention is not limited to these examples.

Example 1

In an ionic liquid in this example, EMI (an imidazolium cation) was used as a cation and FSI was used as an anion. Hereinafter, this ionic liquid is sometimes referred to as EMI-FSI. As an organic solvent in this example, FEC, EMC, or DEC was used. As a lithium salt in this example, Li_FSI was used. Table 1 shows details of nonaqueous solvents as Sample 1 to Sample 3 and Reference Example 1 to Reference Example 3.

TABLE 1

| | Ionic liquid | Organic solvent | Ionic liquid:organic solvent | Li salt |
|---|---|---|---|---|
| Sample 1 | 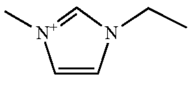 (111) 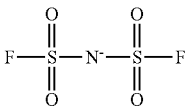 (H11) | 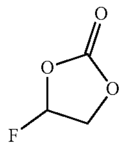 | 7.0:3.0 | 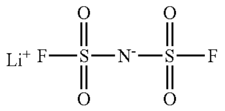 |
| Sample 2 | | 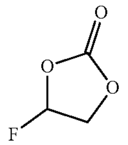 | 8.5:1.5 | |
| Sample 3 | | 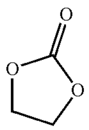 | 7.0:3.0 | |

TABLE 1-continued

| | Ionic liquid | Organic solvent | Ionic liquid:organic solvent | Li salt |
|---|---|---|---|---|
| Reference Example 1 | | — | — | |
| Reference Example 2 | | 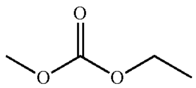 | 7.0:3.0 | |
| Reference Example 3 | | 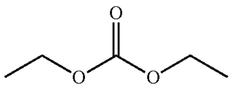 | 7.0:3.0 | |

Sample 1 is a nonaqueous solvent formed by mixing EMI-FSI and FEC and adding 2.15 mol of Li_FSI as the lithium salt. In Sample 1, the volume ratio between EMI-FSI and FEC was EMI-FSI:FEC=7.0:3.0. This is a proportion such that EMI-FSI accounts for 70 vol % in the nonaqueous solvent. Note that FEC is a fluorinated cyclic carbonate.

In Sample 2, the volume ratio between EMI-FSI and FEC was EMI-FSI:FEC=8.5:1.5, which was different from that in Sample 1. This is a proportion such that EMI-FSI accounts for 85 vol % in the nonaqueous solvent. Sample 2 is similar to Sample 1 in terms of the other things.

Sample 3 is a nonaqueous solvent formed by mixing EMI-FSI and EC and adding 2.15 mol of Li_FSI as the lithium salt. In Sample 3, the volume ratio between EMI-FSI and EC was EMI-FSI:EC=7:3. This is a proportion such that EMI-FSI accounts for 70 vol % in the nonaqueous solvent. Note that EC is a fluorine-free cyclic carbonate.

Reference Example 1 is a nonaqueous solvent which contains EMI-FSI and in which no organic solvent is mixed, and is formed by adding 2.15 mol of Li_FSI as the lithium salt. Reference Example 2 is a nonaqueous solvent formed by mixing EMI-FSI and EMC and adding 2.15 mol of Li_FSI as the lithium salt. EMC is a fluorine-free linear carbonate. Reference Example 3 is a nonaqueous solvent formed by mixing EMI-FSI and DEC and adding 2.15 mol of Li_FSI as the lithium salt. DEC is a fluorine-free linear carbonate and has a longer side chain than EMC does.

Table 2 shows the viscosity of the ionic liquid and the organic solvents. The viscosity values when no lithium salt was added are shown in Table 2.

TABLE 2

| Ionic liquid | Viscosity (mPa · s) |
|---|---|
| 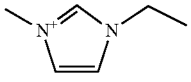 (111) 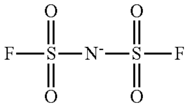 (H11) | 18 |

| Organic solvent | Viscosity (mPa · s) |
|---|---|
| 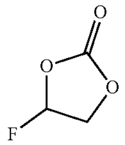 | 4.1 |

| Organic solvent | Viscosity (mPa · s) |
|---|---|
| 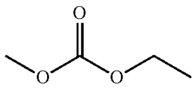 | 0.65 |

| Organic solvent | Viscosity (mPa · s) |
|---|---|
| 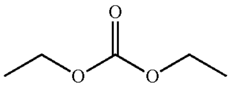 | 0.75 |

The ionic liquid was found to have higher viscosity than the organic solvents. The linear carbonates EMC and DEC were found to have lower viscosity than the cyclic carbonate FEC.

The viscosity of the nonaqueous solvents as Sample 1 to Sample 3 and Reference Example 1 to Reference Example 3 was measured at 20° C. and −15° C. The results are shown in Table 3. The viscosity values when the lithium salt was contained are shown in Table 3. The viscosity was measured using a rotational viscometer (TVE-35L by Toki Sangyo Co., Ltd.).

TABLE 3

| | Viscosity of nonaqueous solvent (mPa · s) | | | | | |
|---|---|---|---|---|---|---|
| Measurement temperature | Sample 1 | Sample 2 | Sample 3 | Reference Example 1 | Reference Example 2 | Reference Example 3 |
| 20° C. | 54.4 | 63.9 | 63.5 | 74.8 | 49.2 | 56.8 |
| −15° C. | 368 | 473 | 512 | 534 | 306 | 363 |

From Table 3, it was confirmed that Sample 1 to Sample 3 each containing an organic solvent had lower viscosity than Reference Example 1 at 20° C. and −15° C. No organic solvent was mixed in Reference Example 1, and it was shown that an organic solvent is preferably mixed to reduce the viscosity. Reference Example 2 had the lowest viscosity. It was shown that to further reduce the viscosity, a linear carbonate is preferred to a cyclic carbonate among organic solvents. It was found that mixing a low-viscosity organic solvent with the ionic liquid leads to low viscosity of the nonaqueous solvent. The nonaqueous solvent with low viscosity is preferred because of its high carrier ion conductivity, e.g., high lithium ion conductivity.

The viscosity of Sample 1 and Reference Example 1 was further measured at temperatures of 10° C. and 0° C. The results are shown in Table 4. Table 4 also shows the viscosity measured at a temperature of 20° C., which is shown in Table 3 above.

TABLE 4

| | Viscosity of nonaqueous solvent (mPa · s) | | |
|---|---|---|---|
| Measurement temperature | Sample 1 Viscosity (X) | Reference Example 1 Viscosity (Y) | Viscosity (X)/ viscosity (Y) × 100 |
| 20° C. | 54.4 | 74.8 | 72.7 |
| 10° C. | 84.2 | 116.7 | 72.2 |
| 0° C. | 150.4 | 196.8 | 76.4 |

It was found that Sample 1 had lower viscosity than Reference Example 1 at any of the measurement temperatures.

Table 4 also shows the values of viscosity (X)/viscosity (Y)×100, where viscosity (X) is the viscosity of Sample 1 and viscosity (Y) is the viscosity of Reference Example 1. Viscosity X/viscosity Y×100 (the percentage of viscosity) was greater than or equal to 70% and less than or equal to 80% at each temperature, which showed that the percentage of the viscosity of Sample 1 with respect to the viscosity of Reference Example 1 was kept low at a lower temperature. In other words, it was shown that mixing EMI-FSI with FEC enables the viscosity of the nonaqueous solvent to be kept low at higher than or equal to 0° C. and lower than or equal to 20° C.

<Cycle Performance 1>

Sample 1 to Sample 3 and Reference Example 1 to Reference Example 3 described above were used as electrolyte solutions to fabricate coin-type half cells, and their cycle performance was evaluated at −20° C.

A Ni—Co—Mn-based composite oxide was prepared as a positive electrode active material of each of the half cells. The ratio between the elements in the composite oxide was Ni:Co:Mn=5:2:3 (referred to as NCM523). Besides the positive electrode active material, acetylene black (referred to as AB) as a conductive additive and poly(vinylidene fluoride) (referred to as PVdF) as a binding agent were added. NCM523, AB, and PVdF were weighed such that the ratio in a positive electrode was NCM523:AB:PVdF=95:3:2 (wt %), and were mixed with NMP used as a solvent, so that a positive electrode slurry was obtained.

Lithium metal was used for the counter electrode (also referred to as a negative electrode) of the half cell, and a separator having a stacked-layer structure was used. The separator had a stacked-layer structure in which a polypropylene material was positioned on the positive electrode side and a glass fiber material was positioned on the negative electrode side.

A discharge rate and a charge rate, which are measurement conditions, are described. The discharge rate refers to the relative ratio of a current at the time of discharging to battery capacity and is expressed in a unit C. A current corresponding to 1 C in a battery with rated capacity X (Ah) is X (A). The case where discharging is performed with a current of 2X (A) is rephrased as to perform discharging at 2 C, and the case where discharging is performed with a current of X/5 (A) is rephrased as to perform discharging at 0.2 C. The same applies to the charge rate; the case where charging is performed with a current of 2X (A) is rephrased as to perform charging at 2 C, and the case where charging is performed with a current of X/5 (A) is rephrased as to perform charging at 0.2 C.

In discharging, constant-current discharging was performed at a discharge rate of 0.2 C at up to 2.5 V, and in charging, constant-current charging was performed at a charge rate of 0.05 C at up to 4.3 V in this example. Table 5 shows discharge capacity as cycle performance.

TABLE 5

| | Discharge capacity (mAh/g) |
|---|---|
| Sample 1 | 69 |
| Sample 2 | 38 |
| Sample 3 | 35 |
| Reference Example 1 | 39 |
| Reference Example 2 | 22 |
| Reference Example 3 | 8 |

Sample 1 was found to have the highest discharge capacity of 69 mAh/g. It was confirmed that the cyclic carbonates as the organic solvents of Sample 1 and the like do not cause an adverse effect on cycle performance when mixed with the ionic liquid.

By contrast, Reference Examples 2 and 3, in which the linear carbonates were used as the organic solvents, have lower discharge capacity than Sample 1. That is, Reference Examples 2 and 3 were found to have low discharge capacity, although having low viscosity. It was shown that to increase discharge capacity, the organic solvent is preferably a cyclic carbonate, particularly preferably a fluorinated cyclic carbonate.

Example 2

<Ignition Test>

Samples 4 to 6 and Reference Examples 4 and 5 were fabricated and underwent an ignition test. Table 6 shows details of Samples 4 to 6 and Reference Examples 4 and 5.

TABLE 6

| | Ionic liquid | Organic solvent | Ionic liquid:organic solvent |
|---|---|---|---|
| Sample 4 | 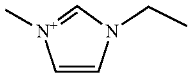 (111) 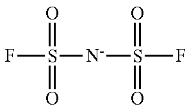 (H11) | 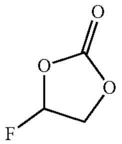 | 7.0:3.0 |
| Sample 5 | | 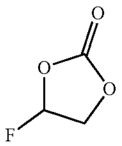 | 8.5:1.5 |
| Sample 6 | | 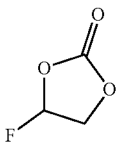 | 5.5:4.5 |
| Reference Example 4 | | — | — |
| Reference Example 5 | — | 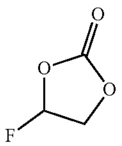 | — |

Sample 4 is a nonaqueous solvent similar to Sample 1, and Sample 5 is a nonaqueous solvent similar to Sample 2. Note that Samples 4 and 5 did not contain a lithium salt. In Sample 6, the volume ratio between EMI-FSI and FEC was EMI-FSI:FEC=5.5:4.5, which was different from that in Samples 4 and 5. This is a proportion such that EMI-FSI accounts for 55 vol % in the nonaqueous solvent.

Reference Example 4 is a nonaqueous solvent containing the ionic liquid but not containing an organic solvent. Reference Example 5 is a nonaqueous solvent containing FEC as an organic solvent but not containing an ionic liquid. In the ignition test, a flame (higher than or equal to 1000° C.) on a lighter ("BRISA TURBO MINI CR" by Lightec Inc.) was put close to glass fibers impregnated with the nonaqueous solvents and whether the glass fibers catch fire was observed.

Table 7 shows results of Samples 4 to 6 and Reference Examples 4 and 5.

TABLE 7

| | Ignition test results |
|---|---|
| Sample 4 | No ignition was observed. |
| Sample 5 | No ignition was observed. |
| Sample 6 | No ignition was observed. |
| Reference Example 4 | No ignition was observed. |
| Reference Example 5 | Ignition occurred. |

In this ignition test, a flame on the lighter was put close to Samples 4 to 6 and Reference Example 4 containing EMI-FSI for five seconds; however, no ignition was observed. Reference Example 5 caught fire at the instant when a flame on the lighter was put close thereto.

The results showed that the nonaqueous solvent becomes less flammable and has high heat resistance by containing EMI-FSI. Heat resistance is increased in some secondary batteries by adding an additive or the like besides a nonaqueous solvent; however, it was shown that without using an additive, a secondary battery has high heat resistance when including an ionic liquid at greater than or equal to 50 vol % in a nonaqueous solvent. A secondary battery preferably includes a nonaqueous solvent having high heat resistance to achieve a high degree of safety.

Example 3

<Cycle Performance 2>

Samples 4 and 6, where no ignition was observed, were used as electrolyte solutions to fabricate coin-cell-type half cells, and their cycle performance was measured at 0° C. and 25° C. The structure of the half cells and the measurement conditions other than the temperature were similar to those in Cycle performance 1.

Figures 17A, 17B:
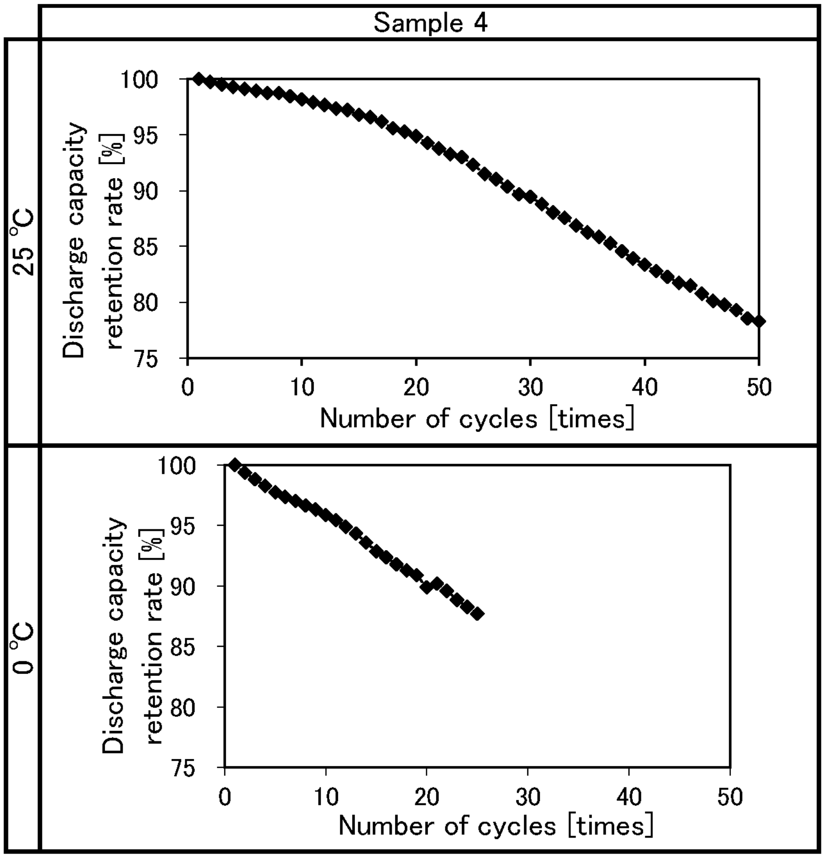
FIG. 17A and FIG. 17B are graphs showing cycle performance.

FIG. 17A shows the cycle performance of Sample 4 at 25° C., and FIG. 17B shows the cycle performance thereof at 0° C. The discharge capacity retention rates at 0° C. and 25° C. were found to be favorable.

Figures 18A, 18B:
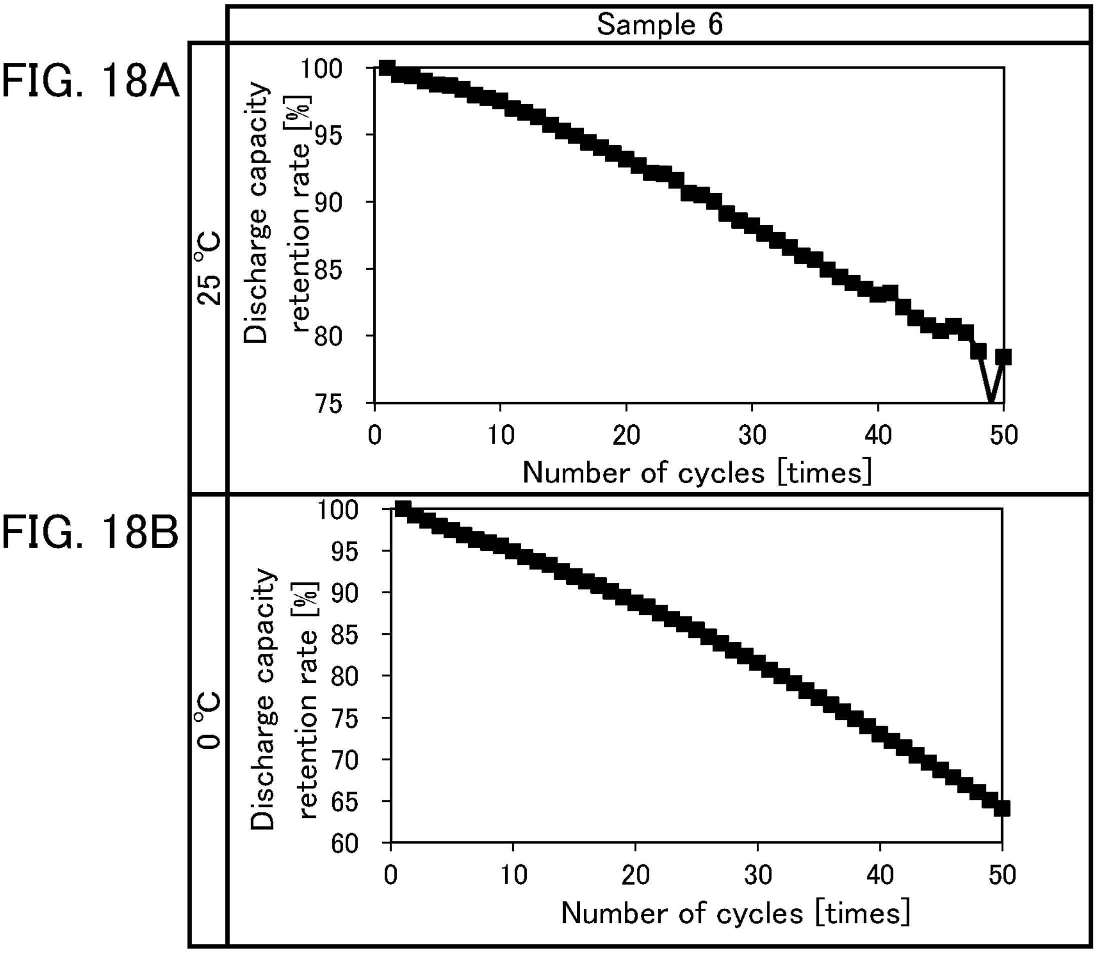
FIG. 18A and FIG. 18B are graphs showing cycle performance.

Next, FIG. 18A shows the cycle performance of Sample 6 at 25° C., and FIG. 18B shows the cycle performance thereof at 0° C. The discharge capacity retention rates at 0° C. and 25° C. were found to be favorable.

From Cycle performance 2, it was found that the secondary battery provided with the nonaqueous solvent that contains the ionic liquid containing an imidazolium cation and the organic solvent containing a fluorinated cyclic carbonate exhibits favorable cycle performance at room temperature and temperatures lower than room temperature.

Example 4

<Nuclear Magnetic Resonance (NMR)>

Figures 19A, 19B:
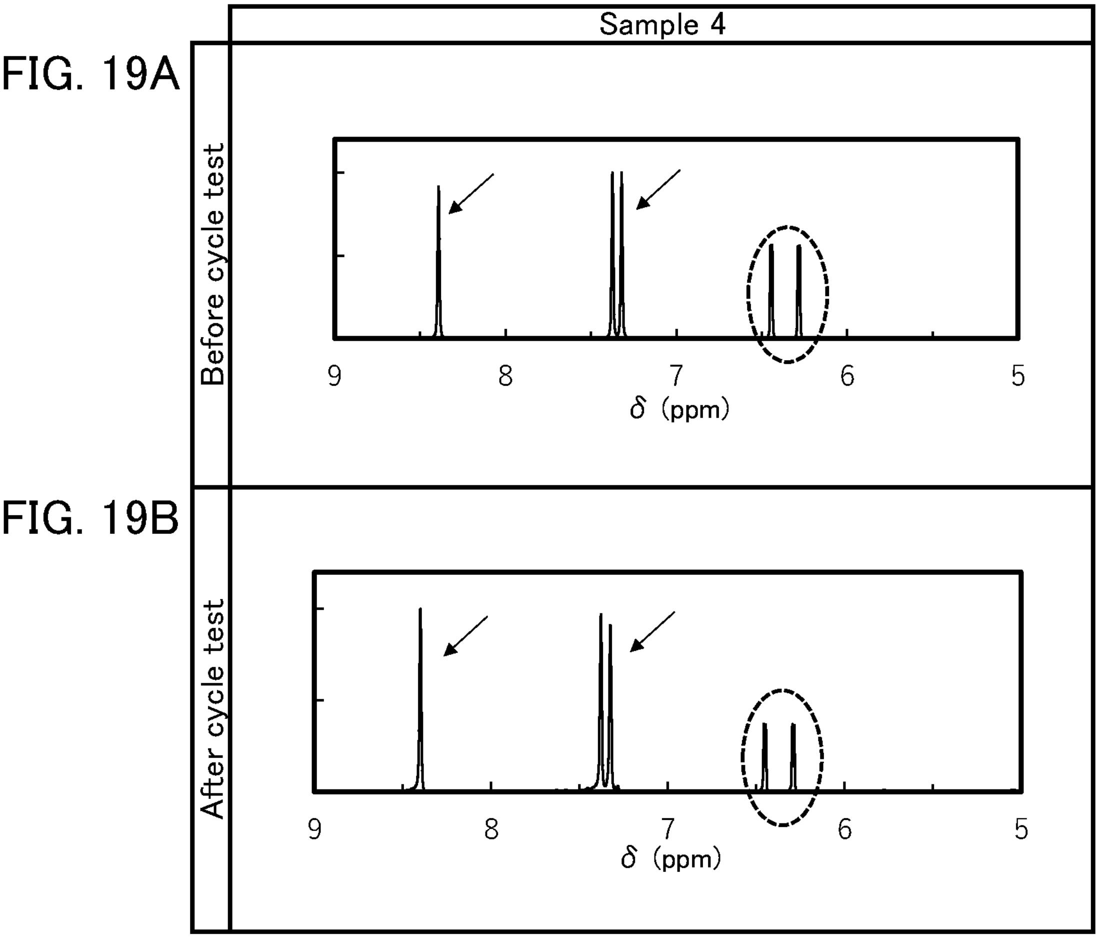
FIG. 19A and FIG. 19B are graphs showing NMR measurement results.

When the cell was disassembled after the cycle test results for Sample 4 at 25° C., a decomposition product was observed. Then, by nuclear magnetic resonance spectrometry ($^1$H-NMR), Sample 4 was analyzed before and after the cycle test. FIG. 19A shows the results before the cycle test, and FIG. 19B shows the results after the cycle test.

In each of FIG. 19A and FIG. 19B, peaks attributed to EMI-FSI were observed at the portions denoted by the arrows, and peaks attributed to FEC were observed at the portion surrounded by the dotted line. The integral ratio of each NMR peak correlates with the relative molar ratio of the object under the analysis.

In view of this, for the peaks shown in FIG. 19A and FIG. 19B, a change in the integral ratio of the peaks attributed to FEC relative to the peaks attributed to EMI-FSI was examined. Then, the integral ratio was 1.3 in FIG. 19A, whereas the integral ratio was 0.8 in FIG. 19B. In other words, the peaks attributed to FEC decreased by approximately 40% after the cycle test, suggesting that the proportion of FEC in Sample 4 decreased.

Such NMR results suggest that the decomposition product observed at the time of disassembly of the cell was derived from FEC.

REFERENCE NUMERALS

100: positive electrode active material, 101: positive electrode active material layer, 102: negative electrode active material layer, 103: separator, 300: secondary battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator

The invention claimed is:

1. A nonaqueous solvent comprising an ionic liquid at greater than or equal to 50 vol % and less than or equal to 95 vol % and an organic solvent comprising a fluorinated cyclic carbonate represented by Structural Formula (H15), (H15)

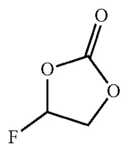

wherein the ionic liquid comprises a lithium salt, an imidazolium cation represented by Structural Formula (111), and a bis(fluorosulfonyl) imide anion represented by Structural Formula (H11), and (111)

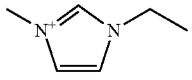

(H11)

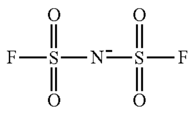

wherein a viscosity of the nonaqueous solvent at −15° C. is lower than a viscosity of the ionic liquid at −15° C.

2. A secondary battery comprising a positive electrode, a nonaqueous solvent, and a negative electrode, wherein the nonaqueous solvent comprises an ionic liquid at greater than or equal to 50 vol % and less than or equal to 95 vol % and an organic solvent comprising a fluorinated cyclic carbonate, wherein the ionic liquid comprises a lithium salt, an imidazolium, and a bis(fluorosulfonyl) imide anion, and wherein a viscosity of the nonaqueous solvent at −15° C. is lower than a viscosity of the ionic liquid at −15° C.

3. A nonaqueous solvent comprising an ionic liquid at greater than or equal to 50 vol % and less than or equal to 95 vol % and an organic solvent comprising a fluorinated cyclic carbonate represented by Structural Formula (H15), (H15)

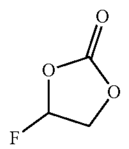

wherein the ionic liquid comprises a lithium salt, an imidazolium cation represented by Structural Formula (111), and a bis(fluorosulfonyl) imide anion represented by Structural Formula (H11), and (111)

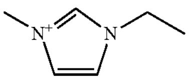

(H11)

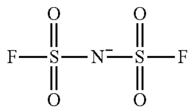

wherein a viscosity of the nonaqueous solvent at 20° C. is lower than a viscosity of the ionic liquid at 20° C.

4. A secondary battery comprising a positive electrode, a nonaqueous solvent, and a negative electrode, wherein the nonaqueous solvent comprises an ionic liquid at greater than or equal to 50 vol % and less than or equal to 95 vol % and an organic solvent comprising a fluorinated cyclic carbonate, wherein the ionic liquid comprises a lithium salt, an imidazolium cation, and a bis(fluorosulfonyl) imide anion, and wherein a viscosity of the nonaqueous solvent at 20° C. is lower than a viscosity of the ionic liquid at 20° C.

5. The secondary battery according to claim 2, wherein the ionic liquid comprises an imidazolium cation represented by Structural Formula (111) and a bis(fluorosulfonyl) imide anion represented by Structural Formula (H11)

(111)

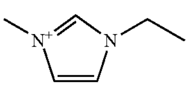

-continued (H11)

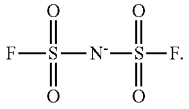

6. The secondary battery according to claim 2, wherein the organic solvent comprises a fluorinated cyclic carbonate represented by Structural Formula (H15)

(H15)

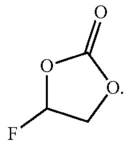

7. A vehicle comprising the secondary battery according to claim 2.

8. The secondary battery according to claim 4, wherein the ionic liquid comprises an imidazolium cation represented by Structural Formula (111) and a bis(fluorosulfonyl) imide anion represented by Structural Formula (H11)

(111)

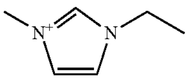

(H11)

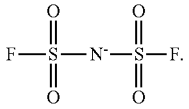

9. The secondary battery according to claim 4, wherein the organic solvent comprises a fluorinated cyclic carbonate represented by Structural Formula (H15)

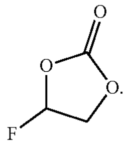

10. A vehicle comprising the secondary battery according to claim 4.

11. The nonaqueous solvent according to claim 1, wherein a volume ratio between the ionic liquid and the organic solvent is 7.0:3.0, and wherein the lithium salt comprises a 2.15 mol fluorine-containing imide lithium salt.

12. The second battery according to claim 2, wherein a volume ratio between the ionic liquid and the organic solvent is 7.0:3.0, wherein the lithium salt comprises a 2.15 mol fluorine-containing imide lithium salt, and wherein a discharge capacity of the second battery until a discharge voltage 2.5 Vis 69 mAh/g at −20° C.

13. The nonaqueous solvent according to claim 3, wherein a volume ratio between the ionic liquid and the organic solvent is 7.0:3.0, and wherein the lithium salt comprises a 2.15 mol fluorine-containing imide lithium salt.

14. The second battery according to claim 4, wherein a volume ratio between the ionic liquid and the organic solvent is 7.0:3.0, wherein the lithium salt comprises a 2.15 mol fluorine-containing imide lithium salt, and wherein a discharge capacity of the second battery until a discharge voltage 2.5 V is 69 mAh/g at −20° C.

* * * * *